United States Patent
Jawerth et al.

(10) Patent No.: US 7,387,457 B2
(45) Date of Patent: Jun. 17, 2008

(54) ONE-ROW KEYBOARD AND APPROXIMATE TYPING

(75) Inventors: Bjorn Jawerth, Morrisville, NC (US); Viraj Mehta, Duluth, GA (US)

(73) Assignee: 5 Examples, Inc., Morrisville, NC (US)

( * ) Notice: Subject to any disclaimer, the term of this patent is extended or adjusted under 35 U.S.C. 154(b) by 86 days.

(21) Appl. No.: 11/204,940

(22) Filed: Aug. 15, 2005

(65) Prior Publication Data

US 2006/0088356 A1 Apr. 27, 2006

Related U.S. Application Data

(60) Provisional application No. 60/601,224, filed on Aug. 13, 2004.

(51) Int. Cl.
*H03M 11/04* (2006.01)
(52) U.S. Cl. .................. 400/489; 341/22; 345/168; 400/472
(58) Field of Classification Search ........... 400/472, 400/486, 485, 489; 345/168, 169; 341/22
See application file for complete search history.

(56) References Cited

U.S. PATENT DOCUMENTS

| | | | | |
|---|---|---|---|---|
| 3,967,273 A | * | 6/1976 | Knowlton | 341/22 |
| 5,818,437 A | * | 10/1998 | Grover et al. | 715/811 |
| 6,011,554 A | * | 1/2000 | King et al. | 715/811 |
| D457,525 S | | 5/2002 | Olodort et al. | D14/396 |
| 6,684,201 B1 | * | 1/2004 | Brill | 706/45 |
| 7,048,456 B2 | * | 5/2006 | Keinonen et al. | 400/495 |
| 7,081,837 B2 | * | 7/2006 | Bollman | 341/22 |
| 7,283,065 B2 | * | 10/2007 | Scott et al. | 341/22 |
| 7,310,053 B2 | * | 12/2007 | Bollman | 341/22 |
| 2003/0011574 A1 | * | 1/2003 | Goodman | 345/172 |

* cited by examiner

*Primary Examiner*—Leslie J Evanisko
(74) *Attorney, Agent, or Firm*—Morgan, Lewis & Bockius LLP; Steven D. Underwood, Esq.

(57) ABSTRACT

In one aspect, an apparatus for character entry on an electronic device, comprising: a keyboard with one row of keys; and an electronic device in communication with the keyboard; wherein one or more keys on the keyboard has a correspondence with a plurality of characters, wherein the plurality of characters on at least one of said keys includes at least one letter character and one non-letter character, and wherein the correspondence enables touch typing.

22 Claims, 41 Drawing Sheets

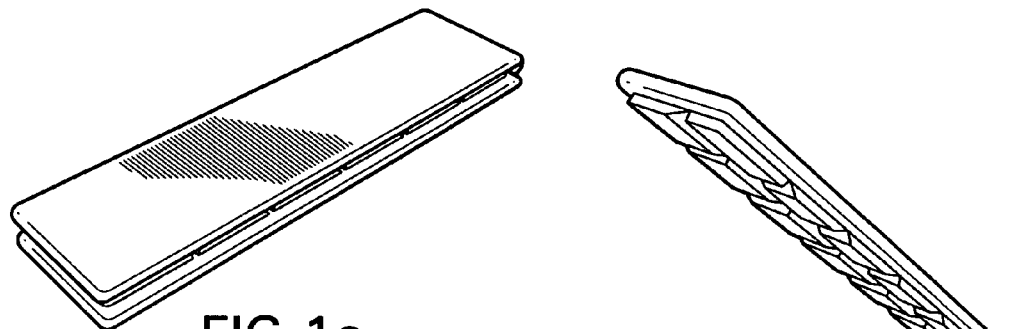
FIG.1a
FIG.1b
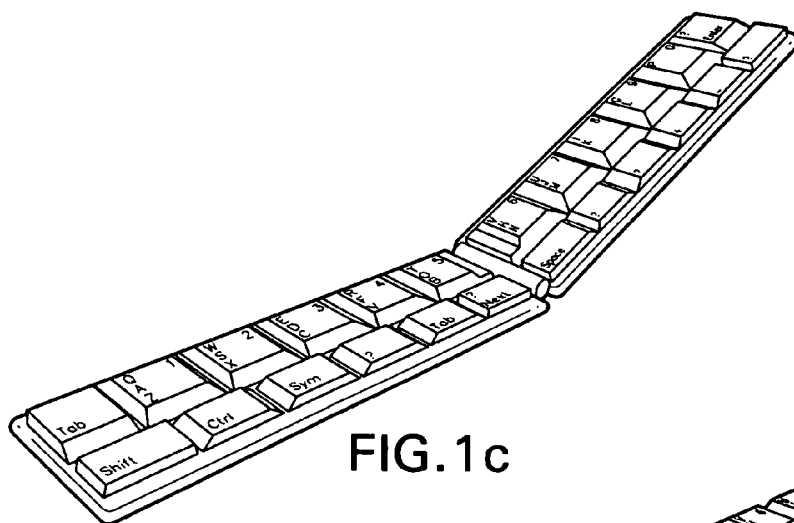
FIG.1c
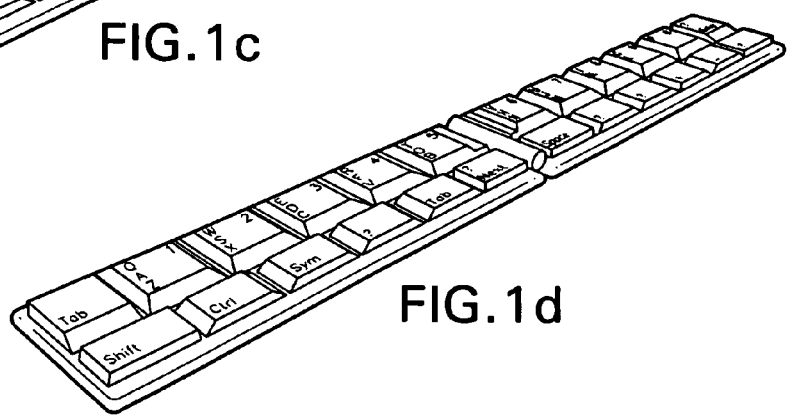
FIG.1d

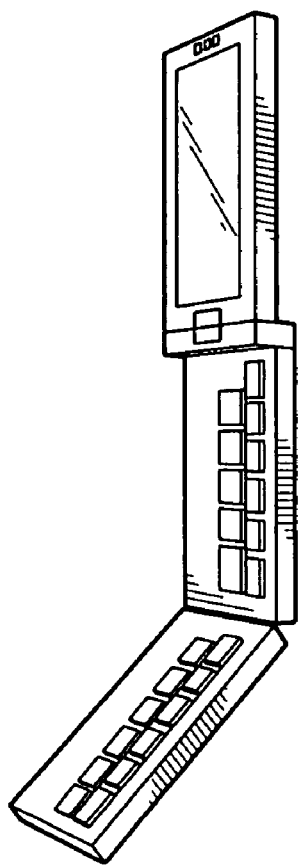
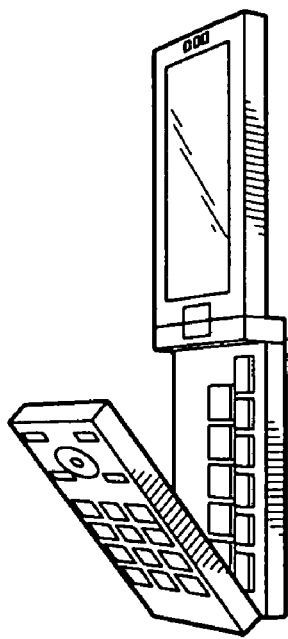
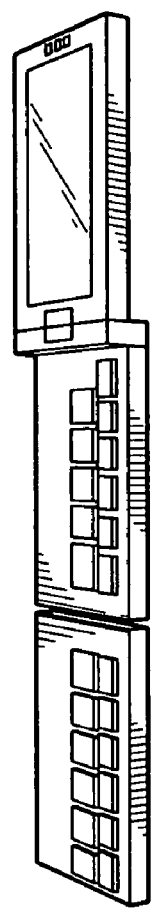
FIG.20f
FIG.20g
FIG.20e

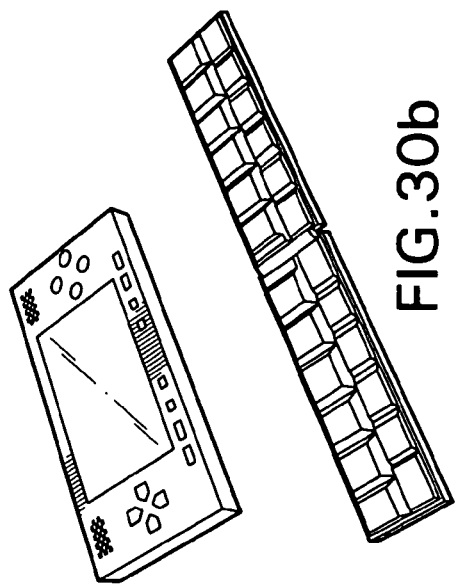
FIG.30b
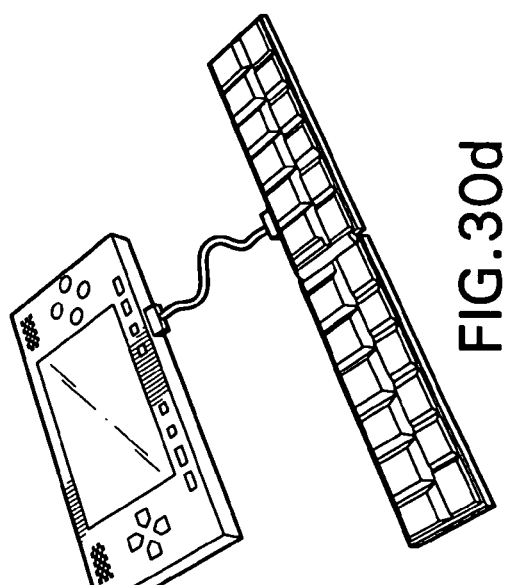
FIG.30d
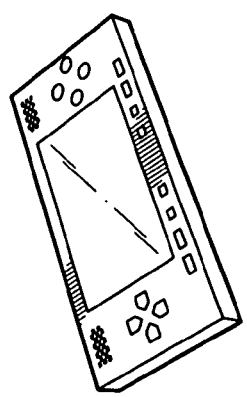
FIG.30a
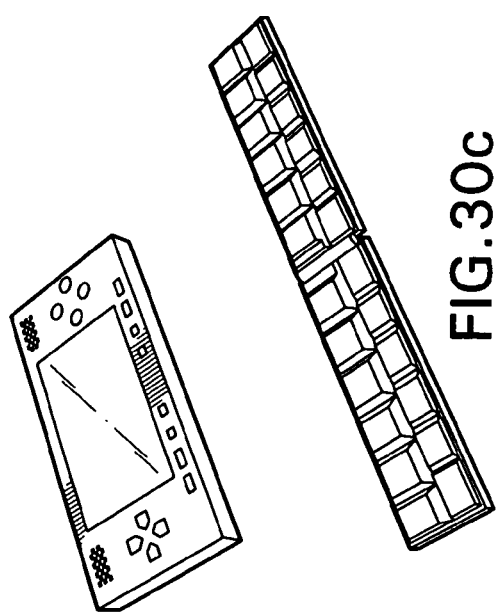
FIG.30c
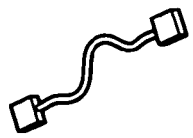

ONE-ROW KEYBOARD AND APPROXIMATE TYPING

CROSS-REFERENCE TO RELATED APPLICATIONS

This application claims priority to the U.S. provisional patent application No. 60/601,224, entitled Method and Software for Improved Text Entry, filed on Aug. 13, 2004. The entire contents of that provisional application are incorporated herein by reference.

BACKGROUND

It is fascinating to reflect on the great impact of the PC on society. The PC is clearly capable of doing a whole lot more than what we use it for. Essentially, for many the PC became a replacement for the typewriter, and it is still largely a word processor. The other initial application that drove PC adoption was the spreadsheet. Then it also became a presentation creation tool. Over time, email was introduced and, even more recently, Web browsing. Web browsing, in turn, is giving rise to online shopping and replacing encyclopedias as our primary information resource. But, overall, there are still very few uses for these powerful machines by the average user.

We are now going through a phase where the capabilities of different types of devices are converging. Devices rely on common protocols and are often connected via the Internet, and the services offered are becoming more portable and accessible wherever we are and whenever we need them. We now have PCs, cellphones, TVs, iPods, PDAs, and camera phones relying on the Internet, complemented by communication networks such as the cellular networks, Bluetooth, and Wi-Fi. Services range from unified messaging and VOIP to entertainment.

With these trends toward greater connectedness and mobility, perhaps the most central roblem is how to make text entry possible on small, portable devices. The success of email, MS, and instant messaging on portable devices and user patterns already established on the PC make an efficient text-entry system a must for broad adoption of smaller, mobile devices.

In this direction, the RIM pagers (the Blackberry devices) are prime examples of a well-designed portable device. It is simply an excellent email machine, and for many this immediate access to email becomes highly addictive. A great deal of the success of this type of device relies on its small keyboard, which allows for two-thumb typing. This typing is quick and easy to learn since it relies on the same basic organization as the regular typewriter/PC keyboard.

For cellphones there is the T9 method by Tegic (U.S. Pat. No. 5,818,437 and other pending patents; T9 text input software Copyright 1999-2002; Tegic Communications, Inc.); cf. [22], [23].

For PDAs, the preferred method for text entry seems to be using a touch screen combined with "graffiti" entered using a stylus or tapping a keyboard with the stylus. Recognition of handwriting is also widely used.

A solution to the text entry problem for small portable devices should ideally address the following capabilities:
- support touch-typing and rapid text entry;
- easy-to-learn and consistent with standard keyboards;
- easily extensible to include new words and new contexts;
- small enough for portability and easy integration with mobile devices;
- easy corrections of typos and minor mistakes; and
- support auto-completion.

These goals are addressed by the invention described herein.

SUMMARY

In one aspect, the invention comprises an apparatus for character entry on an electronic device, comprising: a keyboard with one row of keys; and an electronic display device in communication with the keyboard; wherein one or more keys on the keyboard has a correspondence with a plurality of characters, and wherein the correspondence enables QWERTY-based typing.

In another aspect, the invention comprises an apparatus for character entry on an electronic device, comprising: a keyboard with a plurality of keys; and an electronic display device in communication with the keyboard; wherein one or more keys on the keyboard has a correspondence with a plurality of characters, and wherein, for each of the one or more keys, the plurality of characters comprises: (a) a home row character associated with a particular finger when touch typing; and (b) a non-home-row character associated with the particular finger when touch typing.

In various embodiments: (1) the apparatus is operable to apply natural language processing and approximate typing algorithms to increase accuracy of recognition and display of typed words and other valid character combinations; (2) the apparatus is operable to apply natural language processing and approximate typing algorithms to reduce average typing ambiguity by more than 5% over T9; (3) the apparatus is operable to identify words and other valid character combinations typed by users based on modeling character and symbol combinations as paths on N-ary trees; (4) the apparatus is operable to identify words and other valid character combinations typed by users based on a dictionary modeled as a set of valid paths on an N-ary tree; (5) the apparatus is operable to identify words and other valid character combinations typed by a user based on a signature dictionary; (6) the apparatus is operable to: receive ambiguous keyboard input; disambiguate the input; and provide predictions based on the input; (7) the predictions are based on identifying a maximum likelihood of a word or other valid character combinations intended to be typed; and (8) the maximum likelihood is identified based on calculating one or more products of probabilities, wherein each of the products comprises: a probability of a character combination, given an intended signature; and a probability for a signature being the intended one, given actual input; (9) the apparatus is operable to display a likely valid character combination based on keystrokes entered by a user; (10) the likely valid character combination is identified based at least in part on parts of speech classification; (11) the likely valid character combination is identified based at least in part on context-based disambiguation; (12) the likely valid character combination is identified based at least in part on natural language processing techniques; (13) the likely valid character combination is identified based at least in part on ordering with respect to one or more cost functions; (14) the likely valid character combination is identified based at least in part on autocompletion and auto-correction software; and (15) the keyboard is a virtual keyboard displayed on the display device.

In another aspect, the invention comprises an apparatus for character entry on an electronic device, comprising: a keyboard with a plurality of keys; and an electronic display device in communication with the keyboard; wherein each of one or more keys represents an equivalence class of characters, and wherein characters are assigned to equivalence classes according to touch typing assignments to fingers.

In various embodiments: (1) the apparatus is operable to identify typed words and other valid character combinations based on approximate typing algorithms comprising pattern recognition algorithms; (2) the apparatus is operable to identify typed words and other valid character combinations based on one or more cost functions, similarity measures, probability models, or combinations thereof that measure how well typed character sequences approximate intended character sequences; and (3) at least one cost function is based on an edit distance that provides a coarse model of a user's typing and errors.

In another aspect, the invention comprises a method for disambiguation of human input for text entry, comprising: receiving a plurality of discrete input signals; and dynamically mapping the input signals to output signals; wherein one or more of the input signals represents an equivalence class of characters, and wherein the output signals are determined based on approximate typing algorithms comprising pattern recognition algorithms.

In another aspect, the invention comprises a method for disambiguation of human input for text entry, comprising: receiving a plurality of discrete input signals; and dynamically mapping the input signals to output signals; wherein one or more of the input signals represents an equivalence class of characters, and wherein the output signals are determined based on one or more cost functions, similarity measures, probability models, or combinations thereof that measure how well input character sequences approximate intended character sequences.

In one embodiment, at least one cost function is based on an edit distance that provides a coarse model of a user's input process and errors.

In another aspect, the invention comprises a method for disambiguation of human input for text entry, comprising: receiving a plurality of discrete input signals; and dynamically mapping the input signals to output signals; wherein one or more of the input signals represents an equivalence class of characters, wherein the output signals include a likely valid character combination, and wherein the likely valid character combination is identified based at least in part on parts of speech classification.

In another aspect, the invention comprises a method for disambiguation of human input for text entry, comprising: receiving a plurality of discrete input signals; and dynamically mapping the input signals to output signals; wherein one or more of the input signals represents an equivalence class of characters, wherein the output signals include a likely valid character combination, and wherein the likely valid character combination is identified based at least in part on context-based disambiguation.

In another aspect, the invention comprises a method for disambiguation of human input for text entry, comprising: receiving a plurality of discrete input signals; and dynamically mapping the input signals to output signals; wherein one or more of the input signals represents an equivalence class of characters, wherein the output signals include a likely valid character combination, and wherein the likely valid character combination is identified based at least in part on natural language processing techniques.

In another aspect, the invention comprises a method for disambiguation of human input for text entry, comprising: receiving a plurality of discrete input signals; and dynamically mapping the input signals to output signals; wherein one or more of the input signals represents an equivalence class of characters, wherein the output signals include a likely valid character combination, and wherein the likely valid character combination is identified based at least in part on ordering with respect to one or more cost functions.

In another aspect, the invention comprises a method for disambiguation of human input for text entry, comprising: receiving a plurality of discrete input signals; and dynamically mapping the input signals to output signals; wherein one or more of the input signals represents an equivalence class of characters, wherein the output signals include a likely valid character combination, and wherein the likely valid character combination is identified based at least in part on auto-completion and auto-correction software.

A solution to the text entry problem for small portable devices should ideally address the following capabilities:
support touch-typing and rapid text entry;
easy-to-learn and consistent with standard keyboards;
easily extensible to include new words and new contexts;
small enough for portability and easy integration with mobile devices;
easy corrections of typos and minor mistakes; and
support auto-completion.

The One-Row Keyboard (ORK) is a solution to this problem. Here are some of the key components of this solution, how each contributes to the solution, and how these are different than the commonly used T9.

1. The ORK uses a mapping of the standard QWERTY keyboard onto a small set of keys in such a way that the user's previous experience and training with the QWERTY keyboard can be re-used. In particular, this mapping allows for rapid touch-typing of regular text (including both letters and punctuation marks), using all fingers, with virtually no additional training. Difference from T9: T9 requires a slow entry process that is not consistent with the QWERTY keyboard. In particular, the T9 input process is hard to learn, the typing speed is slow, a careful aim must be used for the few fingers utilized, and touch-typing is not supported. Hence, the input process requires considerable attention.

2. Both ORK and T9 use a smaller set of keys than the regular QWERTY keyboard. Hence, a certain set of keystrokes on either one may not have a unique interpretation in terms of regular letters or words. In such cases, the user may have to choose among alternatives, which requires attention and interrupts typing flow. The ORK is optimized to reduce this ambiguity in several ways:
   (a) Without extra optimization, the ORK creates about 2-3 times less ambiguity than T9.
   (b) The ORK integrates the punctuation marks into the predictive typing.
   (c) Using Natural Language Processing (NLP) techniques, the ambiguity, and hence user attention, is reduced further. (These techniques can also be used to improve T9's performance.)
   (d) As data is input, changes occur on the screen. If such changes are not consistent with user expectation, this may cause user distraction. The ORK uses algorithms to smooth the changes on the screen.
   (e) The ORK uses a Beginning Of Word (BOW) organization of the dictionary to display the character combinations that will result in little change on the screen.

Difference from T9: T9 uses a linked tree structure. (These techniques can also be used to improve T9's performance.)

(f) The ORK also uses cost functions for the display process that increase the cost for changes on the screen. Hence, by minimizing these cost functions, a smoother display results. (These techniques can also be used to improve T9's performance.)

(g) Another reason for interruption of the user's typing flow is the occasional need to add new entries to the dictionary. T9 uses a "spell mode" for this: when a character combination is not recognized, the user is asked to start from the beginning and enter the word unambiguously using multi-tap. This is quite frustrating for the user and is a serious interruption in the entry process. ORK uses a simplified spell mode. This simplification re-uses the information the user has already entered and, hence, only a small amount of extra information is necessary to uniquely identify the new word. The interface for the input of this extra information also requires much less attention on behalf of the user. (These techniques can also be used to improve T9's performance.)

(h) Another significant cause of user interruption is typing errors and other incorrect entries. Because of the ambiguity created by reduced keyboards, such errors are harder to fix. The ORK allows the user to use "approximate typing." The reduced keyboard entry process is integrated with a correction process, which can either be automatic or designed to minimize user intervention. The correction process is based on statistical techniques used by NLP, voice recognition and speech processing, as well as machine translation. (These techniques can also be used to improve T9's performance.)

3. The ORK uses both the NLP and approximate typing techniques to improve the auto-completion capability. This allows the user to enter only part of a word or character combination, and when a reasonable prediction of the remaining characters have been obtained, these characters are entered or presented to the user for possible acceptance. (These techniques can also be used to improve T9's performance.)

4. The ORK also reduces the need for user attention and supports the uninterrupted typing process by allowing a combination of ambiguous and non-ambiguous typing. This allows the entry of symbols and numbers to be integrated with prediction based on the entered letters and punctuation marks.

BRIEF DESCRIPTION OF THE DRAWINGS

FIGS. 1a-1d depict an embodiment of the ORK.

FIGS. 15A-30d depict various embodiments of the ORK and its integration with portable devices.

DETAILED DESCRIPTION OF PREFERRED EMBODIMENTS

Figure 2:
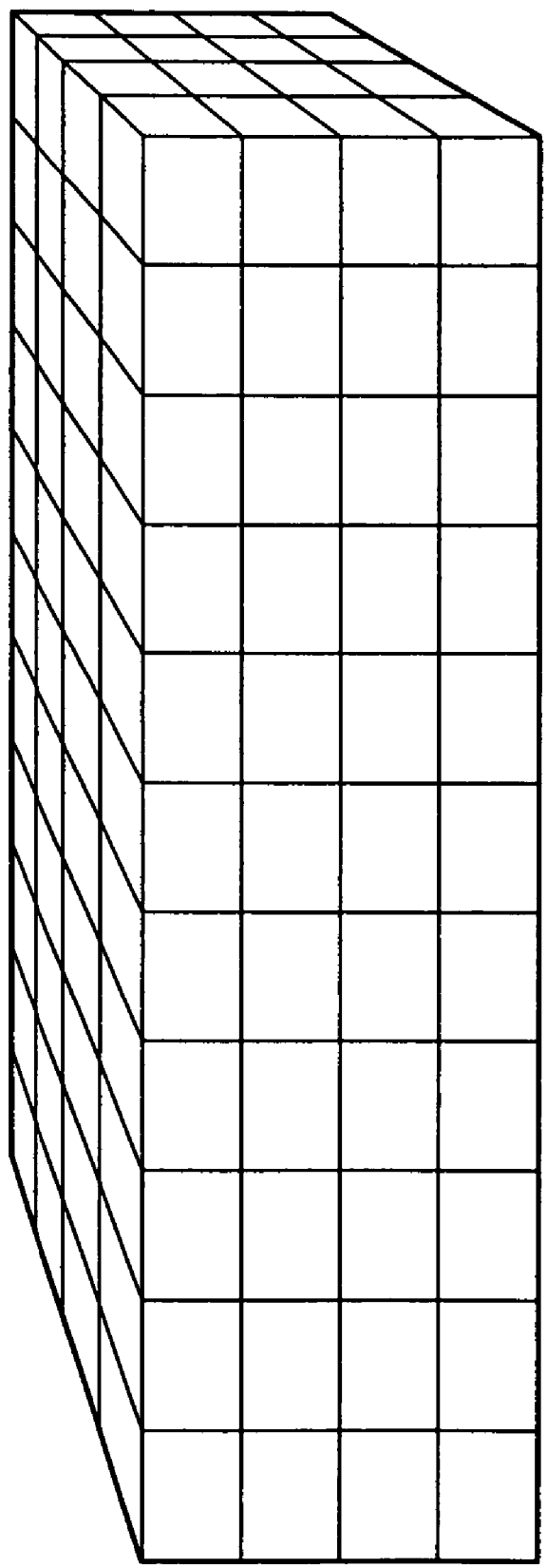
FIG. 2: The two-dimensional grid representation of words and valid character combinations.

1 A Preferred Embodiment of the Present Invention Comprises the One-row Keyboard.

1.1 The Basic Set-up

A regular "QWERTY" keyboard consists of the letters of the alphabet in lower case and then an additional set of characters and control keys. To be specific, we shall assume that the "regular" keyboard for touch-typing consists of 30 symbols arranged in three rows:

Row 1 qwert yuiop

Row 2 asdfg hjkl;

Row 3 zxcvb nm,./

It will be convenient to assign a specific number $\alpha$, $1 \leq \alpha \leq 30$, to each of the letters and symbols of this regular keyboard. Starting with the upper left and going row-wise, the letters on the first row obtain numbers $\alpha$ with $1 \leq \alpha \leq 10$, and so on. For example, the letter v is assigned the number $\alpha=\alpha(v)=24$. We also assign the space character (used when we reach the end of a word, for instance) the number $\alpha=0$.

For the One-Row Keyboard(ORK), we collapse these symbols into one row by grouping three symbols, one from each row, into a single group; see FIG. 1 and FIGS. 15-30. Each one of these groups then corresponds to one key on the One-Row Keyboard: the first key on the One-Row Keyboard corresponds to {qaz}, the second to {wsx}, etc. The One-Row Keyboard thus has ten keys:

One-row, left: {qaz}, {wsx}, {edc}, {rfv}, {tgb}

One-row, right: {yhn}, {ujm}, {ik, }, {ol.}, {p;/}

Just as in the case of the regular keyboard, various additional keys, extra symbols, and commands may be added to the One-Row Keyboard. Perhaps the most notable of these is the space bar.

The One-Row Keyboard still allows the user to touch-type: for each letter of a specific word, the key corresponding to the group of letters containing the letter is typed. In this way, the signature corresponding to the word is typed, rather than the word.

Suppose we identify each of the keys of the basic One-Row Keyboard with a number $\sigma$, $1 \leq \sigma \leq 10$, starting from left and going to the right. So, for example, each of the three letters r, f and v corresponds to the number $\alpha=\sigma(r)=\alpha(f)=\sigma(v)=4$. As for regular keys, we also add the space character as $\sigma=0$. Now, with this convention, the signature of a word with N letters becomes a sequence of non-zero numbers $\sigma_1 \sigma_2 \ldots \sigma_N$.

Similarly, suppose we identify the row of the regular keyboard to which a letter belongs by a number $\tau$, $1 \leq \tau \leq 3$, starting with the top row. For example, since the letter i belongs to the top row of the regular keyboard, it has $\tau=\tau(i)=1$. The dual signature of a word is the sequence of these $\tau$'s, one for each letter. A word with N letters thus has a dual signature which is a sequence of numbers $\tau_1 \tau_2 \ldots \tau_N$. Again, it is convenient to have $\tau=0$ correspond to the "space" symbol.

Each specific letter can thus be specified exactly either through the number $\alpha$ or through the pair $\sigma$, $\tau$. More generally, an N-letter word w is specified exactly through the sequence $$\alpha = \alpha(w) = \alpha_1 \alpha_2 \ldots \alpha_N, \quad (1)$$

or, alternatively, through the signature $$\sigma = \sigma(w) = \sigma_1 \sigma_2 \ldots \sigma_N \quad (2)$$

and the dual signature $$\tau = \tau(w) = \tau_1 \tau_2 \ldots \tau_N. \quad (3)$$

As we use the One-Row Keyboard to type in the sequence of a word, we lose (exactly) the information in the word's dual signature.

There is another type of representation of the sequences $\alpha, \sigma$, and $\tau$ that is also useful. Let us assume that we have a 31-ary infinite tree $A = A_{30}$, starting from the root and with each node having 31 children. As above, each given word w can be identified with a sequence $\alpha = \alpha(w)$, and now we can identify $\alpha$ in turn with a path $\alpha_1 \alpha_2 \ldots \alpha_N$ in this tree: starting from the root, the value of $\alpha_1$ means that on the first level (below the root) the node corresponding to the value $\alpha_1$ is traversed, and then on the next level, level 2, the node corresponding to the value $\alpha_2$ is traversed, etc. The path of a N letter word thus has N+1 levels if we count the root level. (Whenever convenient, we may also add a space symbol, or several, to the end of the sequence; in that case, the path involves additional levels.)

Similarly, the signature $\sigma = \sigma(w)$ of word w with N letters can be identified with a path of length N+1 in a 11-ary tree, with 11 choices on each level. The dual signature $\tau = \tau(w)$ is a path in a 4-ary tree.

Clearly, very few of the possible paths in these trees correspond to real words, signatures, and dual signatures, respectively.

The 31-ary tree, used for the words and sequences $\alpha$, factors precisely into the two trees for the signatures $\sigma$ and dual signatures $\tau$.

We can also visualize each sequence a and its corresponding $\alpha$, $\tau$ as a path through the infinite block in FIG. 2 (note that only four levels are shown): on the first level, the unique block with "coordinates" $(\sigma_1, \tau_1)$ is traversed, on the second $(\sigma_2, \tau_2)$, etc. The signatures, and hence what the ten keys of the One-Row Keyboard produce, is obtained by the projection of the $\alpha_i$'s onto the $\sigma_i$'s and ignoring the $\tau_i$'s.

Comment 1.1 Both T9 and the ORK are examples of a reduced keyboard. A reduced key-board R is a collection $R = \{S^i\}_i$ of sets (or equivalence classes) of characters $S_i = \{T_j^i\}_j$ of letters and symbols. The entire collection $\{T_j^i\}_{i,j}$ is the alphabet of the keyboard R. With a physical implementation of the reduced keyboard R, we associate each $S_i$ with a key, a location on the screen, or in any other manner through which the user can select the intended set. We have used the notation $\sigma_i$ to identify this input, and this is the signature corresponding to the equivalence class in question. The dual signature is intended to exactly capture the remaining information necessary to pinpoint a character in the alphabet. If we are given a character $T_j^i$, and we already know that its signature is $\sigma_i$ (and hence we know $S_i$), then the dual signature will contain the extra information to obtain $T_j^i$. For example, we may list the elements in the equivalence class $S^i$, and then, by giving a number to each of the elements in this list, we may identify the exact character $T_j^i$ by this number. This is then the dual signature $\tau_j$; the character $T_j^i$, is identified with the pair $\tau_i$, $\tau_j$.

This representation of an alphabet in terms of signature and dual signature has many benefits. One is a simplified approach to spelling a word or, more generally, identifying a legal character combination for a reduced keyboard; see below. The representation also simplifies the quantitative treatment and analysis of reduced keyboards.

Comment 1.2 There is an immediate extension of the "signature, dual signature" representation to higher dimensions: a unique object is identified by the n+1-tuple $(\tau^0, \tau^1, \ldots, \tau^n)$. (With n=1 and $\tau^0 = \sigma$, $\tau^1 = \tau$ we are back to the "signature, dual signature".) If we require that there is a subordination among the tau's, say $\tau^0 \to T^1 \to \ldots \tau^n$, then we have a tree structure. The object corresponding to a specific n+1-tuple $(\tau_0, \tau_1, \ldots, \tau_n)$ is identified by the path $\{\tau^0 = \tau_0\} \to \{\tau^1 = \tau_1\} \to \ldots \{\tau^n = \tau_n\}$. This points out that in certain circumstances, as in the case of menu systems, the objects in these representations may not be characters (for menus, they are "files" and "folders").

1.2 Dictionaries for Words, Signatures, and Dual Signatures

Most paths $\alpha$ in the global 31-ary word tree do not correspond to valid words in English (if that is the language we are trying to type). This is immediately clear just by looking at the number of possible combinations. Suppose we consider words with at most six letters. Ignoring the "space" symbol at the end of words, there are $30^6 = 729$ million possible paths using six levels (or seven including the root) in the tree. This number should be compared to the approximately 300 words that correspond to 60 percent of all the printed text or to the approximately 10 words that correspond to 25 percent of the printed text. Hence, we only use one in about 2.4 million of the possible paths 60 percent of the time. Some paths we thus travel often, and most we do not travel at all.

A dictionary is one way to identify this small subset of valid paths. Initially, this is a useful way to view the dictionary: it is the collection of valid paths. Later we shall worry about the size of the dictionary, and then it becomes of interest to avoid some repetitions and not to include standard modifications of basic words (like adding "s" for the plural of a noun, etc.). We shall use the notation D for the particular dictionary we use. The standard way of organizing D is alphabetically, and when we use this we shall use the subscript w: $D_w$.

There are several other views that are useful as well. For example, we may instead consider D as consisting of the sequences $\alpha$ corresponding to valid key combinations. We order these sequences as if the sequences represented a fractional 31-ary expansion, in increasing order. In other words, the word w with $\alpha(w) = \alpha_1 \alpha_2 \ldots$ thus corresponds to the number $0.\alpha_1 \alpha_2 \ldots$, and these fractional expansions, corresponding to valid words, are entered in ascending order. (With any number of spaces added to the end of the a sequence, we identify the same word and the same fractional expansion.) This view of the dictionary is indicated by the subscript $\alpha$: $D_\alpha$. The ordering between the sequences makes it possible to compare two sequences $\alpha^1$, $\alpha^2 \in D_\alpha$: we say that $$\alpha^1 <_\alpha \alpha^2 \quad (4)$$

if the sequence $\alpha^1$ comes before $\alpha^2$ in $D_\alpha$, i.e. if $$0.\alpha_1^1 \alpha_2^1 \alpha_3^1 \ldots < 0.\alpha_1^2 \alpha_2^2 \alpha_3^2 \quad (5)$$

Not all signatures a correspond to words either, and some It's correspond to more than one word. The collection of valid σ's, each entered only once, is called the signature dictionary and is denoted by S. The signature dictionary S can also be viewed in different ways. When we view it in a way analogous to $D_\alpha$, then we use the notation $S_\sigma$. More explicitly, each $\sigma=\sigma_1\sigma_2\ldots$, corresponding to one or more words, is identified with the 11-ary fractional expansion $0.\sigma_1\sigma_2\ldots$, and these are entered in an ascending order into $S_\sigma$. This ordering is denoted by $<_\sigma$. The unique dual signatures are collected in the dual signature dictionary T, and one view of T is $T_\tau$, defined in the obvious, analogous way. The notation for this ordering is $<_\tau$.

With the orderings $<_\sigma$ and $<_\tau$ in $S_\tau$ and $T_\tau$, respectively, we may define several additiona views of D. If we have two words $w^1$, $w^2 \in D$ with corresponding signatures and dual signatures $(\sigma^1, \tau^1)$, $(\sigma^2, \tau^2)$, then $$(\sigma^1, \tau^1) <_{\sigma,\tau} (\sigma^2, \tau^2) \Longleftrightarrow \begin{cases} \sigma^1 <_\sigma \sigma^2 \\ \sigma^1 = \sigma^2 \text{ and } \tau^1 <_\tau \tau^2. \end{cases} \quad (6)$$

We shall write $D_{\sigma,\tau}$ for D with this ordering. We may also write $D=S_\sigma(T_\tau)$ to indicate this ordering. If we switch the two orderings and instead start by ordering with respect to the dual signatures, then we similarly have the ordering $<_{\tau,\sigma}$ and this gives us the view $D_{\tau,\sigma}=T_\tau(S_\sigma)$.

For us probably the view that is most interesting is the following. It is based on interleaving the signature and dual signature sequences. More specifically, if $w \in D$ has the signaure $\sigma=\sigma_1\sigma_2\ldots$ and the dual signature $\tau=\tau_1\tau_2\ldots$, then we form the expansion $0.\sigma_1\tau_1\sigma_2\tau_2\ldots$. This is the basis for the order $<_{\sigma\times\tau}$: words are identified with their interleaved expansions and entered into D in ascending order. To indicate this view, we write $D_{\sigma\times\tau}$. Of course, there is similarly an ordering $<_{\tau\times\sigma}$, and the view using this is $D_{\tau\times\sigma}$.

Let us illustrate with a small dictionary.

EXAMPLE 1.1

Suppose we have a word dictionary $D^{tiny}=D_w^{tiny}$ containing the ten words, alphabetically ordered, "and", "cat", "do", "go", "is", "it", "say," "the", "to", and "way". The corresponding a sequences and signatures and dual signatures are the ones in Table 1. Some of the different orderings of these words are given in Table 2.

Obviously, the different views of the dictionary do not correspond very closely to how our brains store words. The intent is to make it easier to find the word as we type using the regular keyboard or the One-Row Keyboard. How our brains have the information stored is complicated, but it is probably true that the beginning letter of the word is very important as well as the length of the word; see [18].

TABLE 1

$D^{tiny}$ and associated sequences in alphabetical order.

| Word | α | σ | τ |
|---|---|---|---|
| and | 11 26 13 | 1 6 3 | 2 3 2 |
| cat | 23 11 05 | 3 1 5 | 3 2 1 |
| do | 13 08 | 3 9 | 2 1 |
| go | 15 09 | 5 9 | 2 1 |
| is | 08 12 | 8 2 | 1 2 |
| it | 08 05 | 8 5 | 1 1 |

TABLE 1-continued $D^{tiny}$ and associated sequences in alphabetical order.

| Word | α | σ | τ |
|---|---|---|---|
| say | 12 11 06 | 2 1 6 | 2 2 1 |
| the | 05 16 03 | 5 6 3 | 1 2 1 |
| to | 05 09 | 5 9 | 1 1 |
| way | 02 11 06 | 2 1 6 | 1 2 1 |

TABLE 2

$D^{tiny}$ in increasing $<_\alpha$ order (left), increasing $<_{\sigma,\tau}$ order (center), and increasing $<_{\sigma\times\tau}$ order (right).

| Word | α | σ | τ |
|---|---|---|---|
| way | 02 11 06 | 2 1 6 | 1 2 1 |
| to | 05 09 | 5 9 | 1 1 |
| the | 05 16 03 | 5 6 3 | 1 2 1 |
| it | 08 05 | 8 5 | 1 1 |
| is | 08 12 | 8 2 | 1 2 |
| and | 11 26 13 | 1 6 3 | 2 3 2 |
| say | 12 11 06 | 2 1 6 | 2 2 1 |
| do | 13 08 | 3 9 | 2 1 |
| go | 15 09 | 5 9 | 2 1 |
| cat | 23 11 05 | 3 1 5 | 3 2 1 |
| and | 11 26 13 | 1 6 3 | 2 3 2 |
| way | 02 11 06 | 2 1 6 | 1 2 1 |
| say | 12 11 06 | 2 1 6 | 2 2 1 |
| cat | 23 11 05 | 3 1 5 | 3 2 1 |
| do | 13 08 | 3 9 | 2 1 |
| the | 05 16 03 | 5 6 3 | 1 2 1 |
| to | 05 09 | 5 9 | 1 1 |
| go | 15 09 | 5 9 | 2 1 |
| is | 08 12 | 8 2 | 1 2 |
| it | 08 05 | 8 5 | 1 1 |
| and | 11 26 13 | 1 6 3 | 2 3 2 |
| way | 02 11 06 | 2 1 6 | 1 2 1 |
| say | 12 11 06 | 2 1 6 | 2 2 1 |
| do | 13 08 | 3 9 | 2 1 |
| cat | 23 11 05 | 3 1 5 | 3 2 1 |
| the | 05 16 03 | 5 6 3 | 1 2 1 |
| to | 05 09 | 5 9 | 1 1 |
| go | 15 09 | 5 9 | 2 1 |
| is | 08 12 | 8 2 | 1 2 |
| it | 08 05 | 8 5 | 1 1 |

1.3 Exploiting Sparsity

Very few paths in the different dictionaries are used, and this sparsity can be exploited in several ways. With the One-Row Keyboard, we only supply the signature of the word; however, in most cases this reduced information is sufficient to uniquely identify not just the exact signature but also the exact word in the dictionary. In relatively few cases, however, there are several words with the same signature.

This sparsity also means that after a few keystrokes using a regular keyboard, a word can be identified without having to type in the remaining letters. The rest can then be added automatically, without typing. This "auto-completion" can also be taken advantage of when we use the One-Row Keyboard and the signature of the word. Of course, we expect to type more keystrokes before the exact signature has been pinpointed. Very often, however, the great sparsity in the signature dictionary means that we will have identified a unique signature before reaching the signature's end.

Then, if we decide to use these dictionaries to look up what a typed signature corresponds to, there are several questions that arise. For example:

1. How do we provide feedback to the user concerning the progress of the typing process?

2. How do we report and correct typing mistakes?
3. How do we best resolve ambiguities between words with similar signatures?
4. How do we best support auto-completion?
5. How do we automatically fix typos?
6. How do we quickly look up signatures, dual signatures, and words?
7. What makes a good dictionary?
8. How do we add words to a dictionary?
9. How do we customize dictionaries depending on contexts and on the user?

We address these in the next discussion below.

1.4 Reaching Beyond the Dictionaries

Punctuation marks and other standard symbols form an important part of written text. For a fast and seamless typing experience, it is essential that such characters can be typed in the same manner as letters, without a break in the typing flow. If one needs to bring up a special punctuation/character menu from which the correct mark can be selected, then delays are induced and loss of typing flow results.

Further, with respect to the QWERTY (or equivalent) keyboards that have common punctuation marks and extra characters adjacent to the letter keys, the experienced user already has an established pattern and existing "wiring" for such keys. To capitalize on the familiarity of this pre-wiring, for improved typing speed and ease of learning, a reduced keyboard may place such characters in more or less the same relative location as the standard QWERTY keyboard. For a preferred embodiment of the ORK, where we collapse the three rows into one, this translates into, for example, placing the period on the same key as O and L (or, more precisely, in the same equivalence class). The disambiguation engine then has to carry out the disambiguation such that an equivalence class may contain both letters used in the dictionary as well as other additional symbols. This can be achieved in several ways. One is to utilize a set of rules to create varied disambiguation results from pre-existing dictionary entries or other intermediate disambiguation results. Note that the application of such rules may be nested.

Here are a couple of specific instances of such possible rules:

Append a punctuation (such as : ; , ? ! or .) at the end of an entry so as to generate a match to the complete entered signature. For instance, the signature 6920 may be disambiguated as "How?" (Note how this further uses the Shift key to differentiate among a set of signatures: We use Shift to distinguish ? and ' from each other, just as we use Shift to distinguish 'H' from 'h'. For this example, we have made the assumption that ' replaces/on the QWERTY keyboard.)

In the same manner, 0069200 may be disambiguated as "how" if we assume that two consecutive instances of a single quote are to be taken as a double quote. Note that the opening and closing double quotes may be disambiguated independently of each other so that the double quotes may apply to words as well as to sentences. (This assumes that ' replaces/on the QWERTY keyboard.)

As an example of nesting, the sequence 00692000 may be disambiguated as "How?".

For reduced keyboards it is thus quite beneficial to support extended character sets. The legal character combinations are then not just those found in dictionaries, but also include combinations of a predefined set of legal combinations (as, for instance, given by a collection of dictionaries) with sets of other symbols. In terms of notations used in Section 1, we may include the extended set of characters as separate dual signatures corresponding to existing signatures, or we may extend the signature set as well. In the former case, we may then end up with keys as in the examples above, where there is a mixture of letters and symbols occuring in the dictionary together with symbols from the extended sets. In the latter case, for those extended characters that are assigned new signature(s), we can identify these as part of the extended character sets, and the treatment of such characters is simpler. For example, the standard solution for including symbols in the context of reduced keyboards is to put the extra symbols on separate keys (i.e., separate signatures) and then require an explicit choice of the symbol (i.e., specifying the dual signature), and then the choice of character is unique. In that particular case, what we add here is only to allow for predictive techniques to be used for symbols outside the set of legal combinations as prescribed by dictionaries.

Similarly, it is possible to extend the entire class of valid character combinations outside the combinations defined by each dictionary and specific sets of characters. For example, one dictionary may contain the constituent words of character combinations, and legal combinations are obtained by these words combined according to specific rules. If the simple dictionary consists of three words {print, queue, driver}, and it is agreed that words in this dictionary can be combined with the underline symbol '_', and still obtain a legal combination, then we see that combinations like print_queue, print_driver, etc., are valid. In general, a set of dictionaries and a set of character sets can be combined, using specific rules, to obtain an extended set of legal combinations.

A spell procedure is a standard aspect of a reduced keyboard. If a particular signature sequence is entered, and it cannot be found in the dictionary, the spell procedure allows the user to provide the extra information to identify a new legal character combination (and possibly add this combination to the dictionary). The standard spell procedure, used by T9, for example, is to use a separate process if the signature is not found. In the case of T9, this is usually done through "multitap": the key corresponding to the equivalance class of letters is typed repeatedly, and each letter in the class is uniquely associated with a specific number of taps. For example, for the standard cellphone implementation of T9, the number "2" corresponds to the letters "abc", and one press on "2" then identifies "a", two presses on "2" is "b", and three is "c". In terms of the representation using signature and dual signature, we may identify the number of key presses with the dual signature. With this, the letter "c", say, is given by (2, 3) (sits on the key "2" and requires "3" presses). The "number of key presses" may then be specified independently of the signature, using other keys or in any other manner that allows the user to indicate his choice of the dual signatures. In case the signature has already been entered, for example, only the dual signatures then need to be provided. To spell the word "act", for instance, we may press the keys "2", "2", and "8" to specify the signature. To now identify "act" among all the possible combinations with this signature, we may identify the sequence "1", "3", and "1" in some fashion. In this case, we may, for instance, have the keys for dual signatures "1", "2", "3", and "4" separate from the signature keys, and then the dual signatures can be provided at other times during the input process, not just after the signature has been entered.

More generally, for any reduced keyboard, the dual signatures can be entered independently of the signatures. Hence, if the signatures have been entered, the dual signatures can all be entered by allowing the user to identify the possible dual signatures one by one. If there is only one possibility for the dual signature, then that choice may be omitted. Additionally, the order in which the dual signatures are entered is also flexible; often we assume that the entry process goes in some predetermined order (typically from left to right or the other way around), but this is not necessary.

Further, different prediction techniques can be used to simplify the required user interaction as the spell process proceeds.

Notice that the independence of signature and dual signature is what allows the same key to be reused for specifying the dual signature once the signature is given. For example, by overloading "up/down" to pinpoint the dual signature in a list of possible interpretations, for each of the signature entries, is an example of the "signature, dual signature" representation of a character.

Comment 1.3 In the following discussion, we will describe various methods of carrying out various operations on a set of dictionary entries, sometimes utilizing the user feedback and input in the process. These methods will have as output possibly a second set of entries and, hence, are equivalent to mapping one set of entries onto another. More importantly, these methods can be used in stages such that the combined output of one or more stages can serve as input for another method. Various arrangements are possible of such combined mappings. For instance, punctuated endings from original dictionary entries may serve as input entries for an approximate typing stage which takes into account user typing errors. Thus, it is important to realize that when we talk of dictionary entries henceforth, these should be understood not only as the original dictionary entries, but also as any permutation and combination of a constructed set of entries arising from any of these methods.

Similarly, in the following, we will refer to duals of a signature sequence as valid alternatives. It is important to realize that these valid alternatives may actually be a result of an approximate matching process or a rule-based dictionary mapping or for that matter any mapping produced by such a method. Thus, these duals that we refer to may not be exact duals of the entered or dictionary entry signatures, but simply a mapping. A specific instance we will discuss later, is how a set of auto-completion alternatives may be generated for each of the valid duals of an entered signature sequence that is being typed. In that case, the valid dual may actually arise from the approximate matching method and thus may not be an exact dual of the signature entered by the user.

2 Approximate Typing

2.1 User Input and Reduced Keyboards

One of the drawbacks of using a reduced keyboard is the fact that when the user has entered a set of keystrokes and the feedback from the device does not coincide with the user's intentions, it is often hard to identify the underlying reason. Sometimes the unexpected behavior is a consequence of the intended character combination not being in a dictionary. Probably much more frequently, however, the explanation is a typing mistake. It is often hard for the user to decide exactly at what point a mistake was made since the entered key sequence is not in one-to-one correspondence with a character sequence. Rather than trying to understand where the error occurred, the user then often ends up erasing the entire combination and starting again. This is particularly frustrating when the input sequence is long, and, unfortunately, this is also when typing errors frequently occur.

A similar problem is encountered when the user is not quite sure how to spell a certain word or only knows parts of the word or character combination. With a standard keyboard, one way to handle such a situation is to enter an approximation of the intended word, and the meaning is still likely to be communicated to the reader. With a reduced keyboard, this approach is rarely available since the character combination on the screen is typically quite different than that of the intended word. To remedy this, the user may then try to experiment with different potential spellings to reach the correct one, and, if he fails, he may experience not just a sense of interruption of typing flow, but of actually being stuck. This is a serious drawback of any reduced keyboard and should be addressed.

In the following, we consider the case when the input from the user is not quite correct or at least the entered signature sequence is not matching that of the word the user intended. The basic assumption we shall make is that the entered signature sequence is approximately correct and, hence, there is a similarity between the intended signature sequence and the one entered.

The user intends to input a sequence of words (or other character combinations) $w_i$, $i=0, \ldots, N$, often collected in a sentence s:

$$s = w_0 w_1 \ldots w_N. \qquad (7)$$

(What constitutes the appropriate delimiter for the different character combinations $w_i$ and for the sentences s is of no real significance for the current discussion.) Using a reduced keyboard R (see Comment 1.1 above), the user provides input to the system, and based on this input, the system provides feedback to the user; see FIG. 3. In the case of a reduced keyboard, the input is typically ambiguous, so part of the task for the system is to disambiguate the different interpretations and provide possible predictions based on the user input. The user can then provide more input to the system by selecting between different possibilities for the character combination wi under consideration.

The user input is of course assumed to be a reflection of the user's intentions. For a reduced keyboard, the normal assumption is that the signature is the correct one; however, if we add the complication that the user may have mistyped, then the signature sequence may not be the intended or desired one and, hence, the system cannot rely on the accuracy of the signature for its predictions.

The signature will still serve as an important indication of the user's intent, but the ambiguity may increase if we allow the user to only provide an approximation of the intended input.

More specifically, in the case of a reduced keyboard, each keystroke by the user represents an equivalence class of unique characters. Hence, with a certain sequence of keystrokes, a unique set of character combinations, consistent with the equivalence classes of each key, is generated. Let us call this set of character combinations the "input set." The reduced keyboard then works with a disambiguation process to prioritize among the character combinations in the input set in order to provide the user with feedback for possible further interaction.

In the case of approximate typing on a reduced keyboard, the user's keystrokes generate a larger class of possible character combinations and the disambiguation process operates on this larger class. For example, besides the input set of character combinations corresponding to the exact keystrokes, there may be other possible keystrokes, each with its own set of character combinations, that enter into the disambiguation process, and different rules and methods may be used by the disambiguation process for determining how all of these should be weighed. The regular approach for typing on a reduced keyboard is when only one set of character combinations (the input set) enters into the disambiguation process, and, at the opposite end of the spectrum, we have the situation when the disambiguation process uses all possible keystrokes and weighs these based on the actual user input.

2.2 A Probabilistic Analysis

To illustrate some of the issues involved and to gain some further insights into effective disambiguation processes for approximate typing on reduced keyboards, we shall consider a maximum likelihood approach.

Let us for now consider just the single character combination w in isolation and ignore that some of the probabilistic information may be obtained from context and other parts of this or other sentences. It will be convenient to simplify the discussion to a real-time, on-the-fly type of processing where there is a specified order, say left to right. We assume further that the user has in mind the character combination $v = c_0 \ldots c_I$, and, in the process of entering input corresponding to this target, he enters certain keystrokes. The user's actual keystrokes correspond to the signature $\sigma^a = \sigma_0^a \ldots \sigma_J^a$, and his target signature is $\sigma^v = \sigma_0^v \ldots \sigma_I^v$. (Notice, in particular, that the number J+1 of actual keystrokes may not be the same as the the intended number I.)

From a maximum likelihood point of view, we are interested in finding the best solution $$\hat{v} = \arg\max_v \text{Prob}(v|\sigma^a), \qquad (8)$$

where the maximum is takeh over all the intended words v. More generally, we may also consider the N-best solutions $$\vec{v} = \vec{v}^{(N)} = \text{N-arg max}_v \text{Prob}(v|\sigma^a). \qquad (9)$$

In order to solve (8) (the same argument applies to (9)), we notice that by the definition of conditional probability and since the keystrokes actually entered do not change, the right-hand side equals $$\begin{aligned}\arg\max_v \text{Prob}(v|\sigma^a) &= \\ \arg\max_v \text{Prob}(v, \sigma^a) &= \arg\max_v \text{Prob}(v, \sigma^v, \sigma^a) = \\ &\arg\max_u \text{Prob}(v|\sigma^v, \sigma^a)\text{Prob}(\sigma^v|\sigma^a)\end{aligned} \qquad (10)$$

It is a reasonable approximation to say that the first factor here, $\text{Prob}(v|\sigma^v,\sigma^a)$, is independent of $\sigma^a$. (In other words, learning the value of $\sigma^a$ does not provide any additonal information about v once we know $\sigma^v$; v and $\sigma^a$ are conditionally independent given $\sigma^v$; cf. [48].) If we accept that, we get $$\hat{v} \approx \arg\max_v \text{Prob}(v|\sigma^v)\text{Prob}(\sigma^v|\sigma^a) \qquad (11)$$

(It is easy to come up with examples that suggest that the approximation sometimes is not very precise. Some typing errors are probably more likely to occur for certain specific letter combinations in a group of combinations with the same signature.) This factorization is easy to understand. The first factor corresponds to the maximum likelihood prediction of the regular reduced keyboard, disregarding typing errors. The second factor depends on the probabilities of typing errors as the user keys in a certain signature. For the optimal solution, the product is formed between the probability of a character combination, given an intended signature, and the probability for a signature being the intended one, given the actual input, and then the largest such product is found.

It is not entirely obvious how to estimate the second factor $\text{Prob}(\sigma^v|\sigma^a)$ in (11) based on some specific sampling statistics. In contrast, the probability $\text{Prob}(\sigma^a|\sigma^v)$ is easy to obtain; for example, just start typing the intended word v over and over, and then observe the actual signatures typed. With this in mind, we shall rewrite (11) using Bayes formula:

$$\text{Prob}(\sigma^v | \sigma^a) = \frac{\text{Prob}(\sigma^a | \sigma^v)\text{Prob}(\sigma^v)}{\text{Prob}(\sigma^a)} \qquad (12)$$

Inserting this into (11) we find $$\hat{v} \approx \arg\max_v \text{Prob}(v|\sigma^v)\text{Prob}(\sigma^a|\sigma^v)\text{Prob}(\sigma^v). \qquad (13)$$

EXAMPLE 2.1

The signatures of the character combinations "wondr" and "slyer" are the same. Let us call the signature $\sigma^a$. Only the latter of these combinations is an English word. Hence, if the user enters this signature $\sigma^a$, a disambiguation system based on exact signature entry will display "slyer." However, let us look at probabilities:

$$\text{Prob}(\text{wonder}) \approx 6.5 \cdot 10^{-5} \quad \text{Prob}(\text{slyer}) \leq 2.7 \cdot 10^{-7} \qquad (14)$$

(These are estimates using Corpus 1 and Corpus 2; there are approximately 240 occurances of "wonder" and no occurrences of "slyer" among the approximately 3.7 million words in these two corpora.) In addition, we notice that it is very easy to misspell "wonder" since the two letters "d" and "e" sit on the same key and the letter "r" is next to them. Hence, the probability is quite high for entering the signature of "wondr"/"slyer" when we intend to enter the signature of "wonder."

Let us assume that "wonder" is the only valid character combination corresponding to the signature of that word and similarly for "slyer." Then the disambiguation system should favor "wonder" ahead of "slyer" (if it is based on the maximum likelihood estimation and the approximation (11) as long as $$\text{Prob}(\sigma^{v^{(1)}}|\sigma^a) > \text{Prob}(\sigma^{v^{(2)}}|\sigma^a) \qquad (15)$$

with $v^{(1)}$=wonder and $v^{(2)}$=slyer. Equivalently, using (13) instead, this happens exactly when $$\text{Prob}(\sigma^a|\sigma^{v^{(1)}})\text{Prob}(\sigma^{v^{(1)}}) > \text{Prob}(\sigma^a|\sigma^{v^{(2)}})\text{Prob}(\sigma^{v^{(2)}}). \qquad (16)$$

Since we are assuming that there is only one word with the signature $\sigma^{v^{(1)}}$ and one with $\sigma^{v^{(2)}}$, by the sampling estimate above we have $$\text{Prob}(\sigma^{v^{(1)}}) = \text{Prob}(\text{wonder}) \approx 6.5 \cdot 10^{-5} \quad \text{Prob}(\sigma^{v^{(2)}}) = \text{Prob}(\text{slyer}) \leq 2.7 \cdot 10^{-7} \qquad (17)$$

Hence, inserting this into the inequality (16), we see that the criterion is essentially $$\text{Prob}(\sigma^a|\sigma^{v^{(1)}}) > \text{Prob}(\sigma^a|\sigma^{v^{(2)}})/250. \qquad (18)$$

In other words, unless the user is approximately 250 times more likely to type the signature of "slyer" correctly compared to his likelihood of entering the signature of "wondr" when he had "wonder" in mind, the disambiguation system should favor "wonder" instead of "slyer". (In fact, the actual number may be considerably higher than 250 times since there were no occurrences of "slyer" in the corpora while there were 240 occurrences of "wonder".) For User 1, a small sample experiment indicates that the actual probabilities are $$\text{Prob}(\sigma^a|\sigma^{v(1)}) \approx 0.05$$

$$\text{Prob}(\sigma^a|\sigma^{v(2)}) \approx 0.97. \quad (19)$$

Hence, we have $$\text{Prob}(\sigma^a|\sigma^{v(1)})\text{Prob}(\sigma^{v(1)}) \approx 3.25 \cdot 10^{-6}$$

$$\text{Prob}(\sigma^a|\sigma^{v(2)})\text{Prob}(\sigma^{v(2)}) \leq 2.7 \cdot 10^7. \quad (20)$$

So, at least for User 1, it is more than 10 times as likely that he has mistyped "wonder" than intending to type "slyer."

This probabilistic analysis makes it clear that we may obtain a significantly better prediction of the user's intentions with an approximate typing system compared with the normal assumption of exact typing. In particular, we may improve the user's overall typing experience. In spite of this, there still may be reasons to assume that the keystrokes exactly reflect the user's intentions. For example, this assumption may result in a lower complexity of the disambiguation system and less expensive searches since the set of valid alternatives is smaller. It may also be hard to find the probabilities for different typing errors: the typing errors may not only be highly dependent on the user, but also the context and the typing speed (transpositions are good examples of errors highly dependent on the speed). And, the user may operate in a mode of making absolutely certain that no typing errors are entered.

However, a user typing on a reduced keyboard is especially prone to some typing errors. So it may be argued that it is particularly important to allow for approximate typing on these keyboards. If there are drawbacks of an approximate typing system, then there are often different methods to alleviate these. For example, in order to reduce the set of possible interpretations of entered signatures, we may consider a threshold based on probability of occurrence of certain errors or character combinations. A similar thresholding technique is implicitly already built into the typical approaches for "exact typing," since there is always the possibility that the user enters a character combination that does not correspond to anything generated by the dictionary. (To handle this, the reduced keyboard uses a "spell" mode.)

There are a number of additional ways to reduce the extra complexity of approximate typing. The disambiguation system may use the basic assumption that the entered signature is correct, and then have an associated set of alternative character combinations consistent with the signature, and then have a second set relying on approximations of the entered signature. This second set can then be used, for instance, if the user indicates with a key press (or some other way) that the first displayed alternatives are insufficient.

A probabilistic assessment of different alternatives may be unnecessary if we are willing to let the user decide between the alternatives that the disambiguation system generates.

In other situations, even rather crude estimations are satisfactory for finding character combinations to present to the user. In the case of long words, for example, it is more likely that the entered character combination singles out the intended word with great certainty and that most of the other combinations are quite improbable. Since it is particularly frustrating for the user to enter a large number of characters and then to not obtain the intended word, this case alone means that even a rather crude approximate typing system may have a great impact on the user's experience.

Approximate typing does not have to rely on probabilistic analysis at all. Fundamentally, approximate typing relies on pattern recognition for its predictions. In this setting, the registered pattern is the actual keystrokes $\sigma^a$, and the objective is to find the label $\sigma^v$ of the intended signature word v. As a consequence there are many different methods that we may use. For example, there are different types of rule-based approaches, neural networks, entropy-based methods, etc., and then combinations of all of these. Next we shall look at a simple way of measuring the similarities of the entered signature with that of other character combinations.

2.3 The Standard Edit Distance

To measure the similarity between the entered signature and that of other combinations, there are many possible approaches. One is to use different similarity measures. For example, we may introduce a cost function to measure how well the entered sequence approximates the intended sequence. As a special case of this, we may look for different (pseudo-)distance functions with the basic property that an increase in distance corresponds to less similarity. A commonly used distance function or, more precisely, family of distance functions is based on the so-called edit distance.

The edit distance is typically used with the common alphabet and symbols (including the empty symbol $\epsilon$); cf. [27], [60], [21]. Here we shall use it with the ORK and with signature sequences. For now, we shall assume that each keystroke on the ORK is identified with a unique number $\sigma=0,\ldots 9$, and each signature sequence is given by a string $$\sigma = \sigma_1 \sigma_2 \ldots \sigma_N. \quad (21)$$

The empty string is denoted by $\epsilon$. The basic idea behind the edit distance is to have a set of elementary transformations $T=\{T_i\}$ and a set of costs $C=\{C_i\}$ for applying each one of these. Then the edit distance $ed(\sigma^A, \sigma^B)$ from the sequence $\sigma^A$ to $\sigma^B$ is the minimal cost of any sequence of transformations, applied one after the other, that transforms $\sigma^A$ into $\sigma^B$. Typically, it is assumed that the overall cost is additive and, hence, is obtained from each of the individual costs by adding them.

The standard, most basic edit distance uses the transformations insertion ($\epsilon \to \sigma$, where $\sigma$ is a symbol in the alphabet used), deletion ($\sigma \to \epsilon$), and substitution ($\sigma_1 \to \sigma_2$), and each is assigned a cost of 1. Notice that insertion and deletion are converse to each other, and that insertion has the effect of replacing two consecutive symbols $\sigma_1 \sigma_2$ by the triplet $\sigma_1 \sigma_3 \sigma_2$ (remember the empty symbol $\epsilon$ is allowed, so this allows us to insert a symbol at the beginning or the end of a string of symbols).

With the edit distance, the approximate string matching is viewed as an alignment problem. A couple of examples will illustrate this (the examples come from [21]).

EXAMPLE 2.2

The edit distance from "food" to "money" is at most four. A sequence of transformations is given by food→mood→mon̂d→moned→money A more instructive way to display this is to put one word on top of the other with a gap in the top one for every insertion and a gap in the bottom one for every deletion. In this way, columns with different symbols correspond to substations, and the number of editing steps and the total editing cost is the number of columns with non-equal entries. For the example above we have

| f o o d |
| m o n e y |

So, ed(food, money)$\leq 4$, and in this case it is not hard to see that it is exactly four. With longer words it is not as clear when we have obtained the optimal set of transformations. For example, here is a more complex situation.

| a l g o r i t h m |
| a l t r u i s t i c |

Clearly, the ed(algorithm, altruistic)$\leq 6$, but it is not obvious whether there is a better set of transformations, with a lower total cost.

Using the notation from the above example, the key observation in order to efficiently find the optimal set of transformations is the following: if we remove the last column for an optimal set of transformations, the remaining columns must represent the shortest edit sequence for the remaining substrings. Otherwise, if the substrings had a shorter edit sequence, we could just append the last column and get an overall shorter edit sequence.

Using this observation, it is easy to obtain a recursive algorithm for obtaining the edit distance between two strings. Let us introduce the function $E(i,j)=E(i,j,\sigma^A,\sigma^B)$ for $i=0, \ldots, \#\sigma^A$ and $j=0, \ldots, \#\sigma^B$ defined as the minimal cost (or effort) to transform the subsequence $\sigma^i$ of the i first characters in $\sigma^A$ into the subsequence $\sigma^j$ of the j first characters in $\sigma^B$. Obviously, $E(0,0)=0$ and $E(i,0)=i$ since the optimal way to convert a sequence with i characters into the empty string is with i deletions. Similarly, $E(0,j)=j$ and the optimal transformations are just j insertions. With this we have the necessary initialization to get the recursion going as long as we find a way to express how to add the last column in the editing process. If both rows of the last column contain a character, then the optimal, last editing step is a substitution and the total cost becomes $E(i-1,j-1)+[\sigma_i^A \neq \sigma_j^B]$ (where $[\sigma_i^A \neq \sigma_j^B]$ 0 if the i:th character of $\sigma^A$ is the same as the j:th character of $\sigma^B$ and 1 otherwise). On the other hand, if the top row contains an empty character and the bottom one a non-empty one, then we have an insertion, and the total cost is $E(i,j-1)+1$. If we have a non-empty character on the top row and an empty one on the bottom, then the corresponding operation is a deletion and the total cost is $E(i-1,j)+1$. The optimal choice is the minimum of these three alternatives:

$$E(i,j)=\min\{E(i-1,j-1)+[\sigma_i^A \neq \sigma_j^B], E(i,j-1)+1, E(i-1,j)+1\} \qquad (22)$$

With the initialization $$E(0,j)=j \qquad (23)$$

$$E(i,0)=i, \qquad (24)$$

we may recursively go through the equation (22) and obtain the $$ed(\sigma^A, \sigma^B)=E(m, n) \text{ with } m=\#\sigma^A \text{ and } n=\#\sigma^B. \qquad (25)$$

More general transformations are often quite easy to add. For example, if we also want to allow for transpositions of adjacent characters, then it is not enough to just consider the last column, since this type of transposition affects two characters. Instead, we have to consider the last two columns. The total cost for the transposition is then $E(i-2,j-2)+1+[\sigma_{i-1}^A \neq \sigma_j^B]+[\sigma_i^A \neq \sigma_{j-1}^B]$ when $i,j \geq 2$ and $$E(i,j) = \min \begin{cases} E(i-1, j-1) + [\sigma_i^A \neq \sigma_j^B], \\ E(i, j-1) + 1, \\ E(i-1, j) + 1, \\ E(i-2, j-2) + 1 + [\sigma_{i-1}^A \neq \sigma_j^B] + [\sigma_i^A \neq \sigma_{j-1}^B]. \end{cases} \qquad (26)$$

2.4 Some Sample Errors using the ORK

In this section, we shall start by collecting some hopefully representative typing errors.

Some sample typing errors

| # | Intended | Signature | Typed | Signature | Last in dict. |
|---|---|---|---|---|---|
| 1. | catalogue | 2040884628 | catalbmc | 204084628 | catal |
| 2. | out | 864 | oms | 861 | lux |
| 3. | reference | 323232522 | reverycc | 32323522 | revery |
| 4. | while | 15782 | shille | 157882 | shille |
| 5. | encyclopedia, | 2525288922707 | ench. | 25258 | ench |
| 6. | large | 80342 | laveb | 80324 | lave |
| 7. | girls. | 473818 | give.s | 473281 | tirel |
| 8. | catalogue. | 2040884628 | catalombc | 204088642 | catalo |
| 9. | order | 83223 | over | 8323 | over |
| 10. | answer, | 0511237 | ansccv | 051223 | ans |
| 11. | which | 15725 | winkeh | 175725 | winke |
| 12. | following | 388881754 | followibh | 388881745 | followi |
| 13. | idea | 7220 | kea | 720 | ke |
| 14. | enjoy | 25685 | chun.h | 256585 | chun |
| 15. | suggestions | 16442147851 | suggestins | 1644214751 | suggestin |
| 16. | magazines. | 6040075218 | magazins | 60400751 | magazin |
| 17. | title | 47482 | titilc | 474782 | titil |
| 18. | school | 125888 | schooi | 125887 | schoo |
| 19. | chairs. | 2507318 | chaires. | 25073218 | chaire |
| 20. | classroom | 280113886 | classrom | 28011386 | classro |
| 21. | aim | 076 | ainm | 0756 | ain |

-continued

Some sample typing errors

| # | Intended | Signature | Typed | Signature | Last in dict. |
|---|---|---|---|---|---|
| 22. | such | 1625 | sush | 1615 | sush |
| 23. | these | 45212 | byes | 4521 | thes |
| 24. | conveniently? | 2853257254859 | confidhc | 28537252 | confid |
| 25. | bulletin | 46882475 | gulleybih | 468825475 | gulley |
| 26. | decide | 222722 | deceicc | 2222722 | decei |
| 27. | shelves, | 15283217 | she.c | 15282 | shel |
| 28. | letter | 824423 | lege | 8242 | lege |
| 29. | labels | 804281 | labos | 80481 | labo |
| 30. | something. | 1862457548 | somethinc. | 1862457528 | somethin |
| 31. | slogans. | 18840518 | sobahs. | 1840518 | sob |
| 32. | giving | 473754 | biting | 474754 | biting |
| 33. | thought | 4586454 | though | 458645 | though |
| 34. | business | 46175211 | guishcs | 4671521 | guis |
| 35. | opposite. | 899817428 | opposit. | 89981748 | opposit |
| 36. | these | 45212 | ther | 4523 | ther |
| 37. | followed? | 388881229 | rolls.cc | 38881822 | rolls |
| 38. | request | 3206214 | reamsb | 320614 | reams |
| 39. | expressed | 219321122 | exprescc | 21932122 | expres |
| 40. | correct? | 28332249 | corvet? | 2833249 | corvet |
| 41. | followed? | 388881229 | foolsccc? | 388812229 | foolsc |
| 42. | checking | 25227754 | endiiihb | 25277754 | endi |
| 43. | necessary | 522211035 | neessavh | 52211035 | nee |
| 44. | which | 15725 | wien | 1725 | wien |
| 45. | conservation | 285123304785 | consera | 2851230 | conser |
| 46. | holds | 58821 | nod | 582 | nod |
| 47. | muddy? | 662259 | muddch? | 6622259 | mudd |
| 48. | topic | 48972 | bloke | 48872 | booke |
| 49. | language | 80546042 | languavc | 80546032 | langua |
| 50. | topic | 48972 | topicc | 489722 | topic |

Let us look a little closer at these errors. First of all, the first three signatures are correct for all entries except for errors 2, 11, 13, 21, 22, 32, 34, 44, 46, and 48. The first four signatures are correct except for these errors and, additionally, errors 6, 7, 9, 10, 14, 26, 28, 29, 31, 36, 42, and 43. In many cases, the error causes the signature sequence not to be in the dictionary. Two common errors are transposition and "double-typing" a signature that should only occur once or, vice versa, "single-typing" when it should be "double-typed." This seems particularly common for signatures 8, 1, and 2. In the next table we have collected various observations. In the column "Leaving dict." we have recorded whether the error is causing the typed signature not to be in the dictionary; "Desired transf." is an attempt to see what transformation is needed to correct the error or get the user back on track in typing after an error has occurred, and "Unique compl. before" indicates whether the error could have been avoided by just using a uniqueness-based auto-completion before the error occurred. The underscore in the "Typed signature" column indicates where the signature leaves the dictionary. If we count the relative position of a character with respect to this underscore, letting the first character after the underscore correspond to 0 and the one to the left of the underscore (hence still corresponding to something in the dictionary) be −1, then we may identify the first character to be changed. This then gives us information up to what point the edit distance (in the recursive formulation we just went through) is 0. This location of the first character impacted by the typing error is recorded in the column "1st character loc."

Some observations for sample typing errors

| # | Leaving dict. | Desired transf. | Unique compl. before | Intended signature | Typed signature | 1st character loc. |
|---|---|---|---|---|---|---|
| 1. | y | 8 → 88 | n | 2040884628 | 20408_4628 | 0 |
| 2. | ? | 1 → 4 | n | 864 | 861 | — |
| 3. | y | 3 → 32 | n | 323232522 | 323235_22 | −1 |
| 4. | y | 88 → 8 | n | 15782 | 157882 (?) | — |
| 5. | y | 8 → 28 | n | 2525288922707 | 25258_ | −1 |
| 6. | y | 24 → 42 | n | 80342 | 8032_4 | −1 |
| 7. | y | 32 → 3 | n | 473818 | 47328_1 | −2 |
| 8. | y | 64 → 46 | n | 2040884628 | 204088_642 | 0 |
| 9. | n | 2 → 22 | n | 83223 | 8323 | — |
| 10. | y | 2 → 1 | n | 0511237 | 051__223 | 0 |
| 11. | y | 757 → 57 | n | 15725 | 17572_5 | −4 |
| 12. | y | 45 → 54 | n | 388881754 | 3888817_45 | 0 |
| 13. | y | 2 → 22 | n | 7220 | 720 | 0 |
| 14. | y | 58 → 85 | n | 25685 | 2565_85 | 0 |

-continued

Some observations for sample typing errors

| # | Leaving dict. | Desired transf. | Unique compl. before | Intended signature | Typed signature | 1st character loc. |
|---|---|---|---|---|---|---|
| 15. | y | 7 → 78 | n | 16442147851 | 164421475_1 | −1 |
| 16. | y | 1 → 21 | y | 6040075218 | 6040075_1 | 0 |
| 17. | y | 7 → ϵ | n | 474827 | 47478_2 | −2 |
| 18. | y | 87 → 88 | y | 125888 | 12588_7 | 0 |
| 19. | y | 21 → 1 | n | 2507318 | 250732_18 | −1 |
| 20. | y | 8 → 88 | y | 280113886 | 2801138_6 | 0 |
| 21. | y | 56 → 6 | n | 076 | 075_6 | −1 |
| 22. | y | 2 → 1 | n | 1625 | 1615_ | −2 |
| 23. | n | 1 → 12 | n | 45212 | 4521 | ? |
| 24. | y | 7 → 2 | n | 2853257254859 | 285372_52 | +1 |
| 25. | y | 54 → 4 | n | 46882475 | 468825_475 | −1 |
| 26. | y | 22 → 2 | n | 222722 | 22227_22 | −2 |
| 27. | y | 2 → 32 | n | 15283217 | 1528_2 | 0 |
| 28. | y | 4 → 44 | n | 824423 | 8242_ (?) | −1 |
| 29. | y | 4 → 42 | n | 804281 | 8048_1 | −1 |
| 30. | y | 2 → 4 | y | 1862457548 | 18624575_28 | 0 |
| 31. | y | 8 → 88 | n | 18840518 | 184_0518 | −1 |
| 32. | n | 4 → 3 | n | 473754 | 474754 | — |
| 33. | n | ϵ → 4 | n | 4586454 | 458645 | — |
| 34. | y | 71 → 17 | n | 46175211 | 4671_521 | −2 |
| 35. | y | 4 → 42 | n | 899817428 | 8998174_8 | 0 |
| 36. | n | 3 → 1 | n | 45212 | 4523 | — |
| 37. | y | 8 → 88 | n | 388881229 | 38881_822 | −1 |
| 38. | y | 1 → 21 | n | 3206214 | 32061_4 | −1 |
| 39. | y | 1 → 11 | n | 219321122 | 219321_22 | 0 |
| 40. | y | 2 → 22 | n | 28332249 | 283324_9 | −1 |
| 41. | y | 8 → 88 | n | 388881229 | 388812_229 | −2 |
| 42. | y | 27 → 22 | n | 25227754 | 2527_7754 | −1 |
| 43. | y | 2 → 22 | n | 522211035 | 522_11035 | 0 |
| 44. | n | ϵ → 5 | n | 15725 | 1725 | — |
| 45. | y | 3 → 33 | n | 285123304785 | 285123_0 | 0 |
| 46. | n | 8 → 88 | n | 58821 | 582 | — |
| 47. | y | 22 → 2 | n | 662259 | 6622_259 | 0 |
| 48. | n | 88 → 89 | n | 48972 | 48872 | — |
| 49. | y | 3 → 4 | y | 80546042 | 805460_32 | 0 |
| 50. | y | 22 → 2 | n | 48972 | 48972_2 | 0 |

There seem to be four different types of errors that we may identify in these tables.
1. Errors with the user continuing to perceived end of the word;
2. Same as previous but with punctuation marks;
3. Errors for which the user stopped typing before reaching the end; and
4. Errors that result in a different legal word.

For the two first types of errors, the error distance probably provides a good approach. For the third type, a Beginning Of Word (BOW) based edit distance is probably better. Also, for these types of errors, the detection typically happens at the beginning of the word when an intelligent backspace may provide a good solution. The last type seems to require another approach using the alternatives that are presented to the user.

So, for now let us focus on errors of the first type. First, we consider the complexity of using the edit distance to identify candidate words corresponding to the signature sequence the user has input. We identify candidate sequences by calculating the edit distance (we shall use the edit distance with four basic operations, i.e., include transpositions). To calculate the edit distance, we use dynamic programming and obtain the edit distance by calculating the cost (effort) matrix. Hence, for each candidate sequence, the complexity is proportional to the number of entries in this matrix we have to calculate. This means that if we make the assumption that the four first characters of the input sequence are correct, then the number of entries we need to calculate is significantly reduced. For example, say that the cost matrix is of dimensions 8×8. Then, by the assumption about the first four keystrokes being correct, the resulting number of calculations is reduced from approximately 8×8 to 4×4, i.e, about a quarter. This effect is then further amplified by the fact that the number of candidate words that we have to consider decay essentially exponentially with the number of keystrokes we assume to be correct.

In addition, we see from the tables above that the typing error typically occurs close to the point of leaving the dictionary. In fact, in most cases the error occurs within two characters of the exit point. In terms of the calculation of the cost matrix, this means that only a submatrix of size 4×4 needs to be considered. However, the overall savings in not having to calculate the cost matrix for each candidate towards the end of the signature sequence is less since there are fewer and fewer words that are candidates towards the end of the input sequence.

Now, if we use the edit distance to identify candidate words that may correspond to the intended input sequence, it often happens that there are several candidates within, say, an edit distance 1. Then there are several criteria we may use to further refine the selection of such candidates. The simplest is to order these candidates according to probability of use, but there are many other ways as well. For instance, we may introduce different costs for different types of errors. If we choose that approach, transpositions should probably have a low cost (see the tables above) and so should the errors 88→8, 8→88, 22→2 and 2→22. Also, errors that occur close to the exit point compared to errors far from this point (of leaving the dictionary) should have a lower cost. However, these more refined considerations may not be necessary, since the edit distance combined with frequency ordering is remarkably accurate.

tions of the user's intentions based on the actual entered signature. Heuristically, we would expect alternatives with a larger edit distance to be less likely than signatures with a smaller distance. This type of reasoning is often sufficient to order the alternatives for the user to choose from; however, identifying more precise connection between probabilities and the edit distance requires some further analysis.

| Candidate words within a small edit distance from typed signature | | | | | | | |
|---|---|---|---|---|---|---|---|
| # Intended | Signature | Typed | Signature | Candidate | Signature | Edit distance | Rel. frequency |
| 1. catalogue | 2040884628 | catalbmc | 204084628 | catalogue | 2040884628 | 1 | 2317 |
| 3. reference | 323232522 | reverycc | 32323522 | reference | 323232522 | 1 | 7496 |
| | | | | referred | 32323322 | 1 | 5834 |
| | | | | referee | 3232322 | 1 | 1100 |
| | | | | reversed | 32323122 | 1 | 1096 |
| | | | | reverend | 32323252 | 1 | 561 |
| | | | | reverted | 32323422 | 1 | 284 |
| | | | | reverence | 323232522 | 1 | 248 |
| | | | | revered | 3232322 | 1 | 183 |
| | | | | fevered | 3232322 | 1 | 65 |
| | | | | refereed | 32323222 | 1 | 23 |
| 12. following | 388881754 | followibh | 388881745 | following | 388881754 | 1 | 26288 |
| 15. suggestions | 16442147851 | suggestins | 1644214751 | suggesting | 16442214754 | 1 | 2233 |
| | | | | suggestions | 16442147851 | 1 | 1899 |
| 16. magazines | 604007521 | magazins | 604007 | magazine | 60400752 | 1 | 4456 |
| | | | | magazines | 604007521 | 1 | 1589 |
| 20. classroom | 280113886 | claasrom | 28011386 | classroom | 280113886 | 1 | 2111 |
| 35. opposite | 89981742 | opposit | 8998174 | opposite | 89981742 | 1 | 5492 |
| | | | | opposing | 89981754 | 1 | 913 |
| 37. followed | 38888122 | rolls.cc | 388818 | followed | 38888122 | 1 | 14592 |
| 39. expressed | 219321122 | exprescc | 21932122 | expressed | 219321122 | 1 | 6994 |
| 40. correct | 2833224 | corvet | 283324 | correct | 2833224 | 1 | 6046 |
| | | | | coffee | 283322 | 1 | 5724 |
| | | | | coffer | 283323 | 1 | 23 |
| | | | | doffed | 283322 | 1 | 17 |
| 47. muddy | 66225 | muddch | 662225 | muddy | 66225 | 1 | 603 |
| 49. language | 80546042 | languavc | 80546032 | language | 80546042 | 1 | 17960 |
| 50. topic | 48972 | topicc | 489722 | topic | 48972 | 1 | 2297 |
| | | | | topica | 489721 | 1 | 1838 |

2.5 Modifying the Edit Distance

One of our basic goals in this section is to describe an effective disambiguation system for approximate typing using a reduced keyboard. We have used the maximum likelihood approach to illustrate some of the issues, cf. Subsection 2.2. If we base our design on this approach and equation (11) or (13), then we are faced with the problem of finding estimates for Prob($\sigma^v|\sigma^a$) (in the case of equation (11)) or Prob($\sigma^a|\sigma^v$) (in the case of equation (13)). These expressions reflect the probabilities for typing errors, and one possibility is to experimentally go ahead and type a lot and obtain estimates for either of these and then store these approximations. This is in principle quite straightforward, but the storage requirements may easily make this impractical. Another possibility is to instead establish a model for these probabilities, and then use the model to calculate the required conditional probabilities at runtime by comparing the entered signature against valid character combinations. The challenge with this may be the search time. The modelling approach is what we shall consider more closely in this and the next couple of subsections. As a general observation, the problems and challenges are quite similar to those encountered in connection with machine translation from one language to another; cf. [34], p. 219, [31], p. 576, [41], p. 589, [8], and [47].

The models we shall explore here use the edit distance. The standard edit distance works surprisingly well as a similarity measure in order to identify possible interpreta- We start with a general observation concerning measures of similarity and probabilities. Suppose we have a measure C that measures similarity in such a way that a small value of C($\sigma^v,\sigma^a$) corresponds to the signatures $\sigma^v$ and $\sigma^a$ being similar or close. Suppose the user intends to type the signature $\sigma^v$. Suppose further that he sometimes enters $\sigma^{a1}$ and sometimes $\sigma^{a2}$. Now, if the user is more likely to enter $\sigma^{a1}$ than $\sigma^{a2}$, then it seems that, at least for this user, $\sigma^{a1}$ is closer to $\sigma^v$. In other words, it seems desirable to require $$\text{Prob}(\sigma^{a2}|\sigma^v) \geq \text{Prob}(\sigma^{a1}|\sigma^v) \Rightarrow C(\sigma^v,\sigma^{a2}) \geq C(\sigma^v,\sigma^{a1}). \quad (27)$$

Similarly, it is reasonable to expect that C should satisfy $$\text{Prob}(\sigma^v|\sigma^{a2}) \leq \text{Prob}(\alpha^v|\sigma^{a1}) \Rightarrow C(\sigma^{a1},\sigma^v) \geq C(\sigma^{a1},\sigma^v). \quad (28)$$

Assuming now that C is defined on all pairs of signatures (including those not necessarily corresponding to valid signatures) these two equations (27) and (28) are consequences of the monotonicity property $$\frac{1}{Prob(\sigma^A | \sigma^B)} \uparrow \Rightarrow C(\sigma^A,\sigma^B) \uparrow. \quad (29)$$

In order to guarantee the property (29), we must have access to the actual conditional probabilities. As we noted above, this may sometimes be infeasible and so we are now instead looking for a model of these conditional probabilities. Let us call these model probabilities $p(\sigma^B|\sigma^A)$. So, for modelling purposes we may look for similarity measures with the property $$\frac{1}{p(\sigma^A | \sigma^B)} \uparrow \Rightarrow C(\sigma^A, \sigma^B) \uparrow. \tag{30}$$

With this, let us go back to the standard edit distance C=ed based on the four nontrivial transformations substitution, insertion, deletion, and transposition (in addition to the trivial identity); cf. (26). It does not necessarily satisfy (29), and this can be traced back to the cost 1 used for each of the elementary transformations. (Generally speaking, if, say, transpositions are much more likely to occur than any of the other nontrivial transformations, then ed will assign too much distance between a pair of signatures that differ by transpositions for (29) to hold.)

So, the problem we want to solve is then to find a reasonable class of models and a corresponding set of similarity measures for which the monotonicity property (30) holds.

Since the costs of the elementary transformations caused the standard edit distance to fail the property (29), we shall go ahead and modify these costs. To simplify the notations a little, we first number the elementary transformations from 0 to 5: $T_0$ is the trivial identity transformation, $T_1$ substitution, $T_2$ insertion, $T_3$ deletion, and $T_4$ transposition. We let $\vec{T}=\{T_i\}_{i=0}^{4}$. We also introduce the notation $\text{ed}(\sigma^A, \sigma^B, \vec{c})$ for the edit distance based on certain costs $\vec{c}=\{c_i\}_{i=0}^{4}$, with one $c_i$ for each of the operations $T_i$, $i=0 \ldots 4$. In case we choose $$c_0=0, c_i=1, i=1, \ldots, 4, \tag{31}$$

we obtain the standard edit distance (based on the four nontrivial transformations).

Suppose we let $p_i$, $i=0, \ldots, 4$, be the actual probabilities of each of the elementary transformations. We then set $\vec{c}^* = \{c_i^*\}_i$ with $$c_i^* = \ln\frac{1}{p_i}, i=0, \ldots, 4, \tag{32}$$

and also $$\text{ed}^*(\sigma^A, \sigma^B) = \text{ed}(\sigma^A, \sigma^B, \vec{c}^*). \tag{33}$$

We can now define a preliminary model for the actual conditional probabilities. We simply let $$p^*(\sigma^A|\sigma^B) = \exp(-\text{ed}^*(\sigma^A, \sigma^B)) \tag{34}$$

Clearly, the monotonicity (30) is built into this definition. We also remark that if we let $\#T_i = \#T_i(\sigma^B, \sigma^B)$ denote the number of times the transform $T_i$ is used in the calculation of ed* when transforming $\sigma^A$ into $\sigma^B$, then (34) can be rewritten as $$p_*(\sigma^A | \sigma^B) = \prod_{i=0}^{4} p_i^{\#T_i} \tag{35}$$

Hence, this looks as if the application of each of the different transforms are independent events, each with probability $p_i$.

Now, there are several problems with (35). Perhaps most obvious is the fact that the expressions $p^*(\sigma^B|\sigma^B)$ are not necessarily probability distributions. This can be fixed, however, with an appropriate normalization. Much more seriously, we have not compared and verified these "conditional probabilities" against the experimental data. In the next subsection, we shall carry this out rigorously.

2.6 Maximum Entropy Modeling

Our objective is to find a model for the probabilities $p(\sigma^v|\sigma^a), \sigma^v \in S^v, \sigma^a \in S^a$ that we may use in, for instance, the maximum likelihood approach and equation (11). We shall accomplish this in steps, starting in this subsection and then continuing in the next.

Here is the setup for the more rigorous modeling we are going to consider. We let $S^v$ be the space of labels (of valid signatures) and $S^a$ the space of unlabeled examples (of all possible signatures).

To establish an appropriate model, we use a training set $(\sigma_l^a, \sigma_l^v)$, $l=1, \ldots, L$. To ensure consistency between the observations provided through the training set and the model, we use the expectations of certain features $\phi_i$, $i=0, \ldots, I$. We let $E_{\tilde{\pi}}[\phi_i]$ represent the expectation of feature $\phi_i$ in the training data and $E_{\pi}[\phi_i]$ be the expectation with respect to the model $\pi$ being estimated. Here $\tilde{\pi}$ is the observed, empirical distribution over $S^a \times S^v$, and $\pi = \pi(\sigma^v|\sigma^a)$ is a model distribution over $S^a \times S^v$. Specifically, $$E_{\tilde{\pi}}[\phi_j] = \sum_{\sigma^a, \sigma^v} \tilde{\pi}(\sigma^a, \sigma^v)\phi_j(\sigma^a, \sigma^v) = \frac{1}{L}\sum_{l=1}^{L} \phi_j(\sigma_l^a, \sigma_l^v) \tag{36}$$

$$E_{\pi}[\phi_j] = \sum_{\sigma^a} \tilde{\pi}(\sigma^a)\sum_{\sigma^v} \pi(\sigma^v | \sigma^a)\phi_j(\sigma^a, \sigma^v) = \tag{37}$$

$$\frac{1}{L}\sum_{l=1}^{L}\sum_{\sigma^v} \pi(\sigma^v | \sigma_l^a)\phi_j(\sigma_l^a, \sigma^v)$$

To find the model $\pi(\sigma^v|\sigma^a), \sigma^a, \sigma^v \in S^a \times S^v$, we use a maximum entropy approach; cf. [8], [41], [34]. We let H be the average (conditional) entropy given by $$H(\pi(\cdot, \sigma^a)) = \sum_{\sigma^v} \pi(\sigma^v | \sigma^a) \ln\frac{1}{\pi(\sigma^v | \sigma^a)} \tag{38}$$

We then look for the solution $\hat{\pi}(\sigma^v, \sigma^a)$ of the following constrained maximization problem; cf. [36], [8].

$$\text{maximize}_\pi \sum_{\sigma^a} \tilde{\pi}(\sigma^a)H(\pi(\cdot, \sigma^a)) \text{ subject to } E_{\tilde{\pi}}[\phi_j] = \tag{39}$$

$$E_\pi[\phi_j] \; \forall \; j \sum_{\sigma^v} \pi(\sigma^v | \sigma^a) = 1, \; \forall \; \sigma^a \; \pi(\sigma^v | \sigma^a) \geq 0, \; \forall \; \sigma^v, \sigma^a$$

Using Lagrange multipliers, we find that the solution to this constrained maximization problem is of the form $$\pi_{\vec{\lambda}}(\sigma^{\nu} \mid \sigma^{a}) = \frac{1}{Z(\sigma^{a})} \exp\left(\sum_{i=0}^{I} \lambda_i \phi_i(\sigma^{a}, \sigma^{\nu})\right), \vec{\lambda} = \{\lambda_i\}_{i=0}^{I}, \quad (40)$$

where $Z(\sigma^{a}) = Z_{\vec{\lambda}}(\sigma^{a})$ is the so-called partition function $$Z(\sigma^{a}) = \sum_{\sigma^{\nu}} \exp\left(\sum_{i=0}^{I} \lambda_i \phi_i(\sigma^{a}, \sigma^{\nu})\right). \quad (41)$$

In other words, the solution to the maximization problem belongs to a family of loglinear models parameterized by the vector $\vec{\lambda}$ of constants.

The dual objective function $\mathcal{L}(\vec{\lambda})$ associated with (39) is given by $$L(\vec{\lambda}) = \sum_{\sigma^{a}, \sigma^{\nu}} \tilde{\pi}(\sigma^{a}, \sigma^{\nu}) \ln \frac{1}{\pi_{\vec{\lambda}}(\sigma^{a}, \sigma^{\nu})} \quad (42)$$

$$= \frac{1}{L}\left(\sum_{l=1}^{L}\sum_{i=0}^{I} \lambda_i \phi_i(\sigma_l^{a}, \sigma_l^{\nu}) - \sum_{l=1}^{L} \ln \sum_{\sigma^{\nu}} \exp\left(\sum_{j=0}^{I} \lambda_j \phi_j(\sigma_l^{a}, \sigma^{\nu})\right)\right) \quad (43)$$

(see [53], pp. 6-7 for details).

Solving the maximum entropy problem (39) is then equivalent to maximizing the dual objective function $\mathcal{L}(\vec{\lambda})$ to find the optimal $\vec{\lambda}$:

$$\vec{\lambda}^{*} = \arg\max_{\vec{\lambda}} \mathcal{L}(\vec{\lambda}). \quad (44)$$

Once we obtain this vector, then the solution to (39) is the probability distribution $\pi_{\vec{\lambda}}^{*}(\pi^{\nu}|\sigma^{a})$, cf. (40).

We also remark that the maximization of the dual objective function is equivalent to the maximization of the log-likelihood function $$LL(\vec{\lambda}) = \ln \prod_{\sigma^{a}, \sigma^{\nu}} \pi_{\vec{\lambda}}(\sigma^{\nu} \mid \sigma^{a})^{\tilde{\pi}(\sigma^{a}, \sigma^{\nu})}; \quad (45)$$

(see [8], p. 47, for details).

To solve (44) and hence find the optimal $\vec{\lambda}^{*}$, we may use standard iterative techniques. In [40], there is a comparison of different numerical methods for maximum entropy problems. Typically, the partial derivatives of $\mathcal{L}(\vec{\lambda})$ are needed. These are given by $$\frac{\partial L}{\partial \lambda_i} = E_{\tilde{\pi}}[\phi_i] - E_{\pi_{\vec{\lambda}}}[\phi_i] \quad (46)$$

$$= \frac{1}{L}\sum_{l=1}^{L}\left(\phi_i(\sigma_l^{a}, \sigma_l^{\nu}) - \sum_{\sigma^{\nu}} \pi_{\vec{\lambda}}(\sigma^{\nu} \mid \sigma_l^{a})\phi_i(\sigma_l^{a}, \sigma^{\nu})\right) \quad (47)$$

-continued $$= \frac{1}{L}\sum_{l=1}^{L}\left(\phi_i(\sigma_l^{a}, \sigma_l^{\nu}) - E_{\pi_{\vec{\lambda}}(\cdot\mid\sigma_l^{a})}(\phi_i(\sigma_l^{a}, \cdot)), i = 0, \ldots, I. \quad (48)$$

It is also interesting to note that the second derivatives are given by the covariance matrix of the features:

$$\frac{\partial^2 L}{\partial \lambda_j \lambda_k} = -\sum_{l=1}^{L} cov_{\pi_{\vec{\lambda}}(\cdot\mid\sigma_l^{a})}(\phi_j(\sigma_l^{a}, \cdot), \phi_k(\sigma_l^{a}, \cdot)) \quad (49)$$

Before applying the maximum entropy modelling to our current situation, we make the following remark. Note that by replacing $\phi_i(\sigma^{a},\sigma^{\nu})$ by $-\phi_i(\sigma^{a},\sigma^{\nu})$, we may always assume that the $\lambda_i^{*} \leq 0$, i=0, ..., I. For any $\vec{\lambda} \leq 0$ (i.e., $\lambda_i \leq 0$ for each i=0, ..., I), we define the generalized edit distance ed associated with the features $\vec{\phi}(\sigma^{a},\sigma^{\nu})$ by $$ed(\sigma^{a}, \sigma^{\nu}; \vec{\lambda}) = -\sum_{i=0}^{I} \lambda_i \phi_i(\sigma^{a}, \sigma^{\nu}). \quad (50)$$

(We let the associated cost functions $\vec{c}$ be defined by $\vec{c} = -\vec{\lambda}$.) The conditional probabilities may then be written as $$\pi_{\vec{\lambda}_{*}}(\sigma^{\nu} \mid \sigma^{a}) = \frac{1}{Z(\sigma^{a})} \exp(-ed(\sigma^{a}, \sigma^{\nu}; \vec{\lambda}_{*})). \quad (51)$$

The maximum entropy approach is quite general in nature. To apply it to our particular situation, we need to define a set of features. We shall base these features on the edit distance ed($\sigma^{A},\sigma^{B}, \vec{c}$) for some given cost functions $\vec{c} = \{c_i\}_{i=0}^{4}$. We let $$\phi_i(\sigma^{\nu},\sigma^{a}) = \#T_i, i = 0, \ldots, 4, \quad (52)$$

where $\#T_i$ denotes the number of occurrences of the ith transformation $T_i$ in the (optimal) calculation of the edit distance ed($\sigma^{a},\sigma^{\nu}, \vec{c}$). These features $\phi_i(\sigma^{\nu},\sigma^{a})$ obviously may depend on the particular choice of the cost functions $\vec{c}$.

Suppose then that we have obtained the solution $\vec{\lambda}^{*} = \{\lambda^{i*}\}_{i=0}^{4}$ and let $$\Lambda_i^{*} = \exp \lambda_i^{*}. \quad (53)$$

According to (40), the corresponding model probabilities are given by $$\pi_{\vec{\lambda}_{*}}(\sigma^{\nu} \mid \sigma^{a}) = \frac{1}{Z(\sigma^{a})} \exp\left(\sum_{i=0}^{4} \lambda_i^{*} \phi_i(\sigma^{a}, \sigma^{\nu})\right), \quad (54)$$

$$= \frac{1}{Z(\sigma^{a})} \prod_{i=0}^{4} (\Lambda_i^{*})^{\phi_i(\sigma^{a},\sigma^{\nu})} \quad (55)$$

$$\quad (56)$$

Notice that at least for these features given by (52), our notations here are somewhat misleading: We have defined the $\phi_i$:s with respect to an edit distance with a starting cost function $\vec{c}$. We then obtain a new (generalized) edit distance via the equation (50), associated with the optimal $\vec{\lambda}*$. This new edit distance now potentially results in different choices of the number of elementary transformations $\#T_i = \#T_i(\sigma^a,\sigma^v)$ and a new optimal $\vec{\lambda}*$. And this can then be repeated forever unless the iteration process converges (i.e., the numbers $\#T_i$ stabilize from iteration to iteration).

We also experimented with a "normalized" set of features $$\phi_i = \phi_i(\sigma^a, \sigma^v) = \frac{\#T_i}{\sum_{j=0}^{I} \#T_j}. \qquad (57)$$

The edit distance, with the appropriate cost functions, provides a coarse model of a user's typing and errors. By introducing more transforms, this model can be refined. For example, we have seen in the Subsection 2.4 that certain insertions and deletions are particularly common. Hence, we may introduce insertion and deletion transforms depending on neighboring characters.

EXAMPLE 2.3

Based on several users' typing errors, it seems that the following transforms may provide a better explanation of their typing than the standard set:

| | |
|---|---|
| $in_{22}$ | insertion of extra 2 |
| $in_{88}$ | insertion of extra 8 |
| $in_{ss}$ | insertion of extra symbol after same symbol (where symbol is not 2 or 8) |
| $in_s$ | insertion of symbol without resulting duplication |
| $de_{22}$ | deletion of extra 2 |
| $de_{88}$ | deletion of extra 8 |
| $de_{ss}$ | deletion of extra symbol in a duplication (where symbol is not 2 or 8) |
| $de_s$ | deletion of symbol not from a duplication |

Transposition tr, identity id, and substition su as before.

2.7 The Resulting Bayesian Model

Let us now see how we can establish a model that we can use in equations (11) and (13) in Subsection 2.2. First, we observe that the maximum entropy models from the previous Subsection are not exactly what we need. The reason is the following.

The probability distributions $p_{\vec{\lambda}}(\sigma^v,\sigma^a)$ we obtained are defined in terms of the appropriate edit distance in such a way that if two signatures $\sigma_1^v$ and $\sigma_2^v$ have the same edit distance from the typed $\sigma^a$, then $p_{\vec{\lambda}}(\sigma^{v1}|\sigma^a) = p_{\vec{\lambda}}(\sigma^{v2}|\sigma^a)$. If one of these two intended signatures $\sigma_i^v$, i=1, 2, is much more common than the other, then it seems that we should favor this signature instead of the other in, say, (11). But clearly our model distributions $p_{\vec{\lambda}}(\sigma^{vi}|\sigma^a)$ will not form the basis for such assessments, at least not directly, since they only depend on the edit distance. (And this, of course, also means that the analysis in an example like Example 2.1 is out of reach.)

We can of course go back to the maximum entropy models and instead model $p_{\vec{\lambda}}(\sigma^a|\sigma^v)$ using those techniques. If we do that in a straighforward manner, we are likely to end up with a partition function Z that depends on v, Z(v). This is problematic from a complexity point of view since it is expensive to calculate it, and it does not vanish when we want to compare several different v:s.

Another possibility is to introduce more constraints in the basic maximization (39). For example, we may add a constraint for each $\sigma^v$ so that we guarantee through this constraint that the probability (obtained from a standard corpus perhaps) of each $\sigma^v$ ends up being the right one. The calculations necessary for this do not appear to be easy, or at least from a complexity point of view it does not seem that they can be used in our setting.

A third possibility is to introduce more features into the definition of the edit distance so that the modified edit distance becomes more sensitive. With carefully chosen features, it may be possible to make the edit distance reflect the probability of the different $\sigma^v$. If we succeed in that, then on the other hand the modified edit distance probably will not accurately reflect the user's typing patterns.

The problems we are encountering here are due to the fact that we are mixing the impact from two different sources on our data. On one hand, we have the user's intended distribution of character combinations; and then, on the other hand, we have his typing and typing errors, cf. FIG. 3.

To sort this out, let us consider the input process as consisting of two parts: one process corresponding to units of characters at (like signatures corresponding to words) followed by another process corresponding to the user's typing and outputting a $\sigma^a$ for each $\sigma^v$. Let us for simplicity also assume that the first of these processes is 0th order and can be described by the distribution of the $\sigma^v$:s and that the second outputs a $\sigma^a$ according to another distribution after each $\sigma^v$. (Neither of these assumptions is really necessary, but they make the discussion simpler.) In other words, suppose the user's context of character combinations is described by the probability distribution $P(\sigma^v), \sigma^v \in S^v$ (for instance, P may be the probabilities of words in a big corpus), and that there are probability distributions $\pi(\sigma^a|\sigma^v)$ for the data entered $\sigma^a \in S^a$ given each intended $\sigma^v \in S^v$. Together these distributions determine a joint distribution $p(\sigma^v,\sigma^a)$ on $S^v \times S^a$ defined by $$p(\sigma^v,\sigma^a) = P(\sigma^v)\pi(\sigma^a|\sigma^v), \sigma^v \in S^v, \sigma^a \in S^a. \qquad (58)$$

So, $p(\sigma^v,\sigma^a)$ describes the probability that $\sigma^v$ is the intended signature when $\sigma^a$ is entered. This is then the basic description of the combined input system. We remark that we are thus led to a description that follows a path widely used in image analysis and pattern recognition to handle prior knowledge and empirical data, see [26], [58], [27].

Both $P(\sigma^v)$ and the family $\pi(\sigma^a|\sigma^v)$ may easily be recovered from the joint distribution $p(\sigma^v,\sigma^a)$. To see this, we note that we clearly have $$P(\sigma^v) = \sum_{\sigma^a} p(\sigma^v, \sigma^a). \qquad (59)$$

Further, by using the definition of conditional probability and the definition (58), we see that $$p(\sigma^a \mid \sigma^\nu) = \frac{p(\sigma^\nu, \sigma^a)}{P(\sigma^\nu)} = \frac{P(\sigma^\nu)\pi(\sigma^a \mid \sigma^\nu)}{P(\sigma^\nu)} = \pi(\sigma^a \mid \sigma^\nu). \tag{60}$$

Hence, we may recover $\pi(\sigma^a|\sigma^\nu)$ by first obtaining P from the joint distribution and then use the joint distribution again to get p(1 atIv). This also tells us that the conditional probabilities $p(\sigma^a|\sigma^\nu)$ of the combined input system only depend on the conditional probabilities describing the user's typing and have nothing to do with the distribution of the intended signatures $\sigma^\nu$.

We introduce the notation $Q(\sigma^a), \sigma^a \in S^a$, for the other marginal distribution associated with the joint distribution $p(\sigma^\nu, \sigma^a)$:

$$Q(\sigma^a) = \sum_{\sigma^\nu \in S^\nu} p(\sigma^\nu, \sigma^a) = \sum_{\sigma^\nu \in S^\nu} P(\sigma^\nu)\pi(\sigma^a \mid \sigma^\nu), \sigma^a \in S^a. \tag{61}$$

Assume now that we are given the typed $\sigma^a$ and are asking for the distribution of the $\sigma^\nu$:s. Once again, simply by using the definition of conditional probability we get $$p(\sigma^\nu \mid \sigma^a) = \frac{p(\sigma^\nu, \sigma^a)}{P(\sigma^\nu \in S^\nu, \sigma^a)} = \frac{P(\sigma^\nu)\pi(\sigma^a \mid \sigma^\nu)}{Q(\sigma^a)}, \tag{62}$$

where we of course assume that the denominator $Q(\sigma^a)$ does not vanish. One way to interpret this relationship is like this: We started with a distribution $P(\sigma^\nu)$ of the signatures $\sigma^\nu \in S^\nu$. Once we obtain the $\sigma^a$, then this distribution is adjusted and modified by the factor $$\frac{\pi(\sigma^a \mid \sigma^\nu)}{Q(\sigma^a)}.$$

We refer to $P(\sigma^\nu)$ as the prior distribution and $p(\sigma^\nu|\sigma^a)$ as the posterior distribution of $\sigma^\nu$ given $\sigma^a$.

Note that to describe the joint distribution $p(\sigma^\nu, \sigma^a)$ and the input process, we only need the "transition" probability distributions $\pi(\cdot|\sigma^\nu)$ as far as the typing goes. Sometimes it will be convenient to have access to a joint distribution, so we shall go ahead and define $\pi(\sigma^\nu, \sigma^a)$ on $S^\nu \times S^a$. We let $$\pi(\sigma^\nu, \sigma^a) = \frac{\pi(\sigma^a \mid \sigma^\nu)}{\#S^\nu} \tag{63}$$

where $\#S^\nu$ is the number of signatures in $S^\nu$ (which we assume is finite). We then have two corresponding marginal distributions:

$$\prod(\sigma^a) = \sum_{\sigma^\nu \in S^\nu} \pi(\sigma^\nu, \sigma^a) = \frac{1}{\#S^\nu}\sum_{\sigma^\nu \in S^\nu} \pi(\sigma^a \mid \sigma^\nu), \sigma^a \in S^a \tag{64}$$

and $$\Omega(\sigma^\nu) = \frac{1}{\#S^\nu}, \sigma^\nu \in S^\nu. \tag{65}$$

(Equivalently, we may have defined $\pi(\sigma^\nu, \sigma^a)$ by first picking the uniform distribution $\Omega(\sigma^\nu)$, $S^\nu$, and then requiring $\pi(\sigma^\nu, \sigma^a) = \Omega(\sigma^\nu)\pi(\sigma^a|\sigma^\nu)$.)

For our purposes, we typically want to compare different $\sigma^\nu$:s given the same user input $\sigma^a$. With this in mind, we observe that by (60) and (62)

$$\frac{p(\sigma^{\nu 1} \mid \sigma^a)}{p(\sigma^{\nu 2} \mid \sigma^a)} = \frac{P(\sigma^{\nu 1})p(\sigma^a \mid \sigma^{\nu 1})}{P(\sigma^{\nu 2})p(\sigma^a \mid \sigma^{\nu 2})}. \tag{66}$$

Similarly, using the definition (63), $$\frac{\pi(\sigma^{\nu 1} \mid \sigma^a)}{\pi(\sigma^{\nu 2} \mid \sigma^a)} = \frac{\pi(\sigma^a \mid \sigma^{\nu 1})}{\pi(\sigma^a \mid \sigma^{\nu 2})}. \tag{67}$$

Combining these equations (66) and (67) and once again using (60), we find that $$\frac{p(\sigma^{\nu 1} \mid \sigma^a)}{p(\sigma^{\nu 2} \mid \sigma^a)} = \frac{P(\sigma^{\nu 1})\pi(\sigma^{\nu 1} \mid \sigma^a)}{P(\sigma^{\nu 2})\pi(\sigma^{\nu 2} \mid \sigma^a)}. \tag{68}$$

So if we model $P(\sigma^\nu)$ and $\pi(\sigma^a|\sigma^\nu)$, then through (58) we obtain a corresponding model for the joint distribution $p(\sigma^\nu, \sigma^a)$. In particular, let us use the maximum entropy model $\pi_{\vec{\lambda}}^*(\sigma^a|\sigma^\nu)$ from the previous subsection to model $\pi(\sigma^a|\sigma^\nu)$. Let us also use some reasonable approximation $P_0(\sigma^\nu)$ of the distribution $P(\sigma^\nu)$ (for instance, the probabilities generated from a large corpus of some kind). Then we obtain a corresponding model $$p_{\vec{\lambda}}^*(\sigma^\nu, \sigma^a) = P_0(\sigma^\nu)\pi_{\vec{\lambda}}^*(\sigma^a|\sigma^\nu), \sigma^\nu \in S^\nu, \sigma^a \in S^a. \tag{69}$$

For this model, the various identities above are valid. For example, equation (68) now reads $$\frac{p_{\vec{\lambda}_*}(\sigma^{\nu 1} \mid \sigma^a)}{p_{\vec{\lambda}_*}(\sigma^{\nu 2} \mid \sigma^a)} = \frac{P_0(\sigma^{\nu 1})\pi_{\vec{\lambda}_*}(\sigma^{\nu 1} \mid \sigma^a)}{P_0(\sigma^{\nu 2})\pi_{\vec{\lambda}_*}(\sigma^{\nu 2} \mid \sigma^a)}. \tag{70}$$

Using the explicit description of $\pi_{\vec{\lambda}}^*$ given by (51), we may equivalently write $$\frac{p_{\vec{\lambda}_*}(\sigma^{\nu 1} \mid \sigma^a)}{p_{\vec{\lambda}_*}(\sigma^{\nu 2} \mid \sigma^a)} = \frac{P_0(\sigma^{\nu 1})}{P_0(\sigma^{\nu 2})}\exp\bigl(ed(\sigma^a, \sigma^{\nu 2}; \vec{\lambda}_*) - ed(\sigma^a, \sigma^{\nu 1}; \vec{\lambda}_*)\bigr). \tag{71}$$

2.8 Another Typing Model

Let us once again go back to the basic model (58). With it, we are treating the typing model for a user (or set of users) as "noise" on top of the exact entry of the intended units of characters ("words"). To establish such a typing model, we have used maximum entropy modeling. The equation (35)

can also serve as inspiration for another approach, and this is what we shall go through in this subsection.

One possibility is to view the typed characters as outcomes of an appropriate stochastic process. For example, if the typed character coincides with that of the intended signature, then we may record that as "no error"; and if an error occurs, we may characterize this by recording what transform is required to adjust the intended keystroke to coincide with the typed one. For the error/no-error process, we may then use a Poisson-type process, and, in addition, use a separate distribution to characterize the possible outcomes when an error occurs; cf. [30]. This is similar to what we shall study here.

Let us consider a fixed unit $\sigma^v$ of intended character combinations (a "word") with individual characters $\sigma_n^v$:

$$\sigma^v = \sigma_1^v \ldots \sigma_{N-1}^v, \tag{72}$$

where $N = \#\sigma^v$ is the length of $\sigma^v$. (We note that we are using a left-to-right ordering, but the particular ordering is not important.) Each unit $\sigma^v$ is input by the user, resulting in the signature $\sigma^v$ with characters $\sigma_m^a$:

$$\sigma^a = \sigma_1^a \ldots \sigma_{M-1}^a, \tag{73}$$

where $M = \#\sigma^a$. It will be convenient to set $$\sigma_n^v = b, \; n \leq 0 \tag{74}$$

$$\sigma_n^v = e, \; n \geq N, \tag{75}$$

and, similarly, $$\sigma_m^a = b, \; m \leq 0 \tag{76}$$

$$\sigma_m^a = e, \; m \geq M, \tag{77}$$

(78)

to take care of the beginning and the end of these units. The typing model we shall study here uses a sequence of transforms $\tau = T(\sigma^v, \sigma^a) = \{T_k\}$ to explain the typed entries $\sigma^a$ given the intended ones $\sigma^v$. Each transform acts on a set of characters in the intended signature and outputs some characters in the typed signature, and the transforms are ordered sequentially, just as the input process, so we shall also write $$T = \ldots T_{-1} T_0 T_1 \tag{79}$$

as well as $$T\sigma^v = \sigma^a. \tag{80}$$

Each of the transforms $T_k$ acts on a character $\sigma_{n_k}^v$ and outputs either the empty character or a character in $\sigma^a$. The idea is to choose the transforms so that the probability Prob(T) becomes an approximation of the typing model $\pi(\sigma^a|\sigma^v)$.

Let us illustrate the procedure in terms of the family of five basic transforms (including the identity) used for the standard edit distance {id, in, de, su, tr}, cf. Subsection 2.3 as well as Example 2.3 in Subsection 2.6. We shall view each of the transforms $T_k$ as being chosen independently from the family of transforms {id, in, de, su, tr} and assume that the particular transform is drawn from the family of transforms with a probability that only depends on the current position that the transform is acting upon, the position before the current position (for a first-order model), what particular transform that is picked, and what output symbol it must generate to match the typed signature. So, the action of each transform $T_k$ can be completely characterized by the character curr=$\sigma_{i_k}^v$ at the current position, the previous character prev=$\sigma_{i_k-1}^v$, the type type of the transform, and the output character out. So, we may in general describe $T_k$ by the input-output relationship (prev,curr)→(type,out). We note that sometimes a different choice of relevant context (here the position before the current one) is more appropriate. For example, a user inserting an extra "s" onto nouns is probably quite common. In that case, a better context for the insertion transform may be the character after the current position so that the end of the unit will be recognized.

EXAMPLE 2.4

Suppose the intended signature is $\sigma^v = 1234$ and the typed signature is $\sigma^a = 5512334$. A reasonable guess as to what happened during the user's input process is given by the sequence of transforms T={in, in, id, id, id, in, id}. In more detail, we have the following sequence of transforms:

$$(b,b) \to (\text{in},5)(b,b) \to (\text{in},5)(b,1) \to (\text{id},1)(1,2) \to (\text{id},2)(2,3) \to (\text{id},3)(2,3) \to (\text{in},3)(3,4) \to (\text{id},4). \tag{81}$$

Similarly, let us assume the intended signature is $\sigma^v = 12234$ and the typed signature is $\sigma^a = 1243$. Then the typos may possibly be explained by the sequence T={id, id, de, id, tr}, or, more precisely, by the sequence $$(b,1) \to (\text{id},1)(1,2) \to (\text{id},2)(2,2) \to (\text{de},\epsilon)(2,3) \to (\text{id},3)(3,4) \to (\text{tr},(4,3)). \tag{82}$$

(Obviously, there is redundancy in the notation here; for example, the transpose of (3,4) is clearly known without specifying (4,3).)

Once we have the sequence of transforms in place or, equivalently, the input-output relationships, and if the transforms are picked independently with probabilities depending on the two input parameters, then the following is a reasonable approximation of a typing model:

$$\pi(\sigma^v | \sigma^a) \approx \prod_k \text{Prob}(T_k) = \tag{83}$$

$$\prod_k \text{Prob}((\text{prev}_k, \text{curr}_k) \to (\text{type}_k, \text{out}_k)).$$

The transition probabilities Prob((prev$_k$, curr$_k$)→(type$_k$, out$_k$)) can be estimated from sample data (for a given user or a set of users). Since each of the labels (prev, curr) and (type, out) only take finitely many values, it is convenient to collect all these probabilities in a transition matrix with, say, a row corresponding to a specific input label (prev, curr) and each column to a specific output label (type, out).

Let us make two comments related to the estimation of this transition matrix. In our example with the small set of basic transforms, there are not very many entries in the matrix, and still there may be entries that are very infrequently visited as the user types. This sparsity of data makes it harder to obtain reliable estimates for some of the entries. There are many techniques for other applications that have been developed to address this (cf. [34], [31], [41]). For example, sometimes we may omit the dependency on the prev label and collect all the samples corresponding to a certain curr, type, out in a larger bin, and then assume that the distribution over the prev label is uniform (so called "back-off" from a first order model to a 0:th one). More generally, we may define other equivalence classes of labels that we expect to behave similarly as far as typing error, and then distribute the frequency counts evenly over the equivalence class.

The other comment relates to finding the appropriate transform sequences. Since the typing model is intended to explain the typical typing process, including common errors, the transform sequence should reflect these explanations. The assignment of the appropriate transforms to obtain the approximation of the transition matrix from samples at first seems to require a careful, case-by-case choice; however, it turns out that the transforms obtained from the calculation of the edit distance in most instances work quite well and few special cases need "hand-coding."

2.9 Reducing Search Complexity

The edit distance can be calculated very quickly even for general cost functions and larger sets of basic transforms. For instance, we do not need to calculate the entire cost matrix $E(i,j)$ in the dynamic programming approach (26). In Subsection 2.4, we have mentioned that by making the assumption that a certain number of the initial characters are entered correctly, we obtain a signficant reduction in complexity. In addition, there are several well-known techniques to reduce the complexity of the distance calculation. Suppose, for example, that we are only interested in edit distances smaller than a certain value. Then we may stop the calculation when we get too far off the diagonal in the cost matrix since we know that the cost will only increase after that. There are techniques for carrying out the distance calculations in parallel. We refer to [33] and [44] for recent references and related approaches (the trick to only consider elements in the cost matrix close to the diagonal goes back to [39], [57]).

Our goal in this Subsection is to find techniques that allow us to expand the collection of possible typing errors that we may consider within a reasonable response time. The assumption that the first four characters are correctly entered is often much too restrictive. For example, in Table 3 we have collected the probability of up to the first four characters being typed correctly for signatures of length at least 5 that contain errors. This data relies on statistics from eight users as they typed about 6,800 words.

There are at least two basic approaches to reduce the search complexity to quickly find the potential signatures we need to consider. The first approach is to improve how we predict the signature that the user probably had intended. The second approach is to find a better indexing structure for the dictionary. In [6], [7], and [16] the indexing is based on the metric structure of the edit distance.

The exact typing model of a user depends on the system within which the typing occurs.

TABLE 3

The error probability for the initial characters among errors by three users for character combinations of length 5 and more.

| First i characters correct | User 1 prob. % | User 2 prob. % | User 3 prob.% |
|---|---|---|---|
| 1 | 95.2 | 91.9 | 98.6 |
| 2 | 85.7 | 83.2 | 89.9 |
| 3 | 78.6 | 63.4 | 77.0 |
| 4 | 61.9 | 41.0 | 60.4 |

In other words, the cabilities of the typing environment will impact the user's typing habits. As we mentioned earlier, it is probably particularly important for the user if longer words do not have to be retyped or edited. On the other hand, shorter words are typically more frequent, and it is easier to erase a few characters and to keep track of what has already been emtered, etc. Hence, we may expect that an accurate typing model will distinguish between different lengths of signatures entered.

To approximate this difference in the dependence of the user's experience and typing model on the length of the signatures entered, we shall separate signatures of length, say, four or less, from those longer than four.

For character combinations that are four characters long or less, it is more feasible to obtain an approximation of the typing model directly from experimental data. For now, we shall simply incorporate a few specific transforms for these combinations. For example, from our experimental data it seems that transpositions at the end of combinations are particularly common. For these shorter combinations, it is also easier to establish a look-up table for combinations that are particularly prone to certain errors and then list the appropriate corrections for these.

Here we shall now focus on character combinations that are at least five characters long. There are several considerations to keep in mind: response time, storage, typing order, user characteristics, etc. In order to reduce search time, we may use different prediction techniques, taking into account the particular data structure of the stored information. These predicitions may use a number of features. For example, the approximate length of a character combination seems to be quite stable under the entry process. With a storage premium, we may also add word endings and other shorter combinations.

The following will illustrate some of the issues involved. If we assume that the four initial characters are correct, then we have significantly narrowed down the number of potential signatures we have to consider. However, as we have seen in Table 3, this assumption is quite restrictive and removes a significant portion of the intended signatures. We can improve the situation by relaxing the assumption and only assume that the first three characters are correct. To avoid increasing the search space too much, we can then use these three to predict a fourth character and let these predicted four-character combinations form the basis for our search of potential, additional alternatives to present to the user. (These are in addition to the alternatives obtained using the default assumption that all four are correct.) One such prediction method is to use the maximum likelihood prediction for the fourth entry based on the probability of all legal combinations of length four with the given, initial three characters. These predictions can be established off line and stored in a small table for quick retrieval.

We may also add different models for the typing to improve the prediction accuracy. For example, as we mentioned in Subsection 2.6 (see Example 2.3) it is easy to type too few of the character 8 on the ORK, and hence it makes sense to incorporate these types of facts when predicting likely errors and intended entries.

To illllustrate this, let us consider the ORK as the entry device and let us further make the assumption that only the first two out of the initial four characters are correct, and that we want to use all four characters for our initial search of likely alternatives (as before). Hence, this leaves us with having to predict the two remaining characters. So, there are potentially one hundred possibilities for each one of the ten thousand possible initial $\sigma^a$:s with four characters (since we are assuming that the first two characters are correct). So, if we decide to use a maximum likelihood approach, we are interested in ordering the probabilities $Prob(\sigma^v|\sigma^a)$ for each one of the $\sigma^a$:s. The $\sigma^v$:s we are considering here correspond to legal combinations of length four that are part of the character combinations of length at least five. Instead of experimentally estimating these, we go back to the basic Bayesian model (58) in Subsection 2.7. For the ordering, we may then use equation (68). The factor P($\sigma^v$) can be estimated from sample data (like a large corpus or dynamically). This means that as soon as we have a typing model $\pi(\sigma^v|\sigma^a)$, then we have the basis for selecting the most likely four combinations $\sigma^v$:s for each fixed $\sigma^a$.

In the next example, we shall compare the performance of the two approaches outlined above. The first uses the assumption that the first three characters entered are correct and then predicts three possible choices for the fourth character based on the frequency of occurrence derived from a standard corpus. The second uses the typing model described in Subsection 2.8. For this approach, we shall only assume that the first two characters are correct.

EXAMPLE 2.5

In this example, we shall compare the two prediction methods described above. For the first prediction method, we assume that the first three characters entered are correct. As a consequence, the highest percentages we can reach are 78.6%, 63.4%, and 77.0% for the three users, cf. Table 3.

TABLE 4

The probability of having the first four characters among the top 2 and 3 alternatives, respectively, for the prediction method without typing model. (Using character combinations of length 5 and more.)

| Among i top alternatives | User 1 prob. % | User 2 prob. % | User 3 prob. % |
|---|---|---|---|
| 2 | 71.4 | 52.8 | 68.3 |
| 3 | 78.6 | 59.0 | 74.1 |

For the second prediction method, we only assume that the first two characters entered are correct. Hence, the highest percentages we can reach now are 87.7%, 81.3%, and 80.5% for the three users, cf. Table 3.

TABLE 5

The probability of having the first four characters among the top 2 and 3 alternatives, respectively, for the prediction method with typing model. (Using character combinations of length 5 and more.)

| Among i top alternatives | User 1 prob. % | User 2 prob. % | User 3 prob. % |
|---|---|---|---|
| 2 | 76.3 | 64.0 | 73.9 |
| 3 | 79.1 | 68.3 | 76.2 |

Let us also record the percentage of the error signatures whose first four or five characters are among the top 3 alternatives when we only assume that the first character is correct.

TABLE 6

The probability of having the first four or five characters among the top 3 alternatives, respectively, for the prediction method with typing model under the assumption the first character is correct. (Using character combinations of length 5 and more.)

| First j characters of top 3 alternatives | Overall % of all errors |
|---|---|
| 4 | 67.6 |
| 5 | 11.5 |

3 NLP-based Considerations 3.1 The Substitution Test

To explain the basic underlying idea in this section, let us start by considering some groups of words with the same signature, see Table 7. With the objective of reducing the collisions, we observe that the words in each of the groups are often of very different in nature, some are nouns, some are verbs and adjectives, etc. This means that although they have the same signature, they often play different roles in building a sentence.

TABLE 7

Groups of words with the same signature and corresponding frequencies

| # | Words | Frequencies |
|---|---|---|
| 1 | to | 2332410 |
|   | go | 59270 |
| 2 | sixth | 2128 |
|   | sixty | 1304 |
| 3 | slang | 174 |
|   | slant | 124 |
| 4 | safe | 6541 |
|   | save | 6209 |
|   | wave | 3407 |
|   | ward | 3323 |
|   | ware | 225 |
| 5 | basis | 13464 |
|   | tasks | 3598 |
|   | taxis | 284 |
|   | basks | 16 |
|   | gawks | 0 |
| 6 | show | 24459 |
|   | snow | 3263 |
| 7 | signs | 4724 |
|   | sighs | 203 |
| 8 | sorry | 6968 |
|   | worry | 4516 |
| 9 | sold | 7820 |
|   | wood | 6792 |
|   | sole | 2358 |
|   | wold | 83 |
|   | sloe | 7 |
|   | now | 108301 |
|   | how | 81957 |
|   | nos | 185 |
|   | yow | 77 |
|   | hos | 0 |

To further elaborate on this, let us consider a couple of sample sentences (in this case from Alice In Wonderland).
1. 'I'm very sorry you've been annoyed,' said Alice, who was beginning to see its meaning.
2. How puzzling all these changes are!
3. Mind Now!
4. So she set the little creature down, and felt quite relieved to see it trot away quietly into the wood.

If we substitute the word "sorry" with "worry", the other word in the same collision group, then sentence 1 no longer makes sense. It is certainly grammatically incorrect. Similarly, in sentence 2, none of the other words in the same collision group work as a substitute for "now"; grammatically, the resulting sentence would be incorrect. Sentence 3 is a little more challenging: "how" can be substituted for "now" and we still have a meaningful sentence. Perhaps it is a little more unusual, but it is grammatically correct. In sentence 4, the word "wood" can be replaced by the noun "sole", but not when this word is used as an adjective. Hence, in that case, we need to refine the frequency information about this particular word to incorporate the counts when the word is used a noun and when it is used as an adjective. So, after such a such a refinement, we have been able to reduce the number of colliding words of any real consequence to two ("wood" and "sole"), and we have also been able to adjust the probabilities to more accurately reflect the situtation.

One way to consider the input of characters and the feedback is as a communication process between the user and the device. The device is attempting to extract the intended words and sentences. As the substitution test indicates, the meaning of the words and the sentence is an important component for the understanding of spoken, as well as written, language between two users, and it seems to be a potentially powerful mechanism to help determine the best choices of words with the same signature.

To find the exact meaning of a word and a sentence is difficult, since it is hard to even quantify the problem and the terms involved. The meaning of a word is, for example, highly context sensitive. In general, the problem of automatically extracting the meaning from words and sentences is related to a number of interesting and very active research areas in Natural Language Processing (NLP), cf. [46], [4], [41], [32], [20].

However, it is possible to carry out a substitution test, similar to the one above, in any sentence by inserting each of the words corresponding to a given signature and decide which ones can be discarded on grammatical and syntactical grounds. In this section, we discuss how such a substitution test can be automated and how it can be used to improve the user's experience using the One-Row Keyboard and similar reduced keyboards.

3.2 Some Statistics

Let us start by looking at some statistics related to the effectiveness of the input process, without the support of syntactical information or any other way of utilizing the meaning of the sentence being created. In Table 8 below, we have collected some statistics from the following texts:

Book 1 *Alice in Wonderland* (by Lewis Carroll)
Book 2 *Memoirs of Aaron Burr* (by Matthew L. Davis)
Book 3 *Crime and Punishment* (by Fyodor Dostojevsky)
Book 4 *Edison, his life and inventions* (by Frank Lewis Dyer)
Book 5 *Complete Poems of Emily Dickinson*
Book 6 *The Forgotten King* (by Jonathan Dunn)
Articles Sampling of articles from recent editions of Time In particular, we notice that the signature is ambiguous for about 30% of the words, but that about 90% of those are in fact displayed correctly. This results in approximately 96-98% of all words being displayed correctly "the first time" on the display. (We have assumed that word initially displayed is simply the most probable word for a given signature, i.e., we have used the path-frequency ordering.)

So there are approximately 3% of words that are incorrectly displayed the first time they are displayed. Although this number seems to be quite low, it is helpful to keep in mind that the average number of words in a sentence is quite large. For example, in *The Wall Street Journal* corpus (cf. [51], [1], [42]), the average sentence length is approximately 23 words. Hence, if we were typing *The Wall Street Journal* with the One-Row Keyboard, we would

TABLE 8

Collision statistics for sample texts.

| Item | Book 1 | Book 2 | Book 3 | Book 4 | Book 5 | Book 6 | Articles |
|---|---|---|---|---|---|---|---|
| # words | 26686 | 283057 | 207084 | 261462 | 94299 | 155997 | 17837 |
| # collisions | 7557 | 90685 | 66809 | 89011 | 28796 | 36268 | 3013 |
| % collisions | 28.3 | 32.0 | 32.3 | 34.0 | 30.5 | 23.2 | 16.9 |
| % correct display | 96.86 | 97.54 | 97.33 | 97.83 | 96.04 | 97.81 | 97.95 | expect to have to change one word on the screen at least once in about 70% of the sentences (since 23×0.03~0.7).

Let us then investigate a little further where the problems are originating. The ten most frequent collision groups account for about 60% of the collisions, and the 50 most frequent ones represent about 90%, cf. Table 9.

TABLE 9

The percentage of the collisions in the most frequently occuring collision groups.

| | % of Collisions | | | | | | |
|---|---|---|---|---|---|---|---|
| # most frequent groups | Book 1 | Book 2 | Book 3 | Book 4 | Book 5 | Book 6 | Articles |
| 10 | 65.1 | 52.6 | 58.6 | 66.1 | 54.7 | 52.7 | 63.5 |
| 25 | 83.7 | 74.7 | 77.0 | 78.7 | 70.4 | 72.3 | 83.2 |
| 50 | 94.5 | 86.3 | 88.6 | 86.2 | 80.6 | 84.2 | 93.7 |
| 100 | 99.8 | 94.2 | 95.5 | 92.5 | 89.0 | 93.1 | 100 |

As we noted, in most cases the right word is initially displayed on the screen. Hence, to measure the problematic collisions it is interesting to look at what signatures are the ones causing most of the incorrectly displayed words. Rather than doing that exactly, we have collected in Table 10 how much of the approximately 3% of the incorrectly displayed words we could avoid if we were able to correctly handle the two most frequent words in certain specific collision groups. These specific groups are selected based on the frequency of the first alternative. Assuming that we correctly resolve the two words in ten of the collision groups, we reduce the 3% to approximately 1.4%. And if we take care of 25 groups and the coresponding two words of the highest frequency in each of those, then as a result approximately 0.7% of the words are being incorrectly displayed. Assuming that the average sentence is about 23 words long, we would then expect to find only one incorrectly displayed word in one out of six or seven sentences (23×0.007=0.161).

TABLE 10

The effect of resolving the two most frequent words in specific sets of collision groups.
% Correctly Displayed

| # groups fixed | Book 1 | Book 2 | Book 3 | Book 4 | Book 5 | Book 6 | Articles |
|---|---|---|---|---|---|---|---|
| 10 | 98.78 | 98.95 | 98.87 | 98.83 | 97.81 | 98.84 | 99.01 |
| 25 | 99.35 | 99.30 | 99.33 | 99.14 | 98.39 | 99.18 | 99.36 |
| 50 | 99.67 | 99.5 | 99.55 | 99.38 | 98.76 | 99.45 | 99.63 |
| 100 | 99.91 | 99.67 | 99.72 | 99.56 | 99.12 | 99.67 | 99.89 |

On the other hand, if we could resolve all the words in some specific collision groups, not just the two most frequent, then the effect would be slightly different. In that case, we should select the collision groups based on the total frequency of all the alternatives (thus not counting the frequency of the displayed words). This is what we have in Table 11, assuming that we display all the words in the specific collision groups exactly when they should be.

As we see, when we completely resolve ten collision groups, the collision probability goes down to approximately 1.2%. If we handle 50 groups perfectly, then only about 0.5% of the words would be incorrectly displayed. This means that on average only one word would be incorrect in a little more than nine sentences.

The words that make up these groups are quite consistent across the different sample texts. For example, in Table 12 are some of the details about the ten groups used in Table 11 for Book 1, Book 2, and Articles.

TABLE 11

The effect of resolving the entire group for a specific number of collision groups.
% Correctly Displayed

| # groups fixed | Book 1 | Book 2 | Book 3 | Book 4 | Book 5 | Book 6 | Articles |
|---|---|---|---|---|---|---|---|
| 10 | 98.82 | 98.99 | 98.87 | 98.89 | 97.84 | 98.84 | 99.07 |
| 25 | 99.40 | 99.36 | 99.39 | 99.25 | 98.53 | 99.21 | 99.44 |
| 50 | 99.73 | 99.58 | 99.63 | 99.51 | 98.96 | 99.51 | 99.74 |
| 100 | 99.97 | 99.77 | 99.81 | 99.72 | 99.36 | 99.74 | 100 |

TABLE 12

The percent of the collisions in the most frequently occuring collisions groups for sample texts.

| # | Word | % of Collisions |
|---|---|---|
| | Book 1 | |
| 1 | they | 1.733 |
| | then | 1.244 |
| 2 | of | 6.802 |
| | or | 1.019 |
| 3 | how | 0.900 |
| | now | 0.794 |
| 4 | way | 0.741 |
| | say | 0.675 |
| 5 | to | 9.647 |
| | go | 0.662 |
| 6 | on | 2.554 |
| | oh | 0.595 |
| 7 | just | 0.688 |
| | must | 0.582 |
| 8 | have | 1.059 |
| | hare | 0.410 |
| | hard | 0.106 |
| | yard | 0.013 |
| 9 | round | 0.543 |
| | found | 0.423 |
| 10 | can | 0.463 |
| | day | 0.384 |
| | Book 2 | |
| 1 | of | 12.478 |
| | or | 1.595 |
| 2 | by | 1.967 |
| | th | 0.815 |
| 3 | can | 0.475 |
| | day | 0.471 |
| 4 | they | 0.850 |
| | then | 0.346 |
| 5 | now | 0.455 |
| | how | 0.288 |
| 6 | may | 0.810 |
| | man | 0.214 |
| | jay | 0.033 |
| 7 | year | 0.160 |
| | hear | 0.120 |
| | near | 0.087 |
| 8 | c | 0.223 |
| | d | 0.190 |
| | e | 0.009 |
| 9 | to | 10.761 |
| | go | 0.195 |
| 10 | say | 0.193 |
| | way | 0.179 |
| | wan | 0.001 |
| | Articles | |
| 1 | of | 15.267 |
| | or | 2.124 |
| 2 | they | 3.485 |
| | then | 0.797 |
| 3 | say | 0.664 |
| | way | 0.597 |
| | san | 0.199 |
| 4 | how | 1.162 |
| | now | 0.730 |
| 5 | have | 3.186 |
| | hard | 0.498 |
| | yard | 0.033 |
| 6 | to | 17.624 |
| | go | 0.465 |
| 7 | can | 1.228 |
| | day | 0.365 |
| 8 | good | 0.398 |
| | told | 0.199 |
| | gold | 0.066 |
| | bold | 0.066 |
| 9 | just | 1.128 |
| | must | 0.266 |
| 10 | may | 0.697 |
| | man | 0.199 |
| | jan | 0.033 |
| | jay | 0.033 |

3.3 Modeling the User—Device Interaction

The type of considerations involved in automating a substitution test fall in the area of NLP techniques, and for us a good starting point is to consider parsing methods. These methods automate and extend the diagramming of sentences learned in high school. By using grammar rules and Part-Of-Speech (POS) tags, like those in Table 13, they create trees, or more generally graphs, that allow us to understand the construction of sentences and to assess whether these are grammatically correct. Two of the basic, now standard parsing techniques are the so-called Earley parser and the CYK parser, cf. [4], [41], [37], [43]. There are many other parsers, including probabilistic parsers, cf. [28], [54], [35], [15], [14].

These could for example be "VERB", "NOUN", "ADJECTIVE", etc., or they can be more detailed, like "AUXILIARY VERB", "TRANSITIVE VERB", "VERB IN PRESENT TENSE, THIRD PERSON SINGULAR". . . . A tag set must form a partition, in the sense that a certain word in a certain sense can only be assigned exactly one tag . . . . A notorious (English) example of a sentence where the POS tags disambiguate the meaning is the following:

TABLE 13

A standard POS tag set

| Tag | Explanation | Examples |
| --- | --- | --- |
| at0 | article | the, a, an, no, every |
| nn0 | noun | time, way, people, man, head, day, house, aircraft, data, committee |
| vb0 | verb | is, have, be, are, do, can, would, forget, send, live, return |
| vbd | past-tense-verb | was, had, said, were, did, been, got, forgot, sent, lived, returned |
| aj0 | adjective | other, good, new, different, old, little, nice, better, best |
| rb0 | adverb | so, then, up, out, well, how, now, when, why |
| pp0 | object pronoun | you, I, it, he, she, they, that, them |
| pp$ | possessive pronoun | his, her, their, your, my, its, our, ours, theirs |
| cd0 | cardinal | one, two, three, five, four, six, hundred |
| ord | ordinal | first, last, next, second, third, fourth, twentieth |
| cj0 | conjunction | and, but, that, or, if, as, when |
| inj | interjection | oh, yeah, no, yes, ah, ooh, hello |
| not | negative particle | not |
| prp | preposition | of, in, to, for, with, on, at |
| to0 | infinitive marker | to |

Slightly lower down in the hierarchy of NLP methods are the so-called partial parsers and chunking algorithms, cf. [3], [2], [56]. Parsers like the one above aim at recovering complete, exact parses of the sentences. Partial parsing, on the other hand, only tries to recover syntactic information and may, for instance, just focus on noun phrases. Since general text is noisy and since it is hard to guarantee grammatical rules that cover all the constructions used in a text, partial parsing sacrifices completeness in favor of robustness. The POS taggers restrict the ambition even further: they intend to simply put the right POS tags on the words in a sentence. So, rather than attempting to solve the very ambitious problem of language understanding and the like, taggers are simply designed to disambiguate between the different roles a given word plays in a sentence. As it turns out, this can be done with impressive accuracy. A state-of-the-art tagger achieves about 97% accuracy in this POS-tagging process. See [12], [11], [13], [45], [9], [5], [17], [52], [49], [50], [24], [25].

The complexity of these three different types of NLP techniques reflects the ambitions of each: that of a standard (full) parser is proportional to $n^3$, where n is the number of words in the sentence, and a POS tagger is linear in n. This indicates that parsers are probably better suited for offline, batch-type processing, while POS taggers are good candidates for streaming-type processing. Typically, the parsers generate a large set of possible parse trees, and even if a probabilistic parser is used and the probabilities are used to differentiate between these trees, this adds to complexity and memory requirements.

To start modeling the user-device interaction, it is instructive to consider the following (see (84) below) from [55].

The goal of POS tagging is to assign to each word in a sentence the most appropriate so called morphosyntactic category. This presumes first of all a predefined tag set which can contain from 10 up to 1000 different tags.

"Time flies like an arrow but fruit flies like a banana", (84)

which has has the POS tag assignment: NOUN VERB PREP ART NOUN CONJ ADJ NOUN VERB ART NOUN The tagging of (84) then demonstrates how we may think of the word together with the tag as a simplified model for carrying the intended meaning of a word. In a written text, the reader has to decode the meaning through the context since the tag is "lost." With speech, the model is different: the meaning of a word is carried through intonation, pauses, and other effects, and the word itself may not be communicated with absolute certainty.

Figure 3:
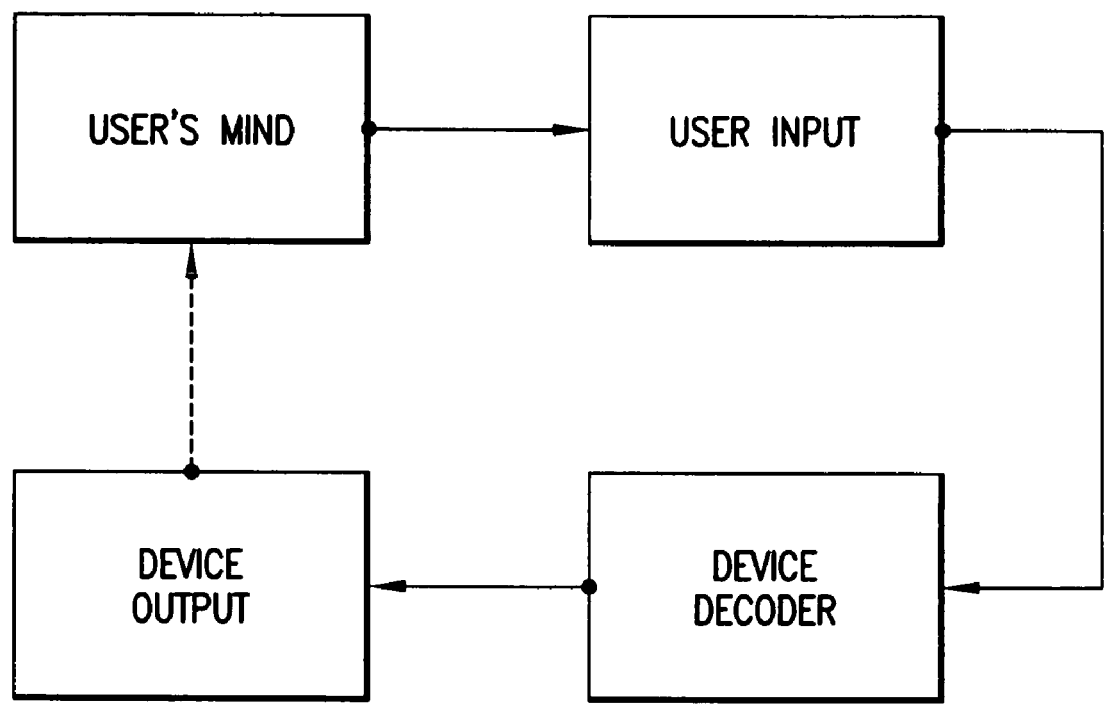
FIG. 3: Communication system for character input/output.

Let us start by modeling the interaction between the user and the device as a basic communication system with an information source (the user) and an information sink (the device) connected via a communication channel of some kind, see FIG. 3. We further assume that the input is divided up into segments s (typically sentences) that are identified through some means (usually through a period) and that these segments in turn are formed by concatenating basic input units w (typically words). A sentence s with N words is then represented by $$s = w_0 w_1 \ldots w_N. \quad (85)$$

Now it seems to make sense to distinguish two types of processing: batch and on-the-fly.

In the batch-type, offline processing mode, there is only limited feedback as the units are entered; the user may at least to some extent just enter the input without completely fixing it as he goes. Hence, we may assume that some of the input is correct while other parts may not be quite right. In FIG. 3, this means that the feedback path may not be used very heavily. It also means that the device decoder can operate on the entire sentence or even the entire message in trying to resolve ambiguities and the meaning of the transmitted information.

For the on-the-fly, real-time processing, we assume that the user corrects each of the words and his input as he goes, before he continues to the next word. So, the feedback loop in FIG. 3 is more heavily used. For the device decoder, this means that it has access to the signature of an entered word (or other unit) as well as the previous words. The channel thus drops not just the meaning of the words that the user intended but also the dual signature of the current word.

Let us introduce some notation to make this more explicit and easier to refer to. Let us assume that we are given a sentence s. Then a word w in this sentence carries a certain meaning $\mu$. We also write $$\mu = (\kappa, \lambda) \tag{86}$$

where $\kappa$ is the tag of the word (as a member of s) and $\mu$ is whatever remains of $\mu$. Exactly how to characterize $\lambda$ or how to get to it will not be of any great concern to us. Note, however, that $\mu = \mu(s)$. As before, we let $\sigma$ and $\tau$ be the signature and dual signature, respectively, of w.

So, to model the communication processes as communication systems, we have the following. For regular written text, the user intends to communicate $\{w,\mu\}$ and the channel only transmits w. The meaning $\mu$ must be deduced from the context.

The POS automatic taggers start from a sentence s:

$$s = w_0 \ldots w_N. \tag{87}$$

The goal of the tagger is to find $\kappa_i$ for each word $w_i$ and obtain $\{w_i, \kappa_i, \emptyset\}$. As we mentioned before, a state-of-the-art tagger achieves 96-97% accuracy. In this sense, the sequence of words contains most of the information in the tags and the sequence $\{w_i, \kappa_i, \emptyset\}$.

In the case of a reduced keyboard, the user still wants to transmit $\{w, \mu\} = \{(\sigma,\tau), (\kappa,\lambda)\}$, but the channel drops $\tau, \kappa$, and $\lambda$, and only the signature a makes it through. In the case of the on-the-fly processing, which is the most interesting case for us, the user is assumed to use the feedback loop to make sure that the device decoder has access to all the words prior to the current one. Hence, the decoder can access $$\ldots w_{i-2} w_{i-1} \sigma_i. \tag{88}$$

The challenge is for the decoder to provide $\tau_i$ or, equivalently, $w_i$. A possibility we shall consider here is to use a POS tagger (or really any NLP tool) to obtain $$\ldots \{w_{i-2}, (\kappa_{i-2}, \emptyset)\}; \{w_{i-1}, (\kappa_{i-1}, \emptyset)\}, \{(\sigma_i, 0), (\kappa_i, \emptyset)\}, \tag{89}$$

or the full $$\ldots \{w_{i-2}, (\kappa_{i-2}, \emptyset)\}; \{w_{i-1}, (\kappa_{i-1}, \emptyset)\}, \{(\sigma_i, \tau_i), (\kappa_i, \emptyset)\}. \tag{90}$$

There are essentially two observations motivating this approach for finding the missing dual signatures (also called the disambiguation problem for a reduced keyboard).

To explain our first motivation, let us pick the One-Row Keyboard as a specific example and consider some examples of collision groups and the POS tags for the words inside the groups. We shall use a standard tag set (see Appendix A.1) and pick some collision groups that seem at least somewhat important, see Table 14. Now, it is interesting to note that for most groups, the tags for the different words within the group overlap very little. More specifically, the frequencies in the table indicate that if we are given a tag and the signature, then with a good probability we can pinpoint the word (and the dual signature).

TABLE 14

Groups of words with the same signature and corresponding frequencies

| # | Words | Tag | Frequencies |
|---|---|---|---|
| 1 | to | total | 2560346 |
|   |   | to0 | 1620850 |
|   |   | prp | 917579 |
|   |   | avp-prp | 15488 |
|   |   | avp | 6245 |
|   |   | unc | 182 |
|   |   | av0 | 1 |
|   | go | total | 90542 |
|   |   | vvi | 59772 |
|   |   | vvb | 28605 |
|   |   | nn1 | 1462 |
|   |   | nn1-vvb | 381 |
|   |   | unc | 320 |
|   |   | np0 | 2 |
| 2 | they | total | 433475 |
|   |   | pnp | 433441 |
|   |   | unc | 34 |
|   |   | ad0-av0 | 1 |
|   |   | aj0 | 1 |
|   |   | cjc | 1 |
|   | then | total | 160826 |
|   |   | av0 | 169652 |
|   |   | cjs | 171 |
| 3 | now | total | 137814 |
|   |   | av0 | 137801 |
|   |   | cjs | 11 |
|   |   | nn1 | 1 |
|   |   | unc | 1 |
|   | how | total | 101517 |
|   |   | avq | 101508 |
|   |   | unc | 4 |
|   |   | nn1 | 3 |
|   |   | av0 | 1 |
|   |   | op0 | 1 |
| 4 | can | total | 236321 |
|   |   | vm0 | 234386 |
|   |   | nn1 | 1019 |
|   |   | vvb | 734 |
|   |   | nn1-vvb | 153 |
|   |   | unc | 13 |
|   |   | vvi | 9 |
|   |   | aj0-nn1 | 3 |
|   |   | aj0 | 2 |
|   |   | np0 | 2 |
|   | day | total | 62256 |
|   |   | nn1 | 58863 |
|   |   | np0 | 1812 |
|   |   | nn1-np0 | 1576 |
|   |   | unc | 5 |
|   |   | unc | 5 |
| 5 | went | total | 48338 |
|   |   | vvd | 48028 |
|   |   | vvn | 310 |
|   | sent | total | 13715 |
|   |   | vvn | 6915 |
|   |   | vvd-vvn | 3594 |
|   |   | vvd | 3155 |
|   |   | aj0-vvd | 21 |
|   |   | aj0-vvn | 21 |
|   |   | aj0 | 8 |
|   |   | unc | 1 |
| 6 | of | total | 2941790 |
|   |   | prf | 2941444 |
|   |   | prp | 276 |
|   |   | unc | 28 |
|   |   | av0 | 27 |
|   |   | cjc | 11 |
|   |   | cjs | 3 |
|   |   | vhi | 1 |
|   | or | total | 370855 |
|   |   | cjc | 370808 |
|   |   | unc | 47 |
| 7 | give | total | 45117 |
|   |   | vvi | 32016 |
|   |   | vvb | 12997 |

TABLE 14-continued

Groups of words with the same signature and corresponding frequencies

| # | Words | Tag | Frequencies |
|---|---|---|---|
| | | nn1-vvb | 75 |
| | | nn1 | 23 |
| | | unc | 3 |
| | | np0 | 3 |
| | bird | total | 3955 |
| | | nn1 | 3443 |
| | | np0 | 356 |
| | | nn1-np0 | 156 |
| 8 | have | total | 473693 |
| | | vhb | 268490 |
| | | vhi | 205195 |
| | | unc | 6 |
| | | vvb | 1 |
| | | vvi | 1 |
| | hard | total | 22935 |
| | | aj0 | 9890 |
| | | av0 | 6652 |
| | | aj0-av0 | 6383 |
| | | unc | 4 |
| | | aj0-nn1 | 3 |
| | | np0 | 3 |
| | yard | total | 3267 |
| | | nn1 | 2600 |
| | | np0 | 477 |
| | | nn1-np0 | 190 |

To study this somewhat more systematically, we shall pick the top ten collision groups when we have ordered the different groups based on the total frequencies of all the words in the group take away the highest frequency (the exact ordering method here is not very important for us). This is what we have collected in Appendix B.1, Table 18. Ignoring the "total" rows, we observe that if the other conditional probabilities were either 1 or 0, then it would show that the POS tag would perfectly pinpoint the word or, equivalently, the dual signature. Hence, our first observation is that the dual signature and the POS tags are almost interchangeable: if we have the full words, then with great accuracy we can find the POS tags, and, conversely, if we know the POS tags, then we can find the dual signatures with a good probability, see Subsection B.2.

If dual signatures and POS tags are almost interchangeable, then one may wonder why it is helpful to look for the POS tags in order to improve the prediction of the dual signatures. Our second observation concerns the reasoning behind that.

Suppose, for instance, that we tried to predict the current word in a text of some kind based on the history of previous words in the same sentence, and, to be specific, suppose we tried to use the two preceding words. To understand the dependencies between the three words, we may then consider all the possible word combinations based on three words in our dictionary. If the dictionary is one of rather modest size, say 100,000 words, that means we would have to consider $(100,000)^3 = 10^{15}$ possibilities. The vast majority of these possible combinations would never occur or be rarely used. Hence, to extract meaningful statistics from this would be very hard, and, from the implementation point of view, it would also be virtually impossible to use the information in a meaningful way. In trying to improve the situation, probably the first thing that comes to mind is to start grouping similar words in the dictionary together and not distinguish between so many different combinations. The POS tags do exactly that: the tags group words together that serve similar roles, from a syntactical point of view, in building a sentence.

The same type of insight can be reached if we consider how we use speech to communicate. The speed of communication can be maintained between two people since the rate of understanding of what is being said is essentially the same as that of speaking. If the person who listened had to go through a huge set of possible interpretations for each word, then it is hard to see how the speed could be maintained. Instead, it is likely that the listener is able to predict what roughly comes next or at least fit the words in established patterns that help the understanding. These general patterns probably rely on the syntactical structure of the language in question.

So, the second observation is that POS tagging and extracting syntactical structure are attempts to establish predictable patterns in our language.

To summarize then, our two basic observations concerning how to find the dual signatures when using a reduced keyboard are the following.

1. Dual signatures and POS tags contain information that to some extent is interchangeable and which can be used to pinpoint the intended words.
2. POS tags and syntactical structure rely on patterns that are predictable and, hence, can form the basis for predictions.

It is instructive to compare the challenge here with that of speech recognition, see [34]. Speech recognition is a comparatively harder problem. In that case, we are presented with some auditory "evidence" a of the intended words w and sentences s, and the task is to reconstruct w and s with high accuracy. If we let P(s|a) be the conditional probability that the sentence s was spoken given the auditory evidence a, and we use a maximum likelihood estimate to reconstruct the sentence, then the problem is to find $$\hat{s} = \arg\max_s P(s|a). \qquad (91)$$

Language modeling plays a prominent part in many of the current approaches to speech recognition.

3.4 A Markov Model Approach

In this subsection, we shall start investigating the use of Markov models and POS tagging to reduce the number of words that are incorrectly displayed when using a reduced keyboard.

Once again, we shall use the One-Row Keyboard as a specific example. We shall also follow the exposition in [4] quite closely (cf. pages 189-209); cf. also [41] (cf. pages 317-380), [29]. In particular, we shall start by exploring a bigram model, which is simpler than higher order models. For the time being, we shall also restrict ourselves to the on-the-fly processing outlined above.

We assume that we are given a sentence $$s = w_0 \ldots w_N. \qquad (92)$$

For now, we shall mostly ignore how to treat the period and other punctuation marks and special symbols. We shall often view the sentence s simply as a sequence $\{w_i\}_{,i=0}^N$ of words $w_i$, i=0, ..., N. For each word $w_i$, there is a unique signature ai and a dual signature $\tau_i$. There are potentially several tags $\kappa_i$, each implying a potentially different meaning for the word and the sentence s. Most often, there is one unique tag sequence for all the words of the sentence that reflects the user's intentions.

At the point when the user starts inputting the information for word $w_M$ ($0 \leq M \leq N$), the user is assumed to have made sure that the words $w_0, \ldots, w_{M-1}$ are all correct. After inputting the signature $\sigma_M$, the device decoder is then left with the task of finding the sequence of tags $\kappa_i$, i=0, ..., M and the dual signature $\tau_M$, ideally corresponding to the user's intended meaning. For example, if we decide to use a maximum likelihood estimate to assess the optimality of the tag sequence $\kappa_i$ and the dual signature $\tau_M$, then we are interested in finding $$\hat{\kappa}_0, \ldots \hat{\kappa}_M, \hat{\tau}_M = \arg\max_{\kappa_0, \ldots \kappa_M, \tau_M} \text{Prob}(\kappa_0, \ldots \kappa_M, \tau_M | w_0, \ldots, w_{M-1}, \tau_M). \quad (93)$$

Using the definition of conditional probability, the probability on the right-hand side equals $$\frac{Prob(\kappa_0, \ldots, \kappa_M, \tau_M, \omega_0, \ldots, \omega_{M-1}, \sigma_M)}{P(\omega_0, \ldots, \omega_{M-1}, \sigma_M)}.$$

Now, $w_0, \ldots w_{M-1}$, and $\sigma_M$ are given and fixed while we maximize the quantity in (93). Hence, the denominator here is also fixed, and we have $$\hat{\kappa}_0, \ldots \hat{\kappa}_M, \hat{\tau}_M = \arg\max_{\kappa_0, \ldots \kappa_M, \tau_M} \text{Prob}(\kappa_0, \ldots \kappa_M, \tau_M | w_0, \ldots, w_{M-1}, \tau_M).$$

Note that there is a unique word $w_M$ with $w_M = (\sigma_M, \tau_M)$ for each $\tau_M$. As a consequence $$\hat{\kappa}_0, \ldots \hat{\kappa}_M, \hat{\tau}_M = \arg\max_{\kappa_M} \max_{\kappa_0, \ldots \kappa_M} \{\text{Prob}(\kappa_0, \ldots \kappa_M, w_0, \ldots, w_{M-1}, w_M) : w_M = (\sigma_M, \tau_M)\}. \quad (94)$$

In other words, finding the optimal tag sequence and dual signature is simply a family of tagging problems, one for each possible value of $\tau_M$ (with $\sigma_M$ fixed). This is one precise formulation of the "substitution test." This also means that we can immediately use the solution methods for POS tagging to find approximate solutions of (93). The expositions in [4] and [41] use a Hidden Markov Model (HMM) approach based on a bigram model to illustrate the general approach. Here we shall use the same basic illustration, but provide more details concerning our particular problem (93).

Using the definition of conditional probability again, we may rewrite the probability on the right-hand side as follows:

$$\text{Prob}(\kappa_0, \ldots, \kappa_M, w_0, \ldots w_{M-1}, w_M) = \text{Prob}(\kappa_0, \ldots, \kappa_M) \times \text{Prob}(w_0, \ldots, w_{M-1}, w_M | \kappa_0, \ldots, \kappa_M). \quad (95)$$

Each of these two factors are then approximated by simpler ones that are easier to collect.

For the first factor, we first use the "Chain rule" to see that $$Prob(\kappa_0, \ldots, \kappa_M) = Prob(\kappa_M | \kappa_0, \ldots, \kappa_{M-1}) \times Prob(\kappa_0, \ldots, \kappa_{M-1}) = \quad (96)$$

$$\prod_{m=0}^{M} Prob(\kappa_m | \kappa_0, \ldots, \kappa_{m-1}).$$

Here $\kappa_{-1}$ is defined to be a starting tag so that $\text{Prob}(\kappa_0|\kappa_{-1}) = \text{Prob}(\kappa_0)$ (i.e. the transition from the starting tag to the first one $\kappa_0$ of the sentence). To simplify the calculations of these quantities, we introduce the appropriate independence assumptions. For example, in the case of the trigram model, we assume that a tag $\kappa_m$ only depends on the two preceding tags $\kappa_{m-1}, \kappa_{m-2}$, and in the case of the bigram model, which we shall use for illustration here, we simply assume that $\kappa_m$ depends on $\kappa_{m-1}$. Hence, with this approximation we obtain $$Prob(\kappa_0, \ldots, \kappa_M) \approx \prod_{m=0}^{M} Prob(\kappa_m | \kappa_{m-1}). \quad (97)$$

For the second factor in (95), it seems reasonable to assume that there is the following type of independence, at least approximately:

$$Prob(\omega_0, \ldots, \omega_{M-1}, \omega_M | \kappa_0, \ldots, \kappa_M) \approx \prod_{0}^{M} Prob(\omega_m | \kappa_m). \quad (98)$$

With these approximations, we obtain $$Prob(\kappa_0, \ldots, \kappa_M, \tau_M, \omega_0, \ldots, \omega_{M-1}, \omega_M) \approx \quad (99)$$

$$\prod_{0}^{M} Prob(\kappa_m | \kappa_{m-1}) Prob(\omega_m | \kappa_m).$$

The solution of the optimization problem (93) is then $$\hat{\kappa}_0, \ldots \hat{\kappa}_M, \hat{\tau}_M \approx \quad (100)$$

$$\arg\max_{\tau_M} \max_{\kappa_0, \ldots, \kappa_M} \left\{ \prod_{0}^{M} Prob(\kappa_m | \kappa_{m-1}) Prob(\omega_m | \kappa_m) : \omega_M = (\sigma_M, \tau_M) \right\}.$$

EXAMPLE 3.1

Let us first fix a tagset, see Table 13, and let us assume that the transition probabilities are given by Table 15. We shall also assume that we are given a dictionary with all the probabilities we need to calculate (100).

TABLE 15

A sample transition matrix (cf. [19]) for standard tags.

| In \ Out | aj0 | at0 | cd0 | cj0 | inj | nn0 | not | ord | ppS | pp0 | prp | rb0 | to0 | vb0 | vbd | . |
|---|---|---|---|---|---|---|---|---|---|---|---|---|---|---|---|---|
| start | 1.92 | 11.74 | 0.83 | 8.90 | 1.31 | 13.85 | 0.40 | 0.19 | 1.93 | 38.30 | 4.82 | 9.02 | 0.27 | 5.45 | 1.08 | 0.00 |
| aj0 | 5.09 | 0.51 | 0.16 | 7.19 | 0.01 | 63.42 | 0.11 | 0.08 | 0.10 | 2.06 | 6.85 | 1.40 | 3.41 | 0.81 | 0.45 | 8.35 |
| at0 | 23.89 | 0.01 | 0.70 | 0.01 | 0.00 | 69.98 | 0.00 | 1.86 | 0.00 | 1.64 | 0.01 | 1.81 | 0.00 | 0.06 | 0.03 | 0.01 |
| cd0 | 9.54 | 0.57 | 2.30 | 4.43 | 0.05 | 54.12 | 0.00 | 0.38 | 0.03 | 2.24 | 18.51 | 1.15 | 0.27 | 1.56 | 1.39 | 3.45 |
| cj0 | 6.76 | 12.47 | 0.82 | 2.06 | 0.07 | 16.86 | 0.89 | 0.10 | 2.70 | 29.67 | 3.67 | 6.96 | 0.63 | 8.11 | 8.04 | 0.20 |
| inj | 0.94 | 1.77 | 0.42 | 4.91 | 8.35 | 14.72 | 1.04 | 0.00 | 1.88 | 33.40 | 1.36 | 4.28 | 0.10 | 6.78 | 11.90 | 8.14 |
| nn0 | 0.90 | 1.64 | 0.19 | 9.69 | 0.03 | 13.00 | 0.13 | 0.14 | 0.24 | 5.34 | 21.54 | 3.70 | 1.73 | 11.55 | 10.90 | 19.28 |
| not | 8.31 | 6.33 | 0.30 | 2.05 | 0.00 | 2.05 | 0.00 | 0.00 | 0.75 | 3.28 | 4.33 | 15.19 | 4.78 | 40.65 | 9.06 | 2.90 |
| ord | 4.12 | 1.39 | 3.42 | 2.41 | 0.00 | 69.34 | 0.00 | 0.21 | 0.11 | 5.62 | 3.48 | 0.70 | 0.75 | 2.09 | 2.25 | 4.12 |
| ppS | 10.93 | 0.00 | 0.34 | 0.06 | 0.00 | 81.88 | 0.00 | 1.10 | 0.01 | 5.03 | 0.02 | 0.40 | 0.00 | 0.20 | 0.01 | 0.03 |
| pp0 | 2.72 | 2.01 | 0.25 | 2.24 | 0.02 | 11.29 | 0.13 | 0.10 | 0.33 | 4.30 | 4.71 | 5.17 | 1.15 | 29.81 | 28.66 | 7.09 |
| prp | 8.12 | 36.32 | 1.21 | 0.19 | 0.00 | 26.72 | 0.04 | 0.09 | 7.08 | 15.35 | 0.19 | 1.22 | 0.02 | 2.96 | 0.05 | 0.45 |
| rb0 | 12.66 | 6.27 | 0.82 | 5.98 | 0.05 | 3.25 | 0.36 | 0.11 | 1.15 | 10.84 | 12.35 | 8.10 | 1.92 | 12.14 | 10.46 | 13.53 |
| to0 | 0.01 | 0.02 | 0.00 | 0.03 | 0.00 | 0.09 | 0.01 | 0.00 | 0.01 | 0.03 | 0.01 | 0.14 | 0.00 | 99.32 | 0.03 | 0.31 |
| vb0 | 6.29 | 12.67 | 0.47 | 3.08 | 0.07 | 5.37 | 2.56 | 0.07 | 2.83 | 15.01 | 8.04 | 12.21 | 4.10 | 12.77 | 9.40 | 5.05 |
| vbd | 5.19 | 11.14 | 0.69 | 3.74 | 0.08 | 5.38 | 1.74 | 0.17 | 3.51 | 11.75 | 15.70 | 14.60 | 4.18 | 4.13 | 9.44 | 8.54 |

We shall consider the sentence

The man still saw her. (101)

With the One-Row Keyboard, there are several ambiguities since the following words have the same signature:
bye, the
man, may
saw, was.
hence, for the first position we have to separately consider the following two cases:

$$\text{Prob}(the|\kappa_0)\text{Prob}(\kappa_0|\kappa_{-1}) \quad (102)$$

and $$\text{Prob}(bye|\kappa_0)\text{Prob}(\kappa_0|\kappa_{-1}) \quad (103)$$

For each word we then need to look at the set of tags with nonzero probability, cf. Table 16. For the word "the", we have $\kappa_0 \in \{AT, PPO\}$. For the probabilities, we see that Prob(the|AT)≈0.6639 and Prob(the|PPO)≈0.00001, and according to Table 15, Prob(AT|start)≈0.0756 while Prob(PPO|start)≈0.3507. Hence, the products corresponding to (102) are approximately $$5.020 \cdot 10^{-2} \text{ and } 2.670 \cdot 10^{-6},$$

cf. Table 16.

TABLE 16

Tags and probabilities.
The man still saw her.

| i | $w_i$ | $\kappa_i$ | $\kappa_i - 1$ | Prob($w_i|\kappa_i$) · 100 | Prob($\kappa_i|\kappa_i - 1$) · 100 | Prob($w_i|\kappa_i$) · Prob($\kappa_i|\kappa_i - 1$) |
|---|---|---|---|---|---|---|
| 0 | the | at0 | {2} | 68.246 | 11.735 | $8.009 \cdot 10^{-2}$ |
|   |     | pp0 | {2} | 0.001 | 38.305 | $5.085 \cdot 10^{-6}$ |
|   | bye | inj | {2} | 0.104 | 1.309 | $1.367 \cdot 10^{-5}$ |
|   |     | nn0 | {2} | 0.001 | 13.850 | $9.649 \cdot 10^{-7}$ |
| 1 | man | nn0 | at0 | 0.442 | 69.977 | $3.091 \cdot 10^{-3}$ |
|   |     | nn0 | inj | 0.442 | 14.718 | $6.501 \cdot 10^{-4}$ |
|   |     | nn0 | nn0 | 0.442 | 13.000 | $5.742 \cdot 10^{-4}$ |
|   |     | nn0 | pp0 | 0.442 | 11.291 | $4.987 \cdot 10^{-4}$ |
|   | may | nn0 | at0 | 0.013 | 69.977 | $8.775 \cdot 10^{-5}$ |
|   |     | nn0 | inj | 0.013 | 14.718 | $1.846 \cdot 10^{-5}$ |
|   |     | nn0 | nn0 | 0.013 | 13.000 | $1.630 \cdot 10^{-5}$ |
|   |     | nn0 | pp0 | 0.013 | 11.291 | $1.416 \cdot 10^{-5}$ |
|   |     | vb0 | at0 | 0.979 | 0.056 | $5.441 \cdot 10^{-6}$ |
|   |     | vb0 | inj | 0.979 | 6.785 | $6.644 \cdot 10^{-4}$ |
|   |     | vb0 | nn0 | 0.979 | 11.552 | $1.131 \cdot 10^{-3}$ |
|   |     | vb0 | pp0 | 0.979 | 29.810 | $2.919 \cdot 10^{-3}$ |
| 2 | still | aj0 | nn0 | 0.060 | 0.905 | $5.387 \cdot 10^{-6}$ |
|   |     | aj0 | vb0 | 0.060 | 6.293 | $3.746 \cdot 10^{-5}$ |
|   |     | rb0 | nn0 | 1.463 | 3.698 | $5.409 \cdot 10^{-4}$ |
|   |     | rb0 | vb0 | 1.463 | 12.212 | $1.786 \cdot 10^{-3}$ |
| 3 | saw | nn0 | aj0 | 0.003 | 63.421 | $2.209 \cdot 10^{-5}$ |
|   |     | nn0 | rb0 | 0.003 | 3.248 | $1.131 \cdot 10^{-6}$ |
|   |     | vbd | aj0 | 0.544 | 0.450 | $2.449 \cdot 10^{-5}$ |
|   |     | vbd | rb0 | 0.544 | 10.457 | $5.690 \cdot 10^{-4}$ |
|   | was | vb0 | aj0 | 0.001 | 0.807 | $1.046 \cdot 10^{-7}$ |
|   |     | vb0 | rb0 | 0.001 | 12.145 | $1.573 \cdot 10^{-6}$ |
|   |     | vbd | aj0 | 15.118 | 0.450 | $6.804 \cdot 10^{-4}$ |
|   |     | vbd | rb0 | 15.118 | 10.457 | $1.581 \cdot 10^{-2}$ |
| 4 | her | ppS | nn0 | 19.125 | 0.238 | $4.557 \cdot 10^{-4}$ |
|   |     | ppS | vbd | 19.125 | 3.513 | $6.718 \cdot 10^{-3}$ |
|   |     | pp0 | nn0 | 1.917 | 5.345 | $1.024 \cdot 10^{-3}$ |
|   |     | pp0 | vbd | 1.917 | 11.754 | $2.253 \cdot 10^{-3}$ |

Similarly, for the word "bye", $\kappa_0 \in \{INJ, NN\}$, and the two corresponding probabilities are Prob(bye|INJ)≈0.00400 and Prob(bye|NN)≈0.00001. In Table 15 we find Prob(INJ|start)≈0.0542 and Prob(NN|start)≈0.1120. The products in (103) are then $2.169 \cdot 10^{-4}$ and $6.121 \cdot 10^{-7}$.

The largest of all four numbers is clearly the one corresponding to "the" and $\kappa_0$=AT.

Now, for the second position we have two competing words, "may" and "man". Since we are assuming that the user adjusts the input as the process proceeds, we only need to consider the previous tags of "the", and for simplicity we shall ignore the PPO tag, leaving just one, AT. The three competing products are then Prob(man|NN) Prob(NN|AT) Prob(the|AT)Prob(AT|start)$1.5552 \cdot 10^{-4}$ Prob(may|NN) Prob(NN|AT) Prob(the|AT)Prob(AT|start)$3.9121 \cdot 10^{-6}$ Prob(may|VB) Prob(VB|AT) Prob(the|AT)Prob(AT|start)$4.2414 \cdot 10^{-7}$ Of course, the largest corresponds to "man" with tag NN, and "the" with tag AT.

In the third position, we only have the word "still" but it has three possible tags (see Table 16): NN, AJ, and RB. We must then choose between the following:

Prob(still|NN)Prob(NN|NN)Prob(man|NN)Prob(NN|AT)Prob(the|AT)Prob(AT| start)

Prob(still|AJ)Prob(AJ|NN)Prob(man|NN)Prob(NN|AT)Prob(the|AT)Prob(AT| start)

Prob(still|RB)Prob(RB|NN)Prob(man|NN)Prob(NN|AT)Prob(the|AT)Prob(AT| start)

These products approximately equal $1.0928 \cdot 10^{-10}$, $9.7775 \cdot 10^{-10}$, and $8.3623 \cdot 10^{-8}$. Hence, the largest is the last one, which corresponds to <The, AT><man, NN><still, RB>.

In the next position we have either "saw", with three tags (NN, VB, and VBD), or "was" with essentially one tag (VBD). As long as we do our search exhaustively (like above), then there are 9 products to consider for "saw" and 6 for "was", and, hence, we need to compare 15 products. The largest one of these is <the, AT><man, NN><still, RB><was, VBD> with probability $1.24908 \cdot 10^{-9}$ Hence, in this particular instance we would select the wrong word based on these probabilities.

Finally, we have the word "her" with two tags (PPO and PP$). Hence, we need to calculate 18 products. There are two possibilities with significantly larger probabilities than the rest: $2.788 \cdot 10^{-13}$, $1.02836 \cdot 10^{-13}$. The largest one of these corresponds to the "correct" one:

<The, AT><man, NN><still, RB><saw, VBD><her, PPO>

Remark 3.1 There is one useful remark to make concerning the calculation and normalization of the probabilities of a transition matrix (like the one used in the previous example). Suppose we have a transition matrix $T = \{T_{i,j}\}_{i,j=0}^{n-1}$ of transition probabilities $T_{i,j}$=Prob(j|i) from state i to state j, $0 \leq i, j \leq n-1$. Then clearly, the column sums must be one:

$$\sum_j T_{i,j} = 1, i = 0, \ldots, n-1. \quad (104)$$

Further, it is convenient if we can rely on the following relationship for the probabilities of the different states $P_i$:

$$P_j = \sum_i T_{i,j} P_i. \quad (105)$$

This expression captures the fact that the collection of states i exhausts all the possibilities for ending up in state j. Now, if we want (104) and (105) to hold and, in addition, to be able to treat each sentence as a separate entity, then we have to be a little careful with how we introduce the start and end symbols. There are a couple of ways to do this. For example, one can introduce an infinite number of start states and end states. Another way, which we follow here, is to make the assumption that the end state transitions into the start state with probability 1. Since the probability of the start symbol is the same as that of the end symbol, the expression (105) will then still hold. For the bigram model, this "periodization" also makes it possible to treat sentences separately since the probability of the transition into the start symbol of a new sentence does not depend on any of the tags of the previous sentence except the end tag. Note that for a higher order model, we need to have more start and end symbols for this to be the case. We observe that the equation (105) shows that the probabilities $P_i$ are eigenvectors of the transition matrix τ corresponding to the eigenvalue 1.

Let us now return to the general case and equation (100). To calculate this quantity and hence an approximate solution of the optimization problem (94) we can, of course, do it exhaustively; however, as we saw in the example, there is then a very quickly growing number of possibilities to consider. Instead, the standard approach is to use the Viterbi algorithm. It uses the recursive nature of the right-hand side of (100). More specifically, let us introduce the notation $$V_L(\kappa_L) = \max_{\kappa_0, \ldots, \kappa_{L-1}} \prod_0^L Prob(\kappa_m \mid \kappa_{m-1}) Prob(w_m \mid \kappa_m), \quad (106)$$

$0 \leq L \leq M$ and $$V_{-1}(\kappa - 1) = 1. \quad (107)$$

Then obviously $$\max_{\kappa_0, \ldots, \kappa_M} \prod_0^M Prob(\kappa_m \mid \kappa_{m-1}) Prob(w_m \mid \kappa_m) = \max_{\kappa_M} V_M(\kappa_M), \quad (108)$$

which is part of what we need for (100). Notice that $V_L(\kappa_L)$ is the (approximation of the) largest probability Prob($\kappa_0, \ldots, \kappa_{L-1}, \kappa_L, w_0, \ldots, w_{L-1}, w_L$) with the side-condition that the last tag $\kappa_L$ is fixed (and the words $w_0, \ldots, w_L$ fixed).

On the other hand, by separating out the factor corresponding to m=L from the product in the definition (106)

and noticing that this factor is constant while we take the maximum over $\kappa_0, \ldots, \kappa_{L-2}$, we see that $V_L$ satisfies the recursive relation $$V_L(\kappa_L) = \max_{\kappa_{L-1}} \text{Prob}(w_L|\kappa_L)\text{Prob}(\kappa_L|\kappa_{L-1})V_{L-1}(\kappa_{L-1}), \quad 0 \leq L \leq M. \tag{109}$$

Note that the $\kappa_{L-1}$ for which the maximum is attained on the right-hand side here is a function of $\kappa_L$. We shall denote this function by $B_L(\kappa_L)$:

$$B_L(\kappa_L) = \arg\max_{\kappa_{L-1}} \text{Prob}(w_L|\kappa_L)\text{Prob}(\kappa_L|\kappa_{L-1})V_{L-1}(\kappa_{L-1}), 1 \leq L \leq M, \tag{110}$$

and $$B_o(\kappa_0) = \kappa_{-1}. \tag{111}$$

Since $\text{Prob}(w_L|\kappa_L)$ is independent of $\kappa_{L-1}$, $$B_L(\kappa_L) = \arg\max_{\kappa_{L-1}} \text{Prob}(\kappa_L|\kappa_{L-1})V_{L-1}(\kappa_{L-1}), 1 \leq L \leq M. \tag{112}$$

Now, let us review how we can go about solving (100). We consider each $\tau_M$ separately. We obtain $\hat{\kappa}_M$ from (108):

$$\hat{\kappa}_M = \arg\max_{\kappa_M} V_M(\kappa_M). \tag{113}$$

This is easy if we have $V_M(\kappa_M)$ for all possible tags $\kappa_M$, and for this we use the recursive relation (109). At each step $0 \leq L \leq M$, it gives us $V_L(\kappa_L)$ for all possible tags $\kappa_L$. Once we have $\hat{\kappa}_M$, then we can use the recursive relation for $B_L$ to obtain the other $\hat{\kappa}_L$, $0 \leq L \leq M-1$:

$$\hat{\kappa}_{L-1} = B_L(\hat{\kappa}_L), 1 \leq L \leq M. \tag{114}$$

This is possible as long as we know $B_L(\kappa_L)$ for all possible tags rL at each step L, $1 \leq L \leq M$. This, in turn, simply means that we record for which tag rL-1 the maximum is attained as we calculate $V_L(\kappa_L)$ using (109).

We have now derived and explained the Viterbi algorithm; cf. [4], [41], and especially [31] (and perhaps some reference on dynamic programming like [59]). We also remark that the multiplicative nature of most of the quantities involved in (100) and its solution make it particularly attractive to use the logarithm of the different quantities. Of course, since logx is an increasing function, it is equivalent to maximize (100) and the logarithm of the expression.

EXAMPLE 3.1 CONT'D

As an illustration, let us calculate the quantities $V_L$, $B_L$, $0 \leq L < 4$ for the sentence (101): "The man still saw her."

We have $$V_0(\kappa_0) = \text{Prob}(\text{The}|\kappa_0)\text{Prob}(\kappa_0|\kappa_{-1}) = \begin{cases} 5.02 \cdot 10^{-2} & \text{if } \kappa_0 = AT \\ 0 & \text{otherwise} \end{cases}, \text{ and}$$

$B_0(\kappa_0) = \text{start}$, for all $\kappa_0$. For $V_1$ we have $$V_1(\kappa_1) = \text{Prob}(\text{man}|\kappa_1)\text{Prob}(\kappa_1|AT)V_0(AT) = \begin{cases} 1.55 \cdot 10^{-4} & \text{if } \kappa_1 = NN \\ 0 & \text{otherwise} \end{cases}, \text{ and}$$

$B_1$ is simply $B_1(\kappa_1) = AT$ for all $\kappa_1$. $V_2$ is given by $$V_2(\kappa_2) = \max_{\kappa_1} \text{Prob}(\text{still}|\kappa_2)\text{Prob}(\kappa_2|\kappa_1)V_1(\kappa_1) =$$

-continued $$\begin{cases} 1.09 \cdot 10^{-10} & \text{if } \kappa_2 = NN \\ 8.36 \cdot 10^{-8} & \text{if } \kappa_2 = RB \\ 9.77 \cdot 10^{-10} & \text{if } \kappa_2 = AJ \\ 0 & \text{otherwise} \end{cases}, \text{ and}$$

$B_2$ is $B_2(\kappa_2) = NN$ for all $\kappa_2$. The function $V_3$ is then $$V_3(\kappa_3) = \max_{\kappa_2} \text{Prob}(\text{saw}|\kappa_3)\text{Prob}(\kappa_3|\kappa_2)V_2(\kappa_2) =$$

$$\begin{cases} 6.74 \cdot 10^{-14} & \text{if } \kappa_3 = NN \\ 8.55 \cdot 10^{-14} & \text{if } \kappa_3 = VB \\ 4.69 \cdot 10^{-11} & \text{if } \kappa_3 = VBD \\ 0 & \text{otherwise} \end{cases}, \text{ and}$$

$B_3$ is $B_3(\kappa_3) = RB$ for all $\kappa_3$. Finally, $$V_4(\kappa_4) = \max_{\kappa_3} \text{Prob}(\text{her}|\kappa_4)\text{Prob}(\kappa_4|\kappa_3)V_3(\kappa_3) =$$

$$\begin{cases} 2.79 \cdot 10^{-13} & \text{if } \kappa_4 = PP\$ \\ 1.03 \cdot 10^{-13} & \text{if } \kappa_4 = PPO \\ 0 & \text{otherwise} \end{cases}, \text{ and}$$

$B_4$ is $B_4(\kappa_4) = VBD$ for all $\kappa_4$.

Now, using the expression for $V_4$, we see that $\hat{\kappa}_4 = \arg\max_{\kappa_4} V_4(\kappa_4) = PPO$. Then using the different $B_L$'S to backtrack, we find $\hat{\kappa}_3 = VBD$, $\hat{\kappa}_2 = RB$, $\hat{\kappa}_1 = NN$, and $\hat{\kappa}_0 = AT$. This corresponds to the following sequence <The, AT><man, NN><still, RB><saw, VBD><her, PPO>.

Next we shall go through the changes necessary for a trigram model. The basic problem is still the same of course, see (93) and (94). Starting with the expression (96), a consequence of the "Chain Rule", (96), the trigram model means that $$\text{Prob}(\kappa_0, \ldots, \kappa_M) \approx \prod_{m=0}^{M} \text{Prob}(\kappa_m|\kappa_{m-1}, \kappa_{m-2}). \tag{115}$$

Here we define $\kappa_{-1} = \kappa_{-2}$ both as starting tags. In particular, $\text{Prob}(\kappa_0|\kappa_{-1},\kappa_{-2})$ is the probability that the sequence of words (or more generally character combinations) start with a $\kappa_0$ tag. Similarly, $\text{Prob}(\kappa_1|\kappa_0,\kappa_{-1})$ is the probability that $\kappa_1$ comes as the second tag after a $\kappa_0$. Sometimes it may be reasonable to approximate these simply by $\text{Prob}(\kappa_0)$ and $\text{Prob}(\kappa_1|\kappa_0)$, respectively. The definition of the basic quantity $V_L$ is now $$V_L(\kappa_L, \kappa_{L-1}) = \tag{116}$$

$$\max_{\kappa_0, \ldots, \kappa_{L-2}} \prod_{0}^{L} \text{Prob}(\kappa_m|\kappa_{m-1}, \kappa_{m-2})\text{Prob}(w_m|\kappa_m),$$

$$1 \leq L \leq M \text{ and}$$

$$V_{-1}(\kappa_{-1}, \kappa_{-2}) \tag{117}$$

With this, the recursive relation replacing (109) is $$V_L(\kappa_L, \kappa_{L-1}) = \max_{\kappa_{L-2}} \text{Prob}(w_L|\kappa_L)\text{Prob}(\kappa_{L-1}|\kappa_{L-2})V_{L-1}(\kappa_{L-1}\kappa_{L-2}), 0 \leq L \leq M. \tag{118}$$

The corresponding function $B_L(\kappa_L,\kappa_{L-1})$ is defined by $$B_L(\kappa_L,\kappa_{L-1}) = \max_{\kappa_{L-2}} \text{Prob}(w_L|\kappa_L)\text{Prob}(\kappa_{L-1},\kappa_{L-2})V_{L-1}(\kappa_{L-1},\kappa_{L-2}), 1 < L \leq M. \quad (119)$$

and $$B_0(\kappa_0,\kappa_{-1}) = \kappa_{-2}. \quad (120)$$

Since $\text{Prob}(w_L|\kappa_L)$ is independent of $\kappa_{L-2}$, $$B_L(\kappa_L,\kappa_{L-1}) = \max_{\kappa_{L-2}} \text{Prob}(\kappa_L|\kappa_{L-1},\kappa_{L-2})V_{L-1}(\kappa_{L-1},\kappa_{L-2}), 1 \leq L \leq M. \quad (121)$$

With these modifications, the Viterbi algorithm works as before.

Remark 3.2 A similar remark as Remark 3.1 applies to higher order models as well. For example, in the trigram case we have a transition "matrix" $T = \{T_{i,j,k}\}_{i,j,k=0}^{n-1}$ of transition probabilities $T_{i,j,k} = \text{Prob}(k|j,i)$ from states i followed by j into state k, $0 \leq i,j,k \leq n-1$. Then clearly, the column sums must be one:

$$\sum_k T_{i,j,k} = 1, i, j = 0, \ldots, n-1. \quad (122)$$

Also, $$T_{j,k}P_j = \sum_i T_{i,j,k}T_{i,j}P_i, \quad (123)$$

where $T_{j,k} = \text{Prob}(k|j)$ is the bigram transition matrix. Hence, for each fixed j, $\{T_{i,j}P_i\}_i$ is an eigenvector of $\{T_{i,j,k}\}_{i,k}$ corresponding to the eigenvalue 1. To be able to treat each sentence separately in the analogous manner to the bigram case, we now need at least as many symbols for the start and end as the order of the model. So for the trigram we need at least three symbols. However, in many of our experiments we work with two end symbols and two start symbols (all with the same probability). Of course, for the periodization to work, either way is satisfactory.

We remark that the above changes for the trigram model, and analogous modifications for other higher order models, can easily be derived directly from the bigram model by adopting a "vector" notation for the states, just like a higher order Markoᵛmodel can be viewed as a first order one by changing the definition of the states. For example, to derive the trigram model we may introduce the notation $$\vec{\kappa}_i = (\kappa_i, \kappa_{i-1}), \quad (124)$$

and then the derivation used for the bigram model produces the above formulas (with some trivial, mostly notational differences) for the trigram case. With this understanding, we now go back to the bigram case since it illustrates sufficiently well the general case and is a little simpler from a notation point of view. Let us once again consider the approximate solution (100). Until now, we have treated the different words with a given signature $\sigma_M$ and different dual signatures $\tau_M$ separately, obtaining the maximum over $\tau_M$ by repeating the same basic process for each separate word and, afterwards, comparing and taking the maximum. This is also how we have approached the discussion of the Viterbi algorithm, see (113) and (114) and the text there. There is another way to handle the dual signatures $\tau$ which is more useful in several ways.

The maximums in (100) can, of course, be taken in any order. Instead of leaving the maximum over $\tau_M$ until last, let us start with it. The only factor that depends on $\tau_M$ in the product is $\text{Prob}(w_M|\kappa_M)$. So the maximum is obtained by maximizing just this factor over $\tau_M$. Suppose we let w denote the maximum likelihood estimator of a word, given the tag $\kappa$ and the signature $\sigma$:

$$\hat{w} = \hat{w}(\sigma,\kappa) = \arg\max_w \text{Prob}(w|\sigma,\kappa). \quad (125)$$

Then the maximum over $\tau_M$ in (100) is obtained for $$\hat{w}_M = \hat{w}_M(\sigma_M,\kappa_M), \quad (126)$$

and the maximum value of the factor $\text{Prob}(w_M|\kappa_M)$ is $\text{Prob}(\hat{w}_M|\kappa_M)$. This follows, for instance, from the fact that $$\text{Prob}(w|\kappa) = \text{Prob}(\sigma|\kappa)\text{Prob}(w|\sigma,\kappa)$$

and, hence, $$\arg\max_\tau \text{Prob}(w|\kappa) = \arg\max_\tau \text{Prob}(\sigma|\kappa)\text{Prob}(w|\sigma,\kappa) = \arg\max_\tau \text{Prob}(w|\sigma,\kappa).$$

We have briefly touched upon the quantity (126) earlier in connection with the discussion of our first motivation for our approach, back in Subsection 3.3, and then more fully in Appendix Appendix B, subsection B.2. As we observed in Subsection 3.3, the tags for the different words within a "collision group" (the group of words with a certain signature) overlap very little. In fact, in Appendix Appendix B, subsection B.2 we saw that with 99.6% probability (on the average) this maximum likelihood estimator pinpoints the right word, as long as the tag NM is correct. Hence, with very little error, we may think of the tag sets for the different words within a collision group as being disjoint, without overlap.

Similarly, the maximum over $\tau_M$ is easily incorporated directly into the Viterbi algorithm. We simply replace the quantity $V_M$ in (106) by $$\hat{V}_M(\kappa_M) = \max_{\tau_M} V_M(\kappa_M). \quad (127)$$

Then the maximum on the right-hand side of (100) is given by $$\max_{\kappa_M} \hat{V}_M(\kappa_M). \quad (128)$$

Only the last term L=M needs to be modified in the recursive relation (109):

$$\hat{V}_M(\kappa_M) = \max_{\kappa_{M-1}} \text{Prob}(\hat{w}_M|\kappa_M)\text{Prob}(\kappa_M|\kappa_{M-1})V_{M-1}(\kappa_{M-1}). \quad (129)$$

The functions $B_L$, $0 \leq L \leq M$ are not affected, cf. equation (112). Instead of equation (113), we now obtain both $\hat{\kappa}_M$ and $\hat{\tau}_M$ from $$\hat{\kappa}_M,\hat{\tau}_M = \arg\max_{\kappa_M,\tau_M} V_M(\kappa_M) = \arg_{\tau_M} \arg\max_{\kappa_M} \hat{V}_M(\kappa_M). \quad (130)$$

This change in the handling of $\tau_M$ also suggests a different interpretation of the underlying Hidden Markoᵛ Model. As long as we treat the different $\tau_M$'s separately, we are considering several different Hidden Markoᵛ Models, one for each $\tau_M$, and each producing a word $w_M$ with the output probability $\text{Prob}(w_M|\kappa_M)$. The hiddens states, however, are the same for all of these models. Alternatively, by moving the maximum over $\tau_M$, we may think of the process as one "Hidden Markov Model" that outputs the maximum likelihood estimator $w_M$ in the Mth step with probability $\text{Prob}(\hat{w}_M|\kappa_M)$. Note, however, that the process just described is strictly speaking not a Hidden Markov Model since the sum of all the probabilities $\text{Prob}(\hat{w}_M|\kappa_M)$ for each fixed $\kappa_M$ is in general strictly less than one.

Let us now also take a closer look at the recursive relation (109) for $V_M$. We write $$V_M = V_M(\kappa_M, \tau_M) = \text{Prob}(w_M|\kappa_M) Q_{M-1}(\kappa_M) \tag{131}$$

with $$Q_{M-1}(\kappa_M) = \max_{\kappa_{M-1}} \text{Prob}(\kappa_M|\kappa_{M-1}) V_{M-1}(\kappa_{M-1}). \tag{132}$$

The function $Q_{M-1}$ is the probability of the path up to the $M-1$th step. In order to obtain the (approximate) solution of the optimization problem (93), given by the right-hand side of (100), we just take the maximum over $\kappa_M$ and $\tau_M$ of $V_M$. More generally, if we are interested in finding the K most likely words and tags, we just have to pick the K largest ones of the numbers $\{V_M(\kappa_M,\tau_M)\}_{\kappa_M,\tau_M}$. We shall say that the probabilities $\{\text{Prob}(w_M|\kappa_M,M)\}_{\kappa_M,\tau_M}$ have been Q-ordered when the sequence $\{V_M(\kappa_M,\tau_M)\}_{\kappa_M,\tau_M}$ is rearranged in nonincreasing order.

We may want to use these numbers $\{V_M(\kappa_M,\tau_M)\}_{\kappa_M,\tau_M}$ to decide in what order to display the different possible alternatives. The solution to the maximum likelihood problem is then the word that goes on the screen in the input area. The other words correspond to the different alternatives. Notice that $V_M(\kappa_M,\tau_M)$'s corresponding to different $\tau$'s will result in different words. So, for display purposes we are in effect using a slightly different ordering than the Q ordering: starting from the sequence $\{V_M(\kappa_M,\tau_M)\}_{\kappa_M,\tau_M}$, we generate the new sequence $\{V_M^*(\tau_M)\}_{\tau_M}$ by letting $$V_M^*(\tau_M) = \max_{\kappa_M} V_M(\kappa_M,\tau_M) \tag{133}$$

We shall say that the words $w_M$ for the different T's (and a fixed) have been Q*-ordered when the corresponding sequence $\{V_M^*(\tau_M)\}_{\tau_M}$ has been rearranged in a nonincreasing fashion.

It is now clear how to refine the results from the previous sections to incorporate the considerations in this one. Given a dictionary D we let $D(\kappa)$ be the collection of all words with tag $\kappa$.

Similarly, if $\overline{D}$ is the collection of all valid character combinations, then for each $\kappa$ we let $\overline{D}(\kappa)$ be the valid character combinations corresponding to the entities in $D(\kappa)$. Also, $\overline{D}(\sigma,\kappa)$ are generated by the character combinations of elements in D with signature $\sigma$ and tag $\kappa$.

Clearly, $$\overline{D} = \cup_\kappa \overline{D}(\kappa) = \cup_{\sigma,\kappa} \overline{D}(\sigma,\kappa). \tag{134}$$

Now we can work with character combinations $w \in \overline{D}$ instead of just the complete words $w \in D$. For example, in connection with the Viterbi algorithm and equation (131) we use the quantity $$\overline{V}_M = \overline{V}_M(\kappa_M, w_M) = \text{Prob}(w_M|\kappa_M) Q_{M-1}(\kappa_M), w_M \in \overline{D} \tag{135}$$

in the last step, as the user is entering characters. These valid letter combinations can now also be Q*-ordered, using the function $\overline{V}_M$ instead of $V_M$. For display purposes we can choose to display the character combinations with that order or we can also use a cost function, see Section 5. For example, the analog of the maximum likelihood solution (175) is now $$\min_{u \in \overline{D}(\sigma)} \sum_\kappa \sum_{w \in \overline{D}(\sigma,\kappa)} C_i(w,u) \overline{V}_M(\kappa,w). \tag{136}$$

The starting point for our discussion of the Markov model approach has been equation (93). The underlying assumption is that we are interested in finding the maximum likelihood estimation of both the dual signature of the M:th word as well as the tag sequence that is most likely to capture the user's intended meaning. Next, we shall outline how the same basic arguments and models also provide an approximation of the maximum likelihood solution $$\hat{\tau}_M = \arg\max_{\tau_M} \text{Prob}(\tau_M|w_0,\ldots,w_{M-1},\sigma_M), \tag{137}$$

as well as an analog of the Viterbi algorithm. Both of the problems (93) and (137) are interesting for the disambiguation of the input from a reduced keyboard. The first one provides us with a way of trying to understand and predict the user's intention, while the second ignores this aspect (modulo the basic underlying model) and simply asks for the most likely dual signature, no matter what the particular tag sequence is.

Now, with the same argument as before, we have $$\hat{\tau}_M = \arg\max_{\tau_M}\{\text{Prob}(w_0,\ldots,W_{M-1},w_M):w_M=(\sigma_M,\tau_M)\}. \tag{138}$$

By considering all possible state sequences, we may rewrite this as $$\hat{\tau}_M = \arg\max_{\tau_M} \sum_{\kappa_0,\ldots,\kappa_M} \{\text{Prob}(\kappa_0,\ldots,\kappa_M,\omega_0,\ldots,\omega_{M-1},\omega_M):\omega_M=(\sigma_M,\tau_M)\}. \tag{139}$$

This replaces (94) in the earlier argument. With the conditions (97) (the Markov condition) and (98) (the independence condition) we obtain $$\hat{\tau}_M \approx \arg\max_{\tau_M} \sum_{\kappa_0,\ldots,\kappa_M} \left\{ \prod_0^M \text{Prob}(\kappa_m|\kappa_{m-1})\text{Prob}(\omega_m|\kappa_m):\omega_M=(\sigma_M,\tau_M) \right\}. \tag{140}$$

This is thus the replacement for equation (100), which was our starting point for the discussion of the Viterbi algorithm.

Note that the difference between the two equations (100) and (140) is that the maximum over the tags in the former is replaced by the sum in the latter.

The analog of the Viterbi algorithm is just as easy. Let us introduce $$U_L(\kappa_L) = \sum_{\kappa_0,\ldots,\kappa_{L-1}} \prod_0^L Prob(\kappa_m|\kappa_{m-1})Prob(\omega_m|\kappa_m), \ 0 \leq L \leq M \quad (141)$$

and $$U_{-1}(\kappa_{-1}) = 1. \quad (142)$$

Then $$\sum_{\kappa_0,\ldots,\kappa_M} \prod_0^M Prob(\kappa_m|\kappa_{m-1})Prob(\omega_m|\kappa_m) = \sum_{\kappa_M} U_M(\kappa_M), \quad (143)$$

and the approximate solution needed in (140) is then obtained by taking the maximum over $\tau_M$ on the right-hand side. The recursive relation for $U_L$ is $$U_L(\kappa_L) = \sum_{\kappa_{L-1}} Prob(\omega_L|\kappa_L) Prob(\kappa_L|\kappa_{L-1}) U_{L-1}(\kappa_{L-1}), \ 0 \leq L \leq M. \quad (144)$$

Given this expression it is now clear how to modify the other equations and definitions above, including the definitions of the Q and Q*-orderings.

We shall refer to the modification of the Viterbi algorithm outlined above as the "Forward" algorithm.

3.5 Evaluation of the Markov Model Approach

We have evaluated various versions of the Markov model approach, using Corpus 1.

Now, using the bigram Viterbi algorithm, as well as the bigram Forward algorithm, a significant improvement of the "most frequent word algorithm" (i.e., using the most probable word as the prediction within each collision group) is achieved. Specifically, we have found that the overall improvement is approximately $$\frac{\text{\# errors using most frequent} - \text{\#errors using bigram Viterbi}}{\text{\#errors using most frequent}} \approx 33\% \quad (145)$$

We have also investigated the corresponding improvement within each collision group. In the table 17 we have collected the results for the ten collision groups for which the "most frequent algorithm" produces the most errors.

TABLE 17

The impact on the ten collision groups with largest number of errors. (#errors mf/bigram = number of errors using "the most frequent algorithm"/bigram Viterbi)
Most frequent vs. bigram Viterbi.

| # | Words | # errors mf | # errors bigram | % improvement |
|---|---|---|---|---|
| 0 | Total | 1802 | 1631 | 9.49 |
|   | of | 0 | 138 | -100 |
|   | or | 1801 | 1492 | 17.16 |
|   | lr | 1 | 1 | 0.00 |

TABLE 17-continued

The impact on the ten collision groups with largest number of errors. (#errors mf/bigram = number of errors using "the most frequent algorithm"/bigram Viterbi)
Most frequent vs. bigram Viterbi.

| # | Words | # errors mf | # errors bigram | % improvement |
|---|---|---|---|---|
| 1 | Total | 1210 | 1174 | 2.98 |
|   | they | 0 | 104 | -100 |
|   | then | 1210 | 1070 | 11.57 |
| 2 | Total | 965 | 746 | 22.69 |
|   | now | 0 | 518 | -100 |
|   | how | 965 | 228 | 76.37 |
| 3 | Total | 758 | 303 | 60.03 |
|   | most | 0 | 64 | -100 |
|   | just | 758 | 239 | 68.47 |
| 4 | Total | 652 | 426 | 34.66 |
|   | to | 0 | 4 | -100 |
|   | go | 652 | 422 | 35.28 |
| 5 | Total | 636 | 126 | 80.19 |
|   | may | 0 | 67 | -100 |
|   | man | 634 | 57 | 91.01 |
|   | jay | 1 | 1 | 0.00 |
|   | jan | 1 | 1 | 0.00 |
| 6 | Total | 542 | 52 | 90.41 |
|   | way | 0 | 6 | -100 |
|   | say | 538 | 42 | 92.19 |
|   | san | 2 | 2 | 0.00 |
|   | wan | 2 | 2 | 0.00 |
| 7 | Total | 461 | 149 | 67.68 |
|   | good | 0 | 45 | -100 |
|   | told | 433 | 76 | 82.45 |
|   | gold | 20 | 20 | 0.00 |
|   | bold | 5 | 5 | 0.00 |
|   | bloc | 1 | 1 | 0.00 |
|   | bole | 1 | 1 | 0.00 |
|   | tood | 1 | 1 | 0.00 |
| 8 | Total | 414 | 154 | 62.80 |
|   | can | 0 | 29 | -100 |
|   | day | 413 | 124 | 69.98 |
|   | dan | 1 | 1 | 0.00 |
| 9 | Total | 325 | 322 | 0.92 |
|   | was | 0 | 2 | -100 |
|   | saw | 321 | 316 | 1.56 |
|   | sas | 3 | 3 | 0.00 |
|   | wax | 1 | 1 | 0.00 |

3.6 Approximate Typing and Typing Models Revisited

In the previous section we considered approximate typing and typing models. For example, for finding the most likely character combination(s) to present to the user as he provides his input, we have by (11)

$$\hat{v} \approx \arg\max_v Prob(v|\sigma^v) Prob(\sigma^v|\sigma^a) = \arg\max_v Prob(v|\sigma^v) Prob(\sigma^v, \sigma^a). \quad (146)$$

To estimate $Prob(\sigma^v|\sigma^a)$, or equivalently, $Prob(\sigma^v,\sigma^a)$, we also discussed the need for modeling. For example, we suggested the basic model given by equation (58), $p(\sigma^v,\sigma^a) = P)\sigma^v)\pi(\sigma^a|\sigma^v), \sigma^v \in S^v, \sigma^a \in S^a$.

We also illustrated the use of similar arguments involving typing models in connection with speeding up searches. In that case, we may be interested in the most likely valid signature at given a certain typed combination $\sigma^a$:

$$\hat{\sigma}^v = \arg\max_v Prob(\sigma^v|\sigma^a) = \arg\max_v Prob(\sigma^v, \sigma^a). \quad (147)$$

These equations are similar to (94), and in this subsection we shall describe how the the Hidden Markov Model techniques we have discussed relate to the results about approximate typing.

We assume that the intended signature at and the typed signature aa are given by the individual characters $\sigma_i^v$ and $\sigma_j^a$, respectively:

$$\sigma^v = \sigma_0^v \sigma_1^v \ldots \sigma_M^v, \sigma^a = \sigma_0^a \sigma_1^a \ldots \sigma_N^a. \tag{148}$$

Hence, for problems like (146) and (147), we need to estimate $$\text{Prob}(\sigma^v, \sigma^a) = \text{Prob}(\sigma_0^v, \ldots, \sigma_M^v, \sigma_0^a, \ldots, \sigma_N^a). \tag{149}$$

If each intended character corresponded to a keystroke, then we could argue as in the derivation of equation (99) and obtain an estimate. However, the user may sometimes type extra characters or omit intended characters, so such a correspondence is not quite available to us.

While we take a closer look at this, we shall also make the connection with the edit distance more explicit.

Figure 4:
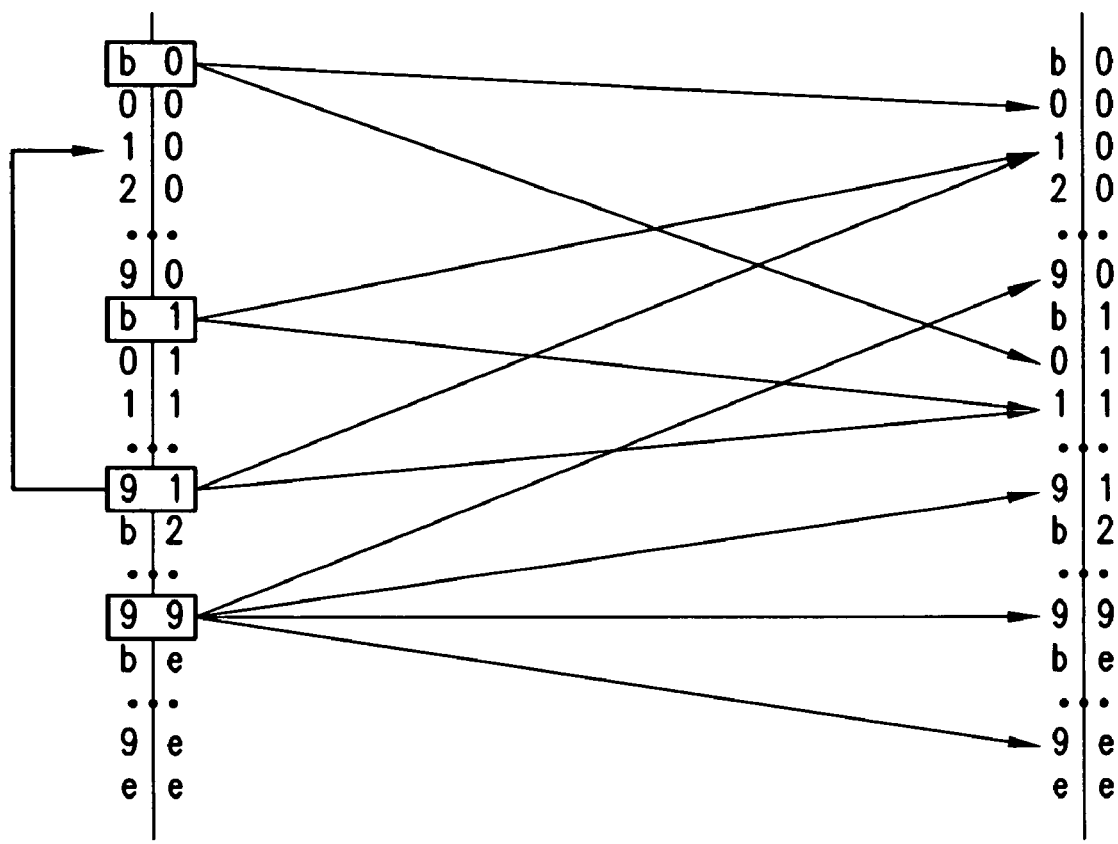
FIG. 4: The states based on the current and previous character, and some representative state transitions.
Figure 5:
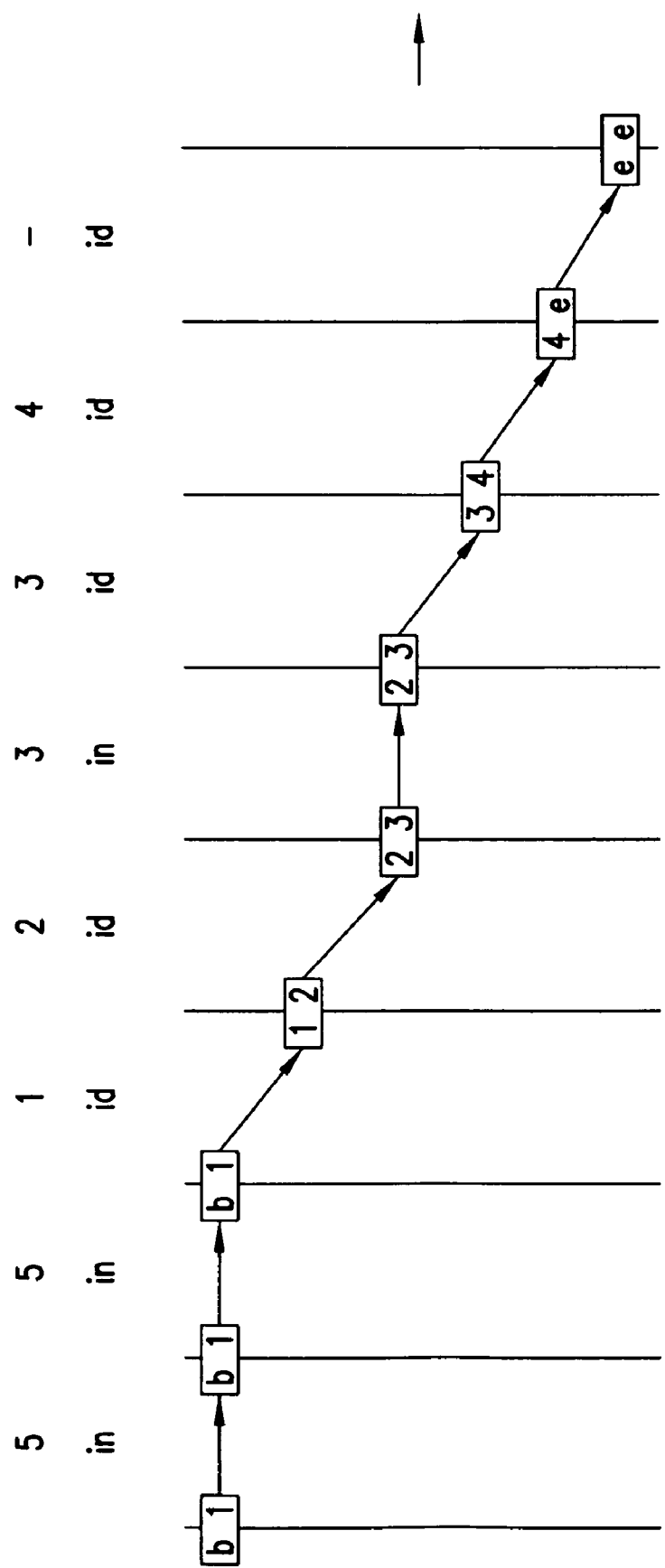
FIG. 5: One possible set of states and operators to generate $\sigma^a=5512334$ from $\sigma^v=1234$.
Figure 6:
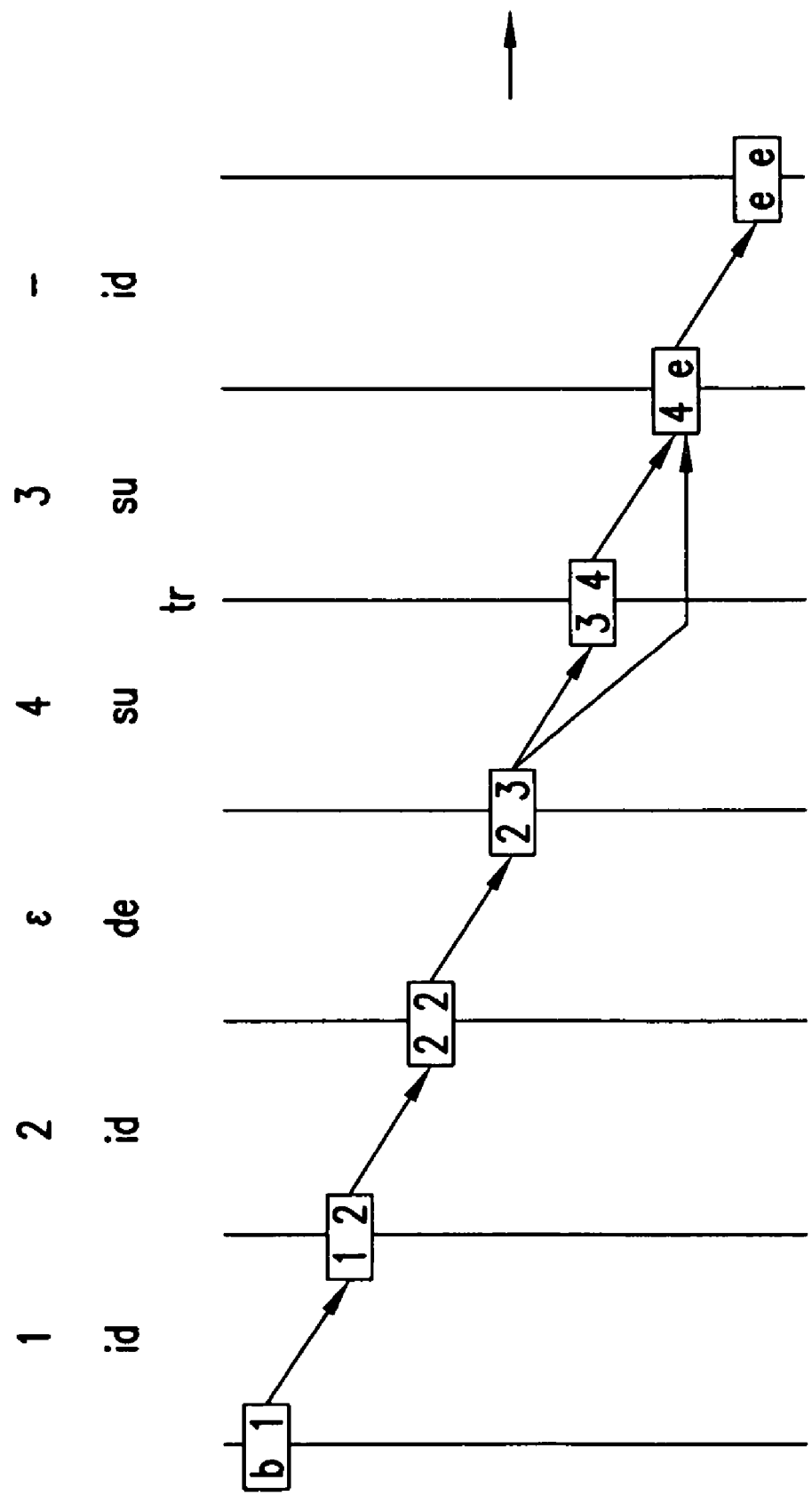
FIG. 6: One possible set of states and operators to generate $\sigma^a=1243$ from $\sigma^v=12234$.

As in Subsections 2.8 and 2.9, we shall use the characters of $\sigma^v$ at the current and previous positions to define our states (this corresponds to the bigrams above); see FIG. 4. For each state, we have versions of the basic operators {id, su, de, in, tr} we have used for the edit distance. And as we step along the characters of a', these operators are applied to produce the output characters of $\sigma^a$; see FIGS. 5 and 6.

So, corresponding to the basic states in FIG. 4, we have the following basic operators:

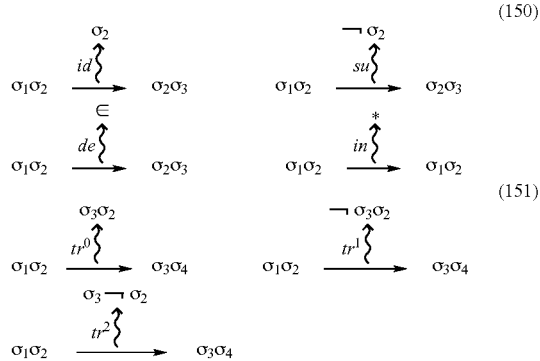

(150)

(151)

Here we have used the notation $\neg \sigma_i$ to denote any of the symbols in the output alphabet besides $\sigma_i$; * is any one of the symbols; and $\epsilon$ is the empty symbol. Note that the transposition operator corresponds to three mutually exclusive possibilities (similar to the fact that substitution breaks up into two separate cases, one corresponding to the identity, and then those that change the character from $\sigma^v$ into something else).

Compared to the setting for the NLP-processing, there are two significant differences to note: there are transitions that do not generate any output, and there are outputs that are generated while there is not state transition. The first corresponds to applying the deletion de operator, and the latter to the insertion operator in; cf. FIGS. 5 and 6. Now, in the context of HMM modeling, both of the differences are part of the well understood modifications of standard HMM:s; the first correspond to so-called null-transitions, and the second involves time-duration modeling when the system may remain in the same state for more than one time unit and the outputs are generated at each clock-tick; cf. [34], p. 23 and [31], p. 406.

With $\kappa_0, \ldots, \kappa_m, w_0, \ldots, w_M$ corresponding to $\sigma^v = \sigma_0^v \ldots \sigma_M^v$ and $\sigma^a = \sigma_0^a \ldots \sigma_N^a$, respectively, the analog of equation (95) is $\text{Prob}(\sigma^v, \sigma^a) = \text{Prob}(\sigma^v) \times \text{Prob}(\sigma^a | \sigma^v)$ or, with our basic model (58), $\text{Prob}(\sigma^v, \sigma^a) \approx p(\sigma^v, \sigma^a) = P(\sigma^v) \pi(\sigma^a | \sigma^v)$. The basic independence assumption, corresponding to equation (98), is now that each character of $\sigma^a$ is independent of the others once we are given the underlying, intended $\sigma^v$:

$$\text{Prob}(\sigma^v | \sigma^a) \approx \prod_0^M \pi(\sigma_i^a | \sigma^v). \tag{152}$$

Further, $\sigma_i^a$ only depends on the two characters of $\sigma^v$ that define the state the system is in when the character is output.

The Markov assumption (97) is here replaced by $P(\sigma^v)$, which is obtained from an appropriate context or corpus. Hence, the analog of equation (99) is simply $$\text{Prob}(\sigma^v, \sigma^a) \approx P(\sigma^v) \prod_0^M \pi(\sigma_i^a | \sigma^v), \tag{153}$$

and this is essentially the approximation we used in Subsections 2.8 and 2.9.

Also, it is clear that the Viterbi algorithm yields essentially the "transform paths" we used back in those subsections as well (there we used the edit distance to obtain these), and that the standard edit distance can also be obtained as a special case of the considerations here.

The Markov assumption (97) may still be quite useful when the probabilities $P(\sigma^v)$ are difficult to obtain.

There is a final comment we want to make about the intersection between the methods in this subsection and approximate typing. In this section, we have assumed that the input process does not involve any input errors. However, it is also clear that the same considerations, relying on POS tags and tagging, can be used in the context of approximate typing. In fact, in the case of the input process with errors, these NLP-type methods work very well to reduce the search for the best alternatives to present to the user.

4 An Implementation of Compact, Tag-Based Disambiguation 4.1 Context-Based Disambiguation The context of a word that has been ambiguously entered has much information that can be used to disambiguate the input to arrive at the actual word. Context can range from context-based dictionaries to words located around the word being typed. The following are some instances:

Target audience: A dictionary adapted to a Wall Street Journal editor will perform better for the corresponding target audience than a general one.

Function/style of text entry: A dictionary adapted to writing SMS messages will perform better for that function than a general one.

Grammatical information: A set of grammatical rules with comparison to actual entry can aid disambiguation.

In general, the information needs to be specialized and ideally adapted to the particular individual using it. In this chapter, a disambiguation mechanism, using word tag information, is suggested that can be applied to text input disambiguation for reduced keyboards and mobile input mechanisms such as T9 and the ORK.

4.2 Use of Tags

Ideally, one would like to use prior information of entire corpora captured in terms of word information. However, it is quite impractical to describe word relations when the solution is aimed at a compact, portable computing system such as a cell phone. For instance, for a Markov-based stochastic model, one would like to have prior probabilities of a word conditioned on the words surrounding it. However, it is virtually impossible to fit all such probability values into a small memory. Hence, a common approach is to figure out common rules that can be applied to groups of words. Grammatical information allows us to derive common strains from varied words and collect these in equivalence classes. The corresponding class can be referred to by a tag. Typically, a word (or other appropriate character unit) can have several tags associated with corresponding probabilities.

For grammatical tags, it is known that the most frequent tag of a word is accurate more than 90% of the time. This is an important piece of information that we will use later to reduce computational complexity and storage, by assuming that the tag of a contextual word is more or less deterministic.

It should be noted that while we intend to apply this method of utilizing tags for representing prior grammatical information, it is equally useful for other word groups also.

4.3 Markov and Rule-Based Approaches

Tagging of words is a well explored area of natural language processing; see the previous section. The process of word disambiguation can be broken down into two parts: first, tagging of the input words/signatures and, second, choosing the word with the maximum probability of the given tag within the set of words with the given signature. Ideally, one has to solve both simultaneously by summing over various possible tags for a given word that is being disambiguated to maximize the likelihood of the word being selected and not the tag. This can be a rather computationally intensive problem to solve with the Markov approach.

Rule-based approaches, such as that for grammatical tagging by [11], [10], avoid storage of conditional probabilities and require going through the corpora several times to determine rules that lead to a general reduction in prediction error, starting from a base model that works most of the time. For text input disambiguation, simply selecting the most frequent word alternative for a given signature is known to be correct approximately 95% of the time. Thus, rule-based approaches are attractive for improving upon that figure without worrying about loss of accuracy elsewhere, especially given that they have a compact representation. However, a direct method to apply the rule-based technique to rule learning during actual run-time usage is not readily available. This is an important observation since it can be anticipated that it will be necessary to adapt to several individualistic writing styles, presumably following varied grammatical rules. A method that uses a common approach to offline training as well as real-time learning is all the more desirable. 4.4 Simplifying Assumptions We shall make the following assumptions.

Since we are primarily concerned with progressive text entry, it is reasonable to assume that, in most cases, the word context information is from previous words only and that no word typed to the right of the current word being disambiguated is used.

We have indicated that we will be assigning deterministic tags to contextual words. This means that the words to the left of a given word will be assigned the most probable tag (in a purely deterministic fashion). Note that this does not compromise the assignment of tags to the group of words being disambiguated for the current signature, since we will effectively be conditioning the probability of the current word on previous tags, and we will not be concerned with probable tags of the current word.

We will restrict our contextual memory to two words to the left of the current word, i.e., we will effectively use trigram probabilities. (We will break at phrase delimiters such as the period or the semi-colon.)

4.5 Collecting Prior Tag Information

Our attempt here is to build on the ≈95% accuracy that we have by simple assignment of the most frequent word as the selection of the disambiguation group. We will thus begin with the following set of information prior to training:

The frequency of each word.

The most likely tag for each word.

For assigning a tag to an unknown word, we will apply commonly used techniques, e.g., described by Brill [11], [10] using word endings and other parameters. Next, we shall go through the mechanism to build the necessary information database to enable us to make better judgments. Later, we will describe how this database can be dynamically reduced in size by applying several restrictions without seriously compromising the performance.

Figure 7:
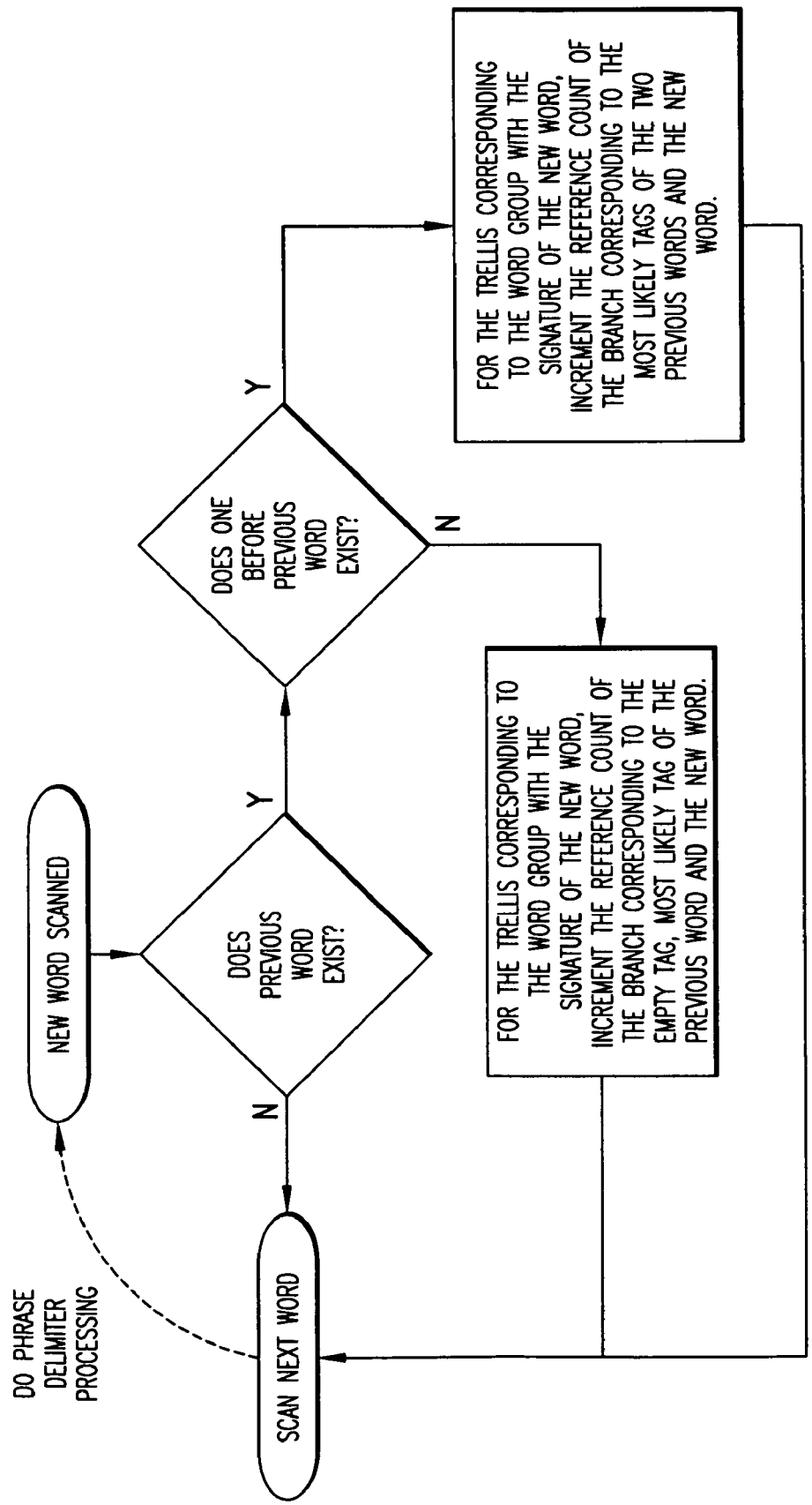
FIG. 7: Building exhaustive tag context information.
Figure 8:
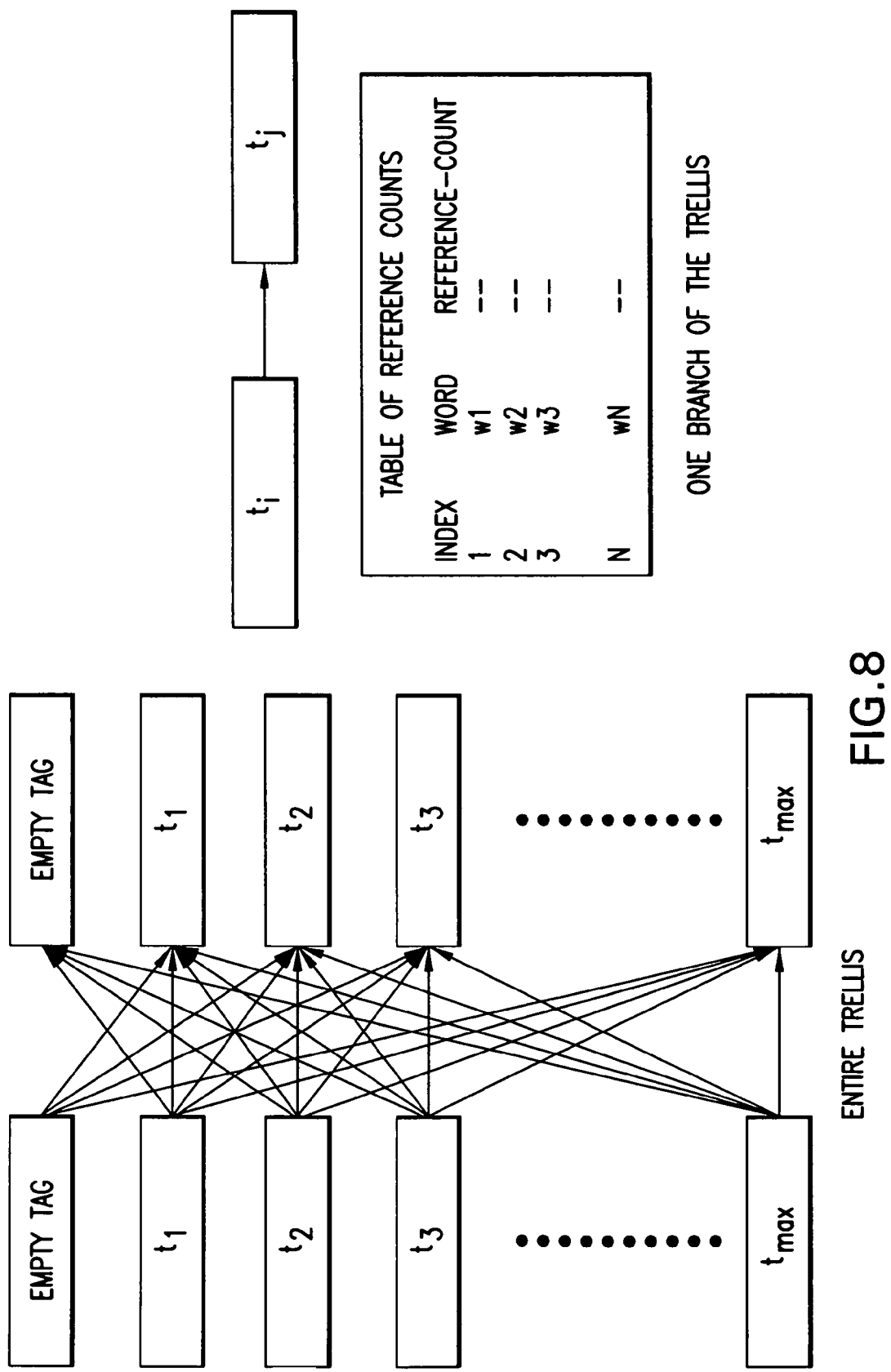
FIG. 8: Trellis for one disambiguation group with N number of words.

The training procedure is to scan through an untagged corpus word by word, using the flowchart in FIG. 7 to record information as each word is scanned. Note that infinite precision is assumed to be available for the reference count, and the storage memory is also assumed not to be a constraint in this preliminary training model. The result of the training process will be a trellis of the type shown in FIG. 8. Note that the word corresponding to each entry is indicated on the branch connecting the two previous tags, instead of generating a third vertical level of the trigram. This method of storage seems expensive (memory-wise). It is only when we apply the limiting assumptions that the sparseness of the trellis and the table of reference counts will be fully exploited.

Note that the empty tag in the second column of the trellis will not be connected with the method outlined thus far. Its use will become clear in the following subsections.

4.6 Disambiguation

We will now discuss how the information compiled may be used in run-time to improve upon disambiguation accuracy. Typically, we will need to divide the existing trellis into possibly more meaningful information that we will call "rules," and then we will use a criterion to determine which rule should be applied in case we have multiple rules being satisfied in a given context. The following information needs to be derived (adapted from Brill):

Previous word tag count: This may be calculated per the previous tag and per word as a reference count measure by summing up the reference counts of corresponding branches coming into the tag in the trellis.

One before previous word count: This may similarly be calculated by summing up all branches going out of a particular tag in the trellis on a per-word basis.

One of two before: This may be calculated by summing up the above two values per tag per word and then subtracting from it the reference count per word of the branch originating from the same tag and also going into the same.

Figure 9:
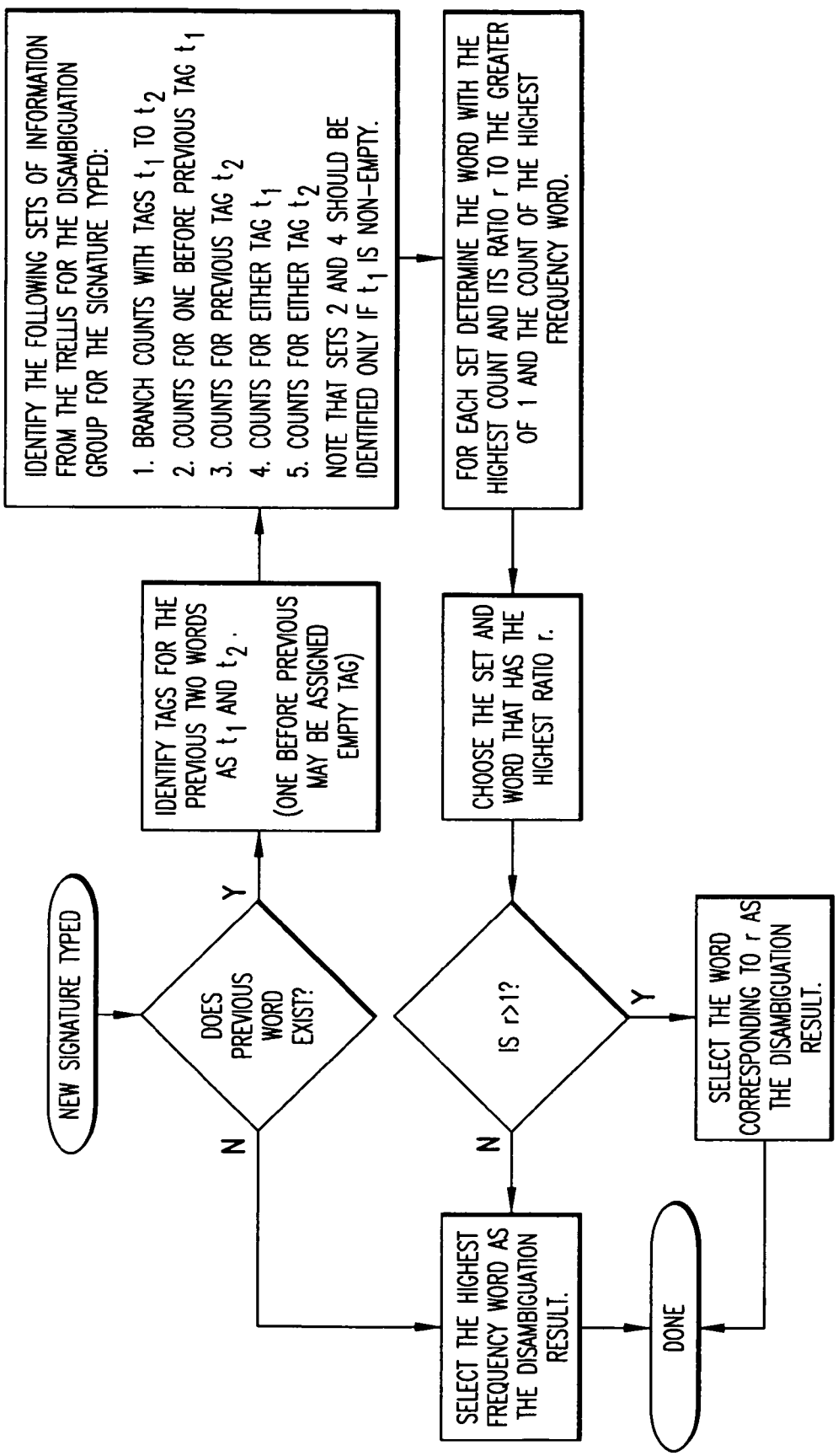
FIG. 9: Disambiguation using tag context information.

The flowchart in FIG. 9 may be used to carry out the actual disambiguation. Choosing the word with the maximum ratio $$r = \frac{\text{Highest reference count excluding that of the most frequent word}}{\text{Reference count of the most frequent word}} \quad (154)$$

such that r>1, ensures that we choose an alternative to the highest frequency word only if the context indicates that an alternative selection is more likely. (If we need to delay immediate application of run-time training, we may have a criterion r>R such that R>1.) In case of ties between various words for a given ratio r, we may choose the one with the highest frequency.

Note that in most cases the check for R can be applied before comparison of ratios to eliminate the greatest number of possibilities.

When the reference count of the most frequent word is zero, r will be infinity. This may incorrectly favor rules that do not have enough training data. To counter this, we redefine r as:

$$\frac{\text{(Highest reference count excluding that of the most frequent word}}{\text{Greater(1, Reference count of the most frequent word)}}. \quad (155)$$

The generated run-time values for rules for a disambiguation group may be kept in memory so as to avoid re-computation for frequent use. These may be deleted on end of program or updated when a branch count is updated.

4.7 Keeping the Trellis Sparse

Figure 10A:
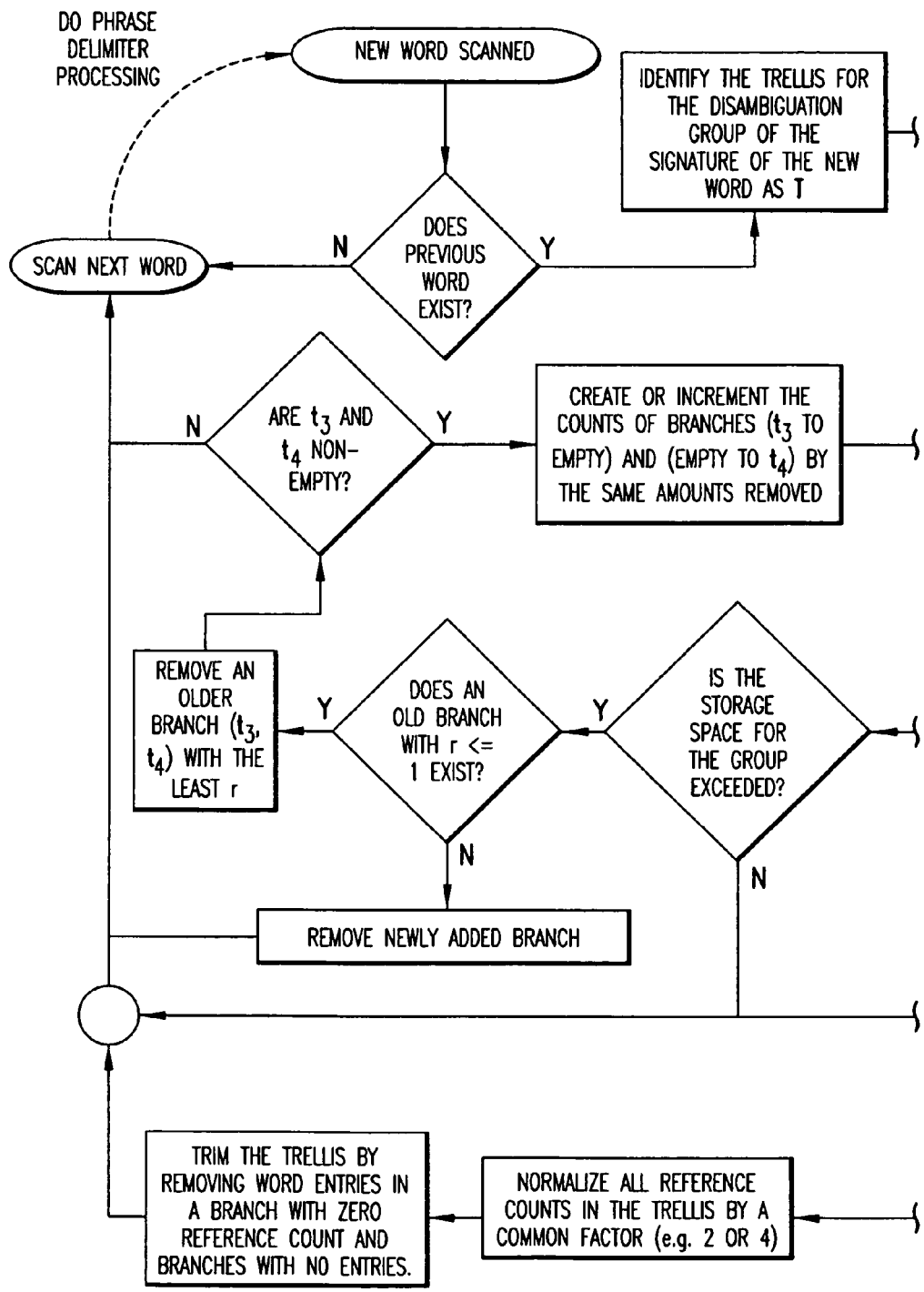
FIGS. 10a and 10b illustrate training using tag context information to generate a sparse trellis for compact tag-based disambiguation.
Figure 10B:
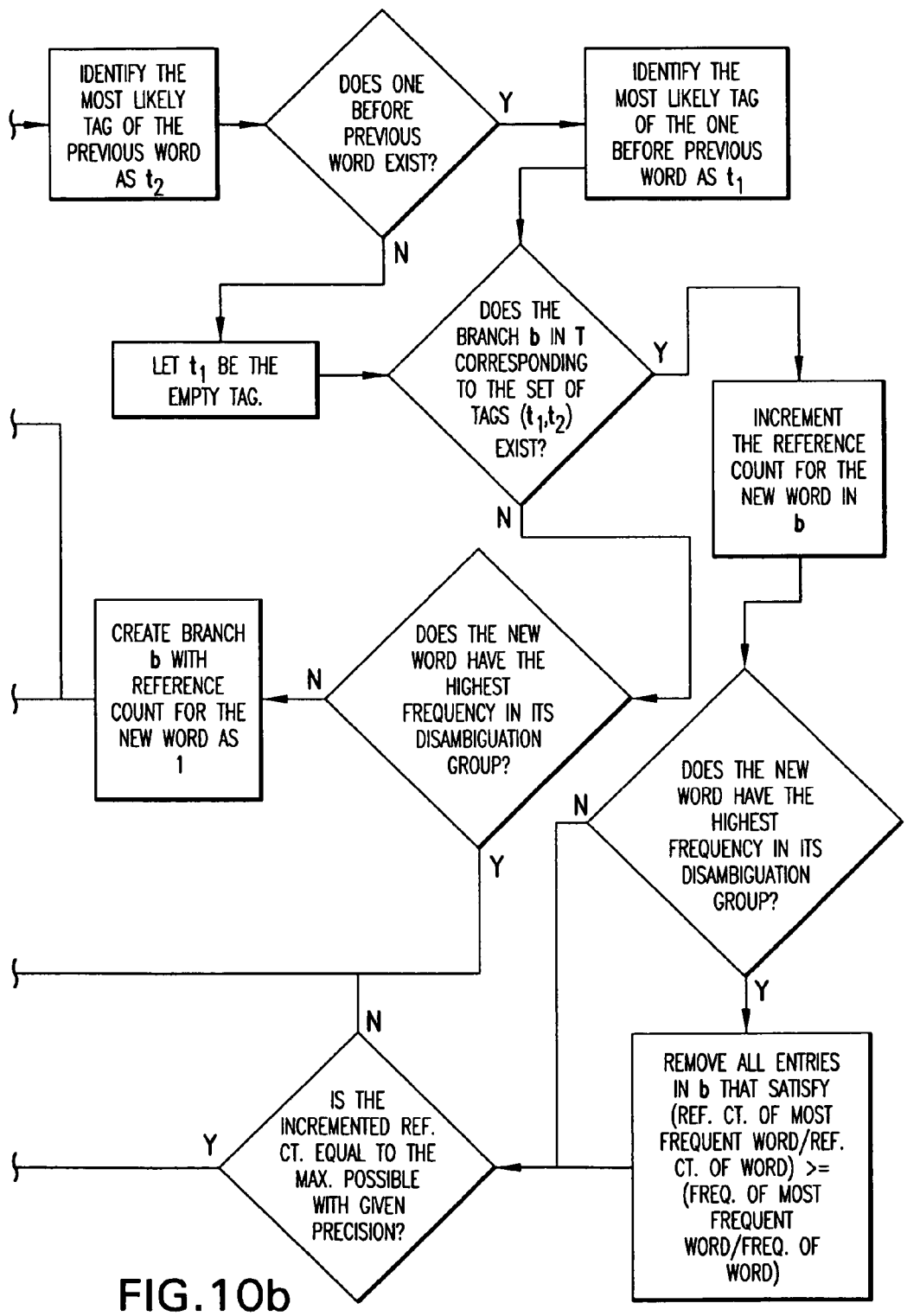
Figure 11:
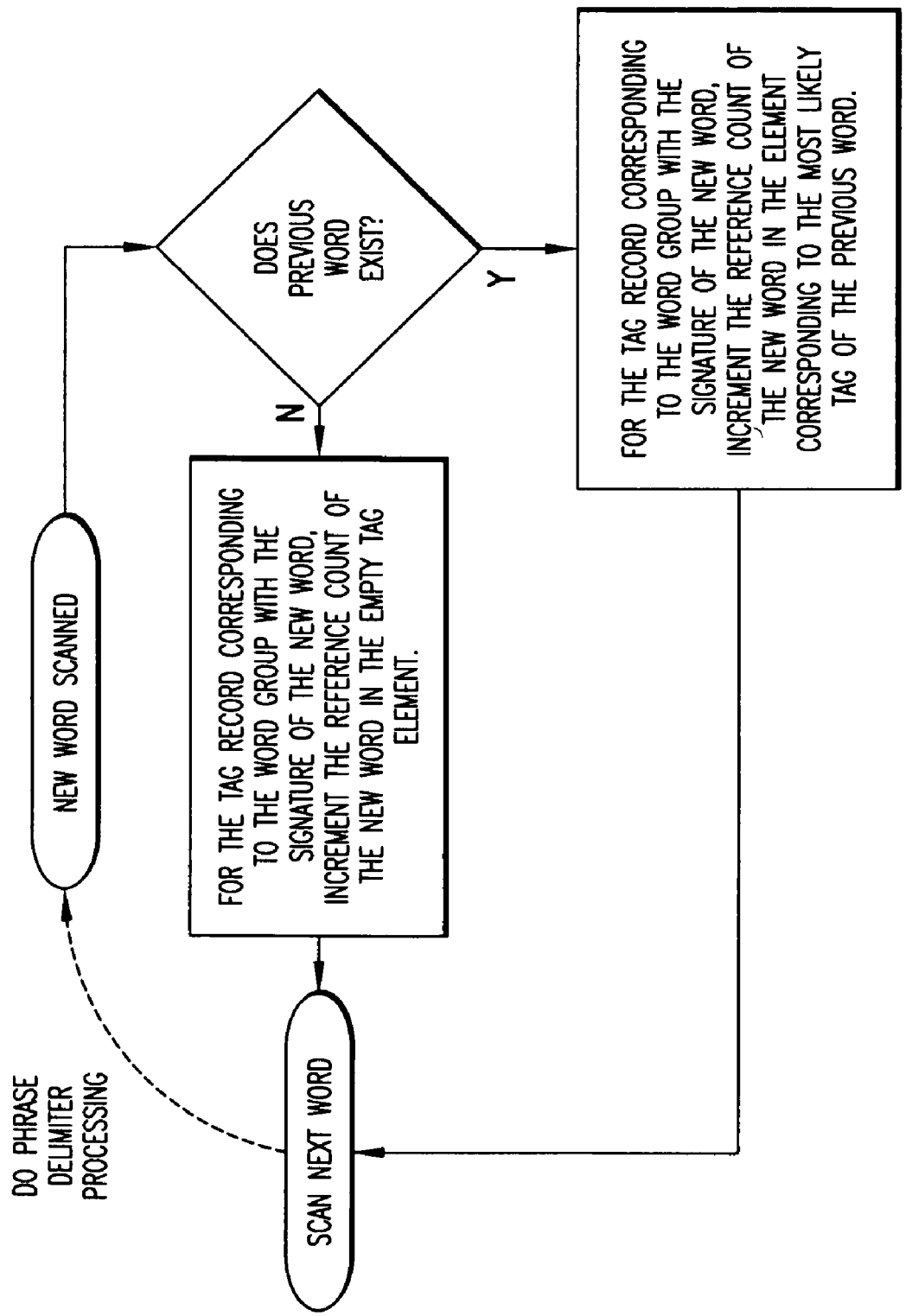
FIG. 11: Building exhaustive tag context information.
Figure 12:
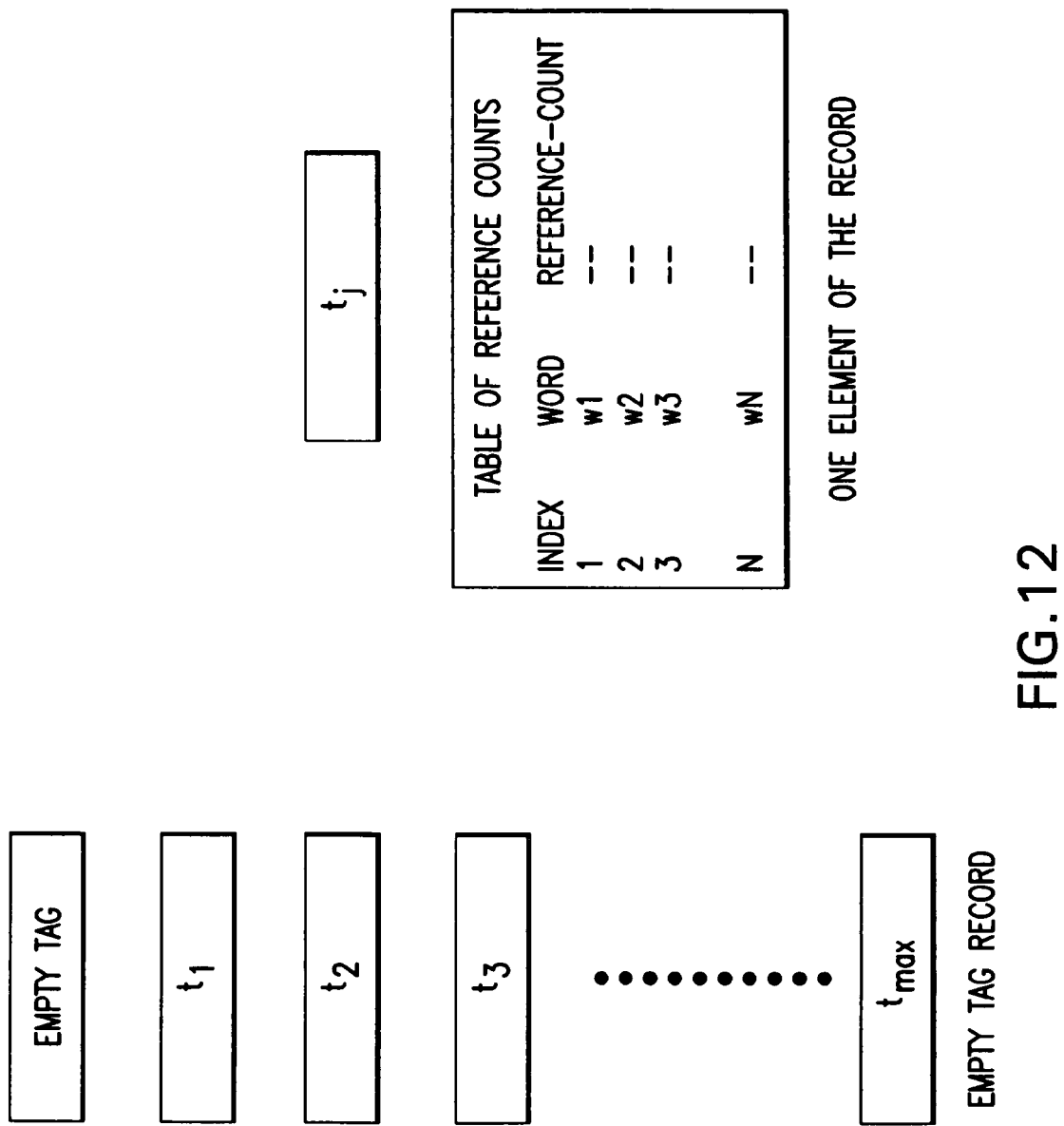
FIG. 12: Tag record for one disambiguation group with N number of words.
Figure 13:
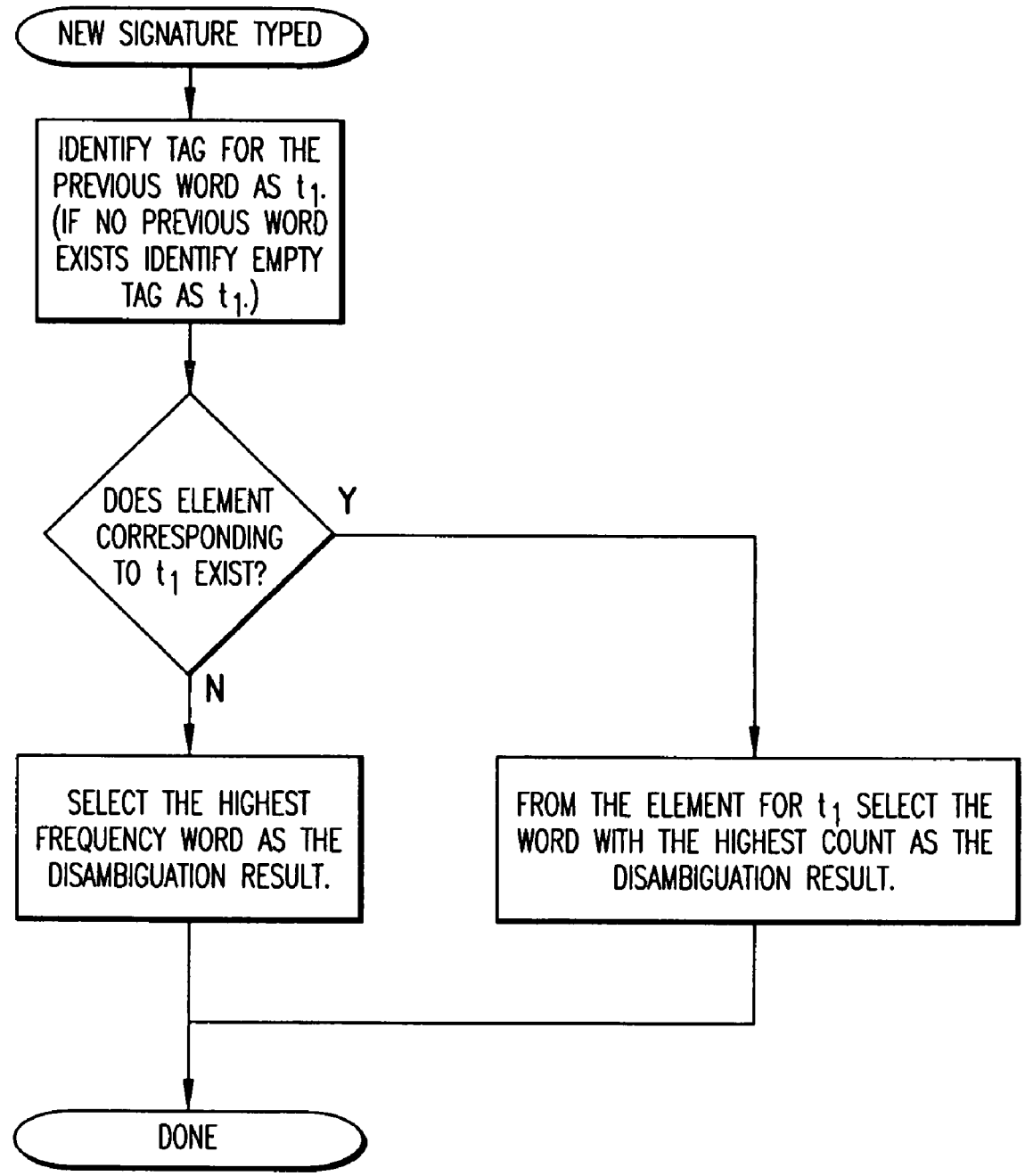
FIG. 13: Disambiguation using previous tag information.
Figure 14A:
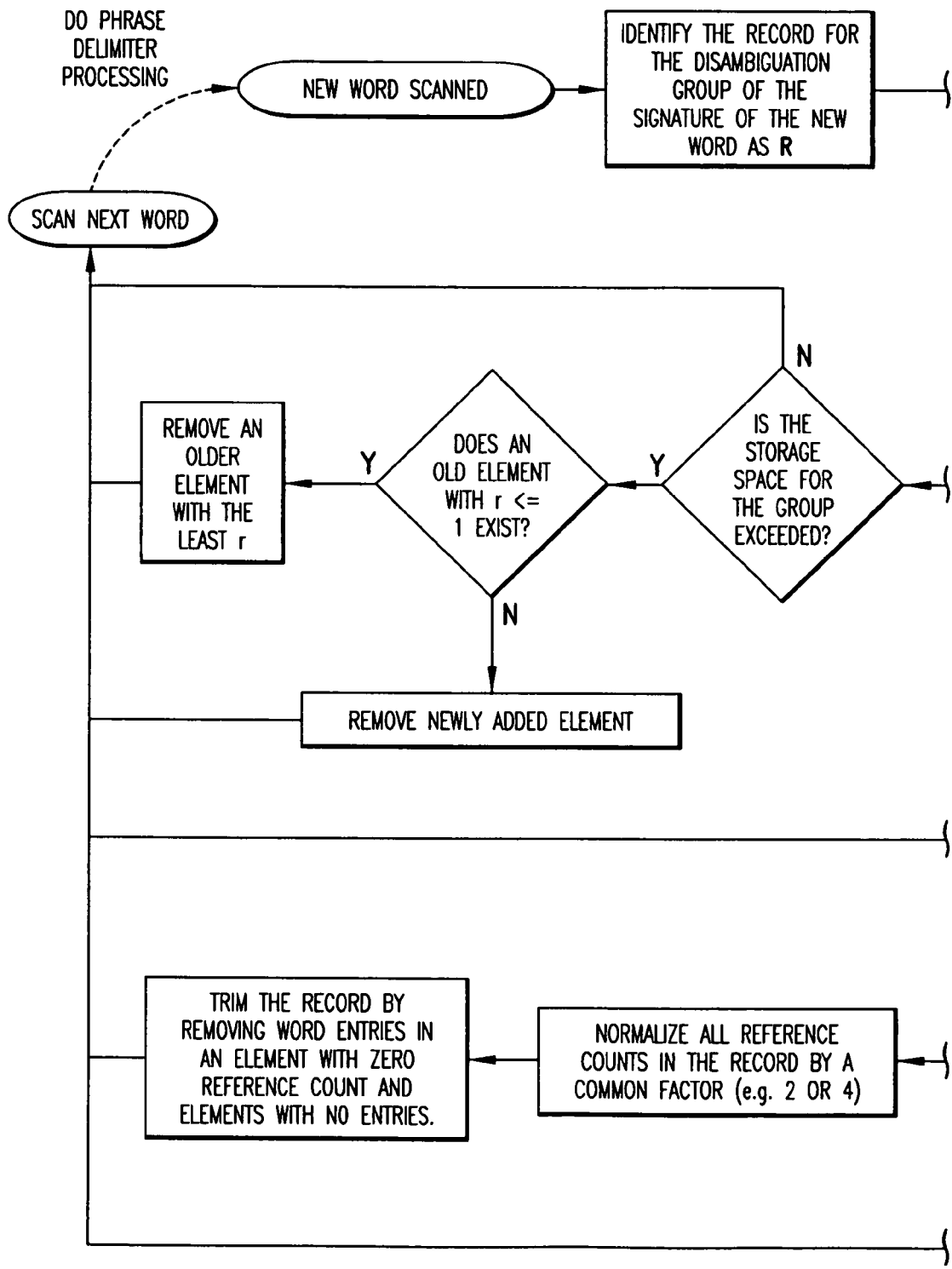
FIGS. 14a and 14b illustrate training using previous tag information to generate a sparse record for compact tag-based disambiguation.
Figure 14B:
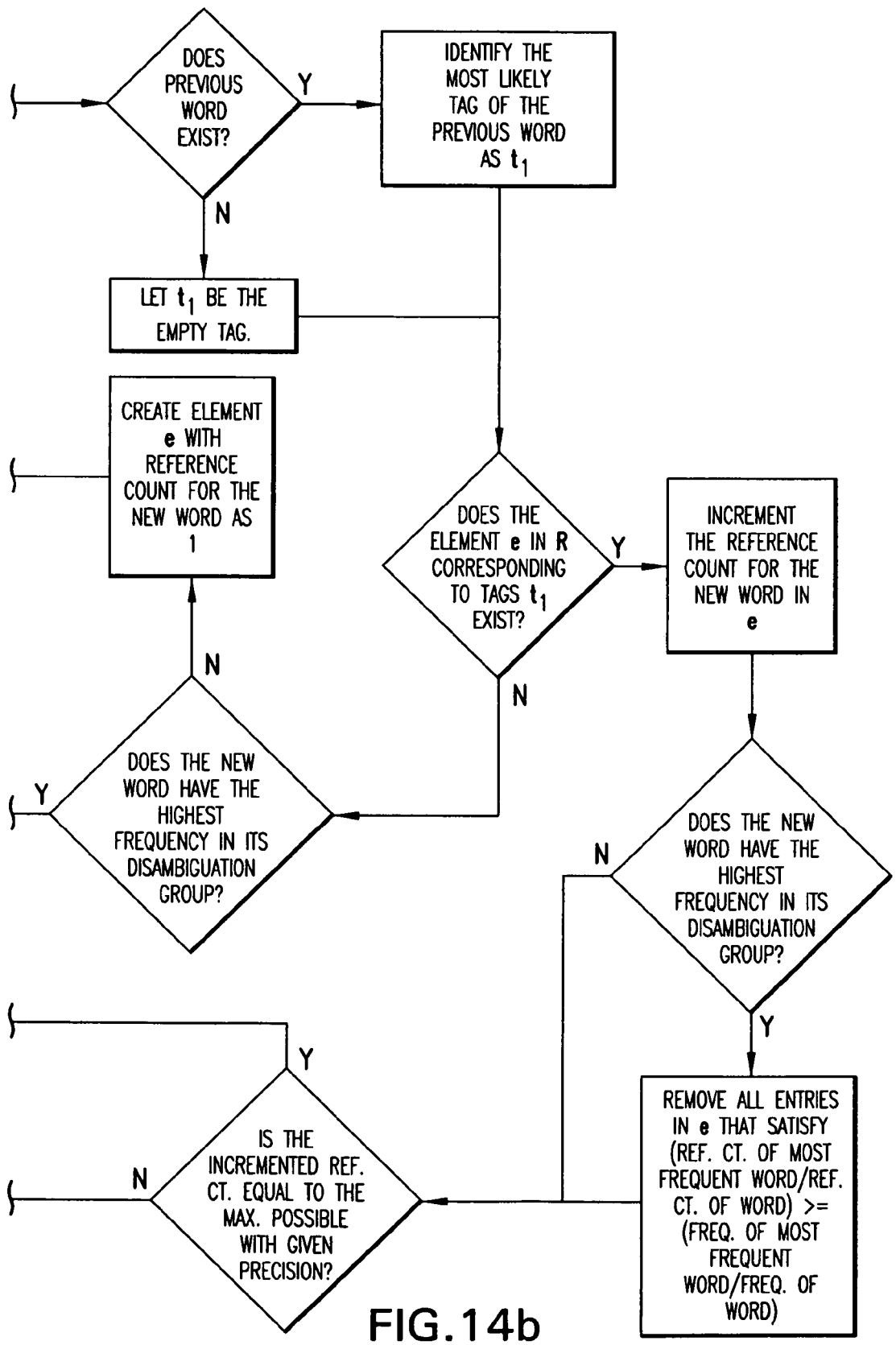
Figure 15A:
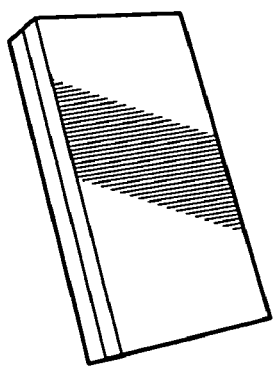
Figure 15B:
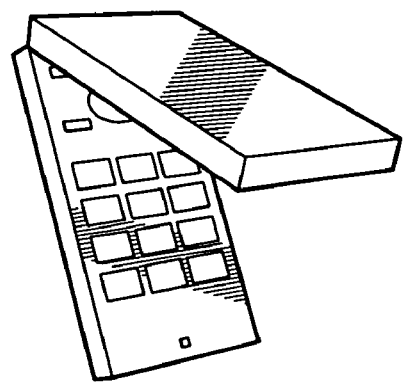
Figure 15C:
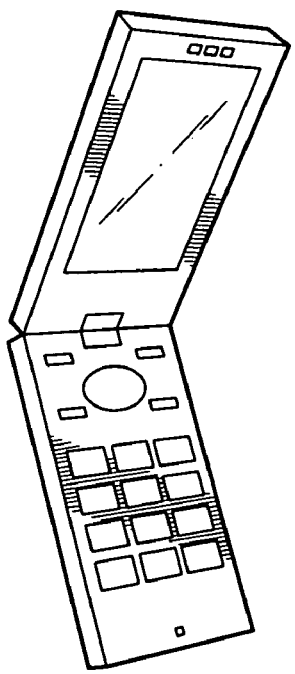
Figure 15D:
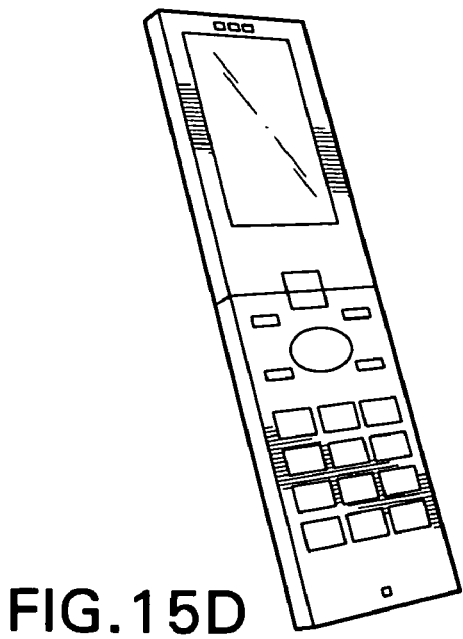
Figure 16A:
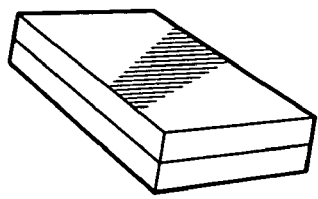
Figure 16B:
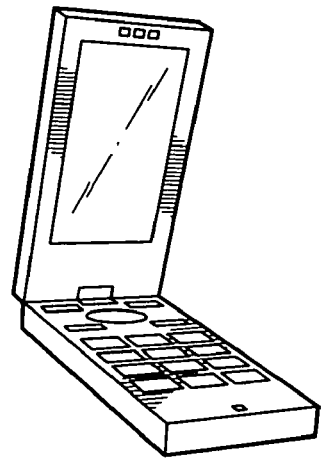
Figure 16C:
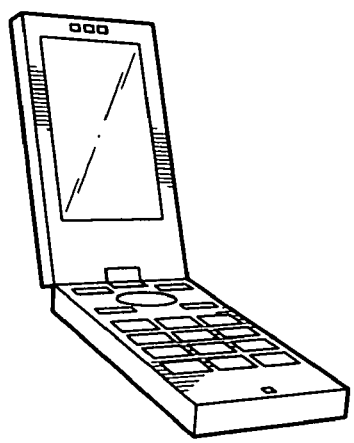
Figure 16D:
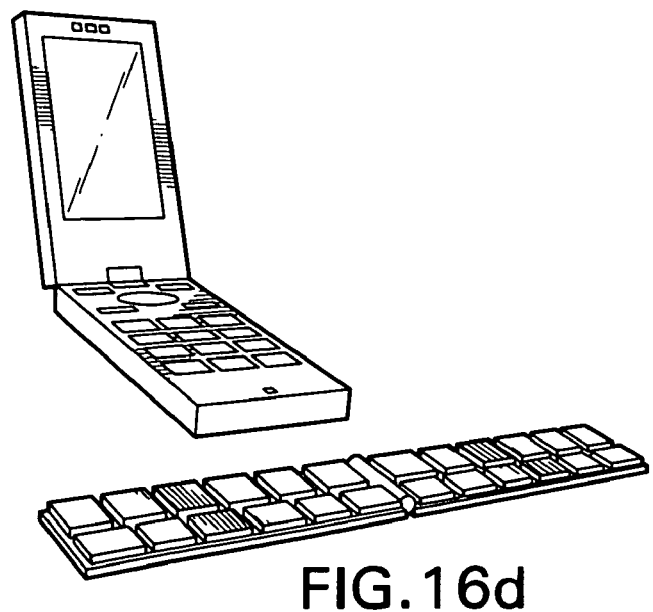
Figure 17A:
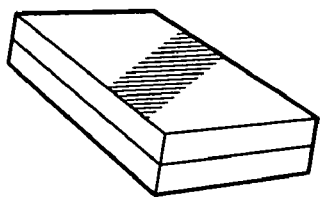
Figure 17B:
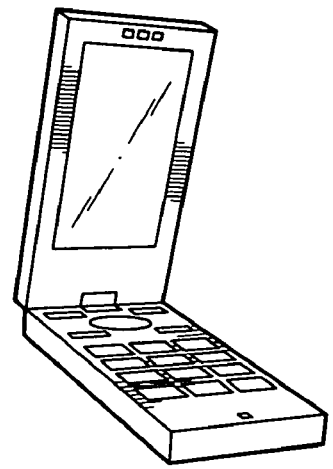
Figure 17C:
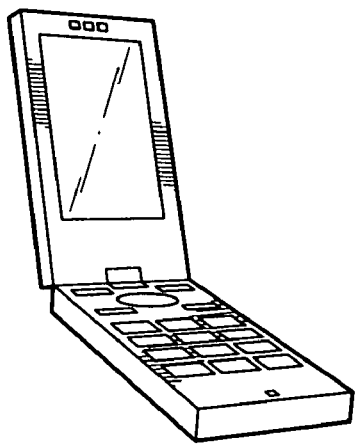
Figure 17D:
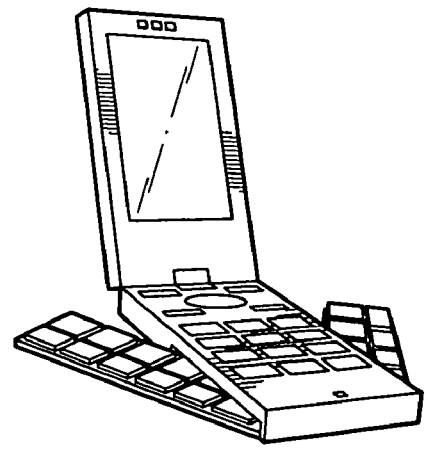
Figure 17F:
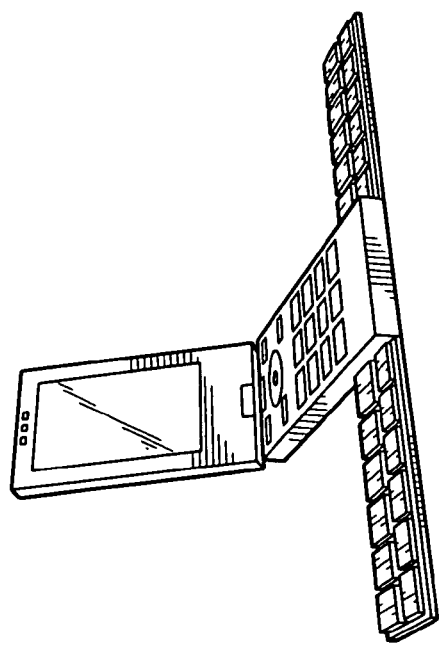
Figure 17G:
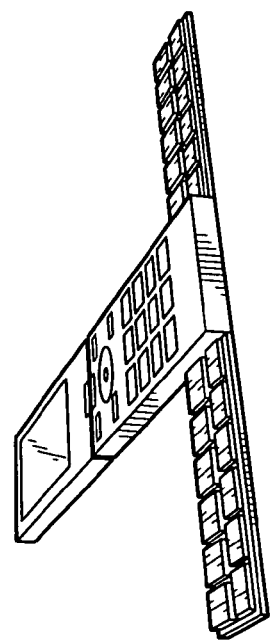
Figure 17E:
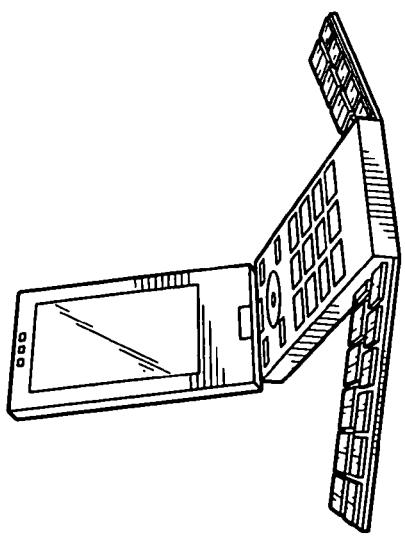
Figure 18B:
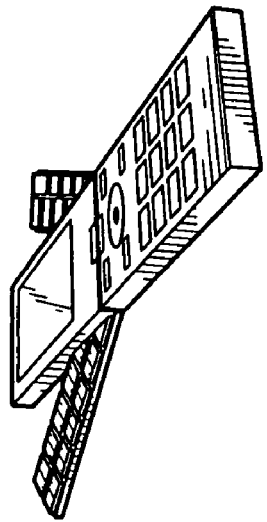
Figure 18D:
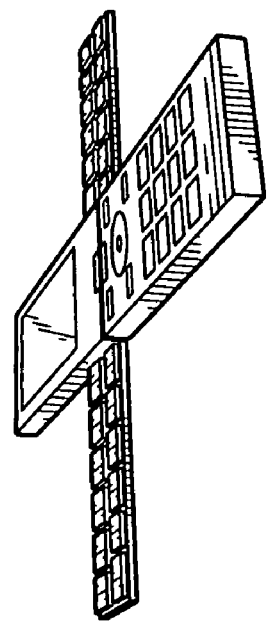
Figure 18A:
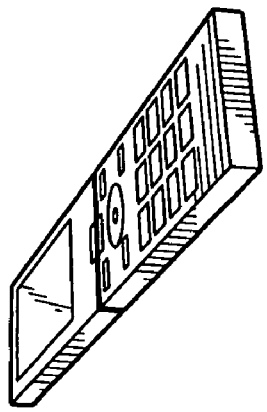
Figure 18C:
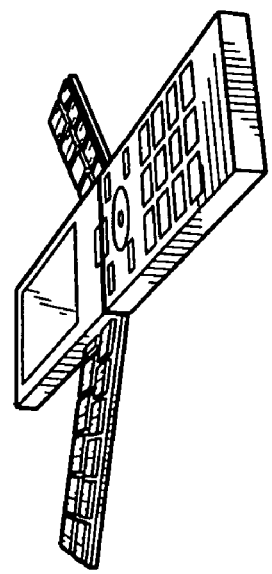
Figure 19A:
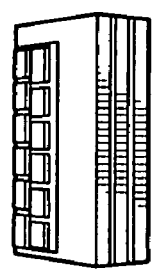
Figure 19B:
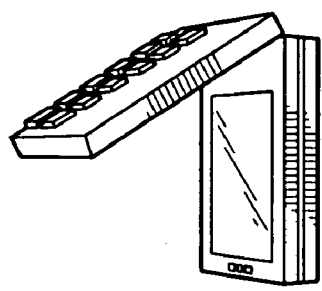
Figure 19C:
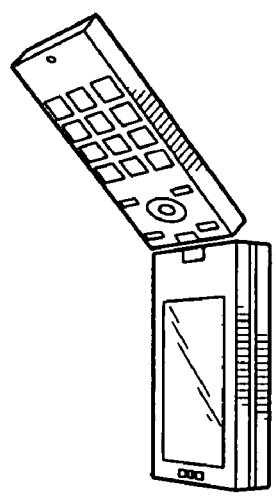
Figure 19D:
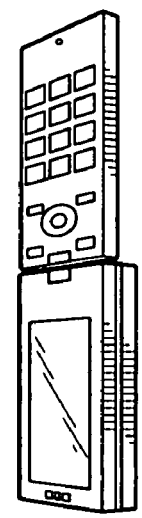
Figure 19F:
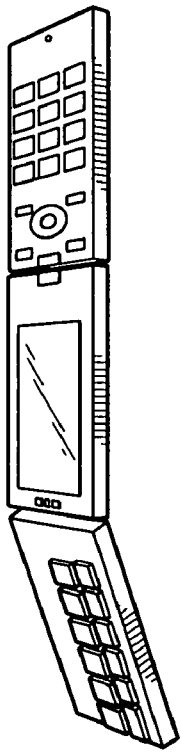
Figure 19H:
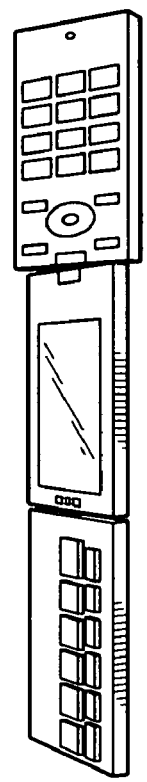
Figure 19E:
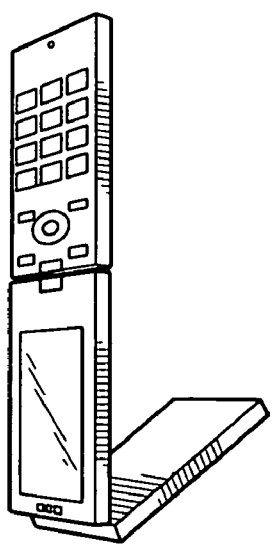
Figure 19G:
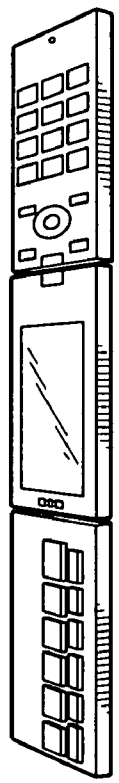
Figure 19I:
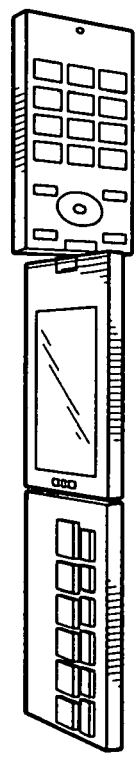
Figure 19J:
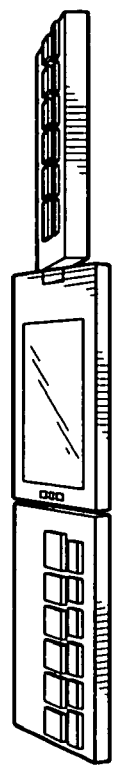
Figure 19K:
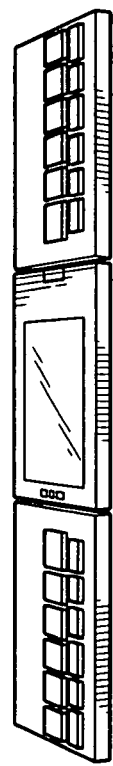
Figure 20B:
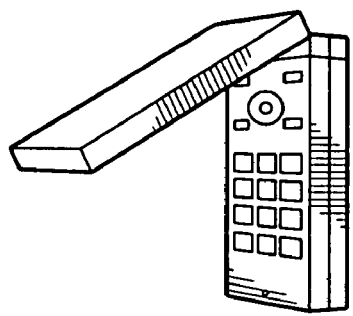
Figure 20D:
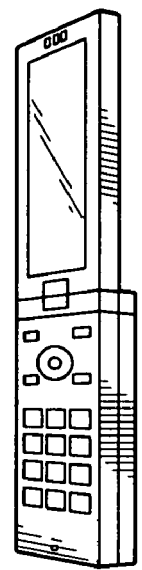
Figure 20A:
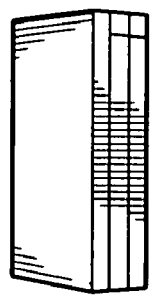
Figure 20C:
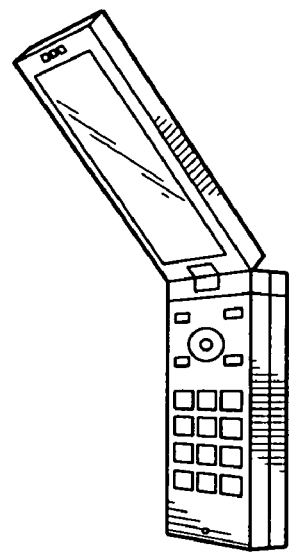
Figure 21B:
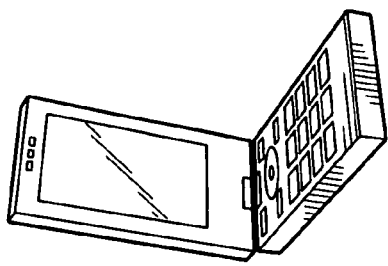
Figure 21D:
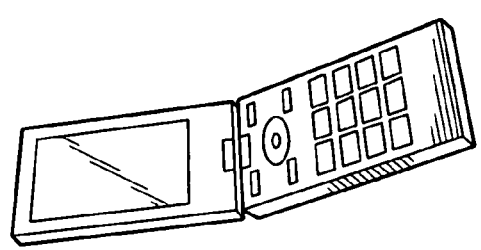
Figure 21A:
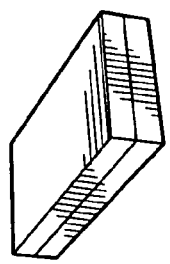
Figure 21C:
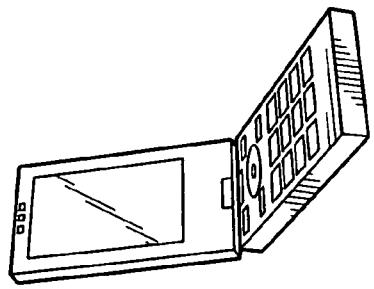
Figure 21F:
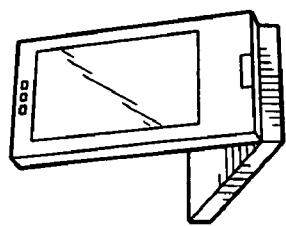
Figure 21G:
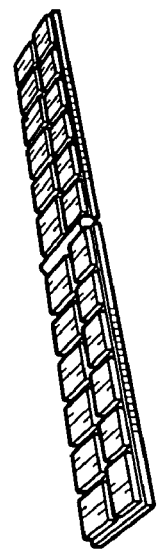
Figure 21E:
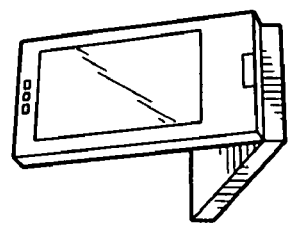
Figure 21E:
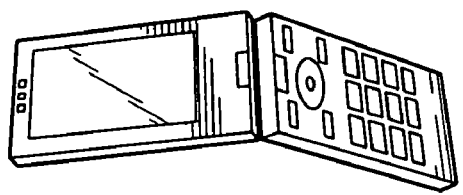
Figure 22B:
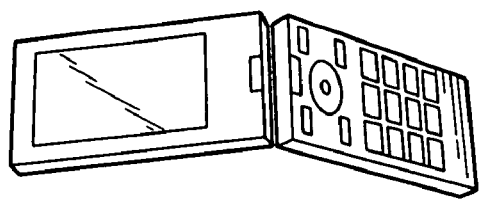
Figure 22D:
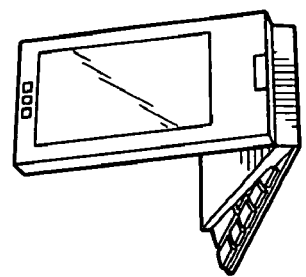
Figure 22A:
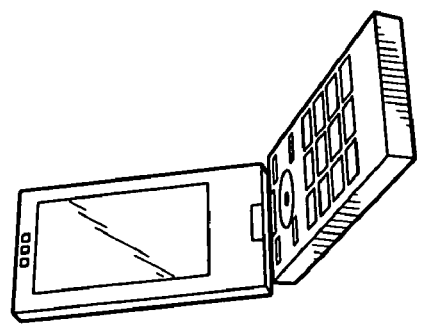
Figure 22C:
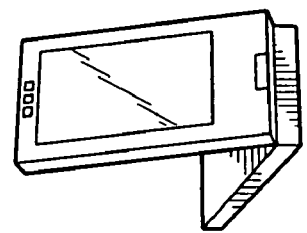
Figure 22F:
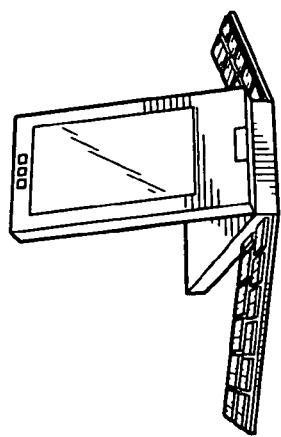
Figure 22E:
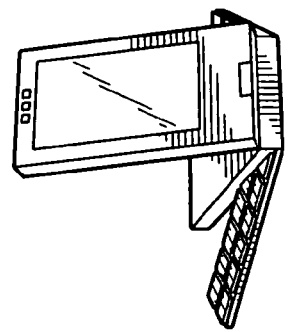
Figure 22H:
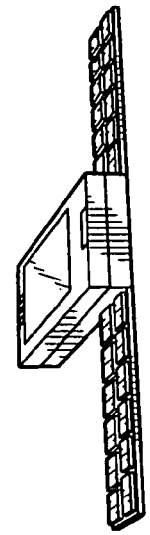
Figure 22G:
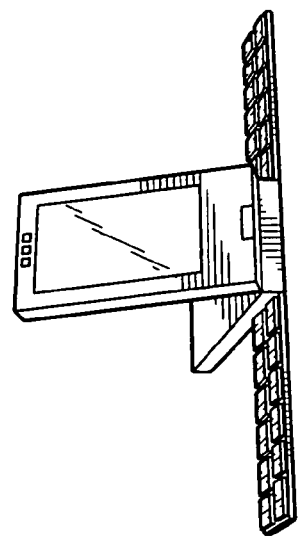
Figure 23A:
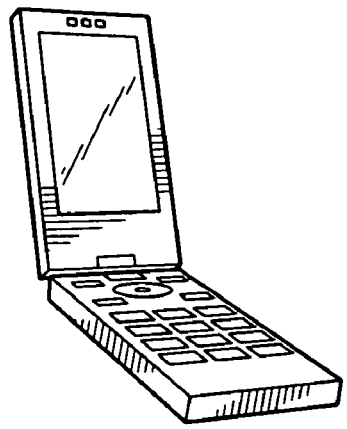
Figure 23B:
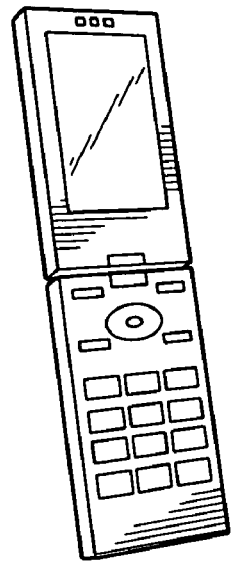
Figure 23C:
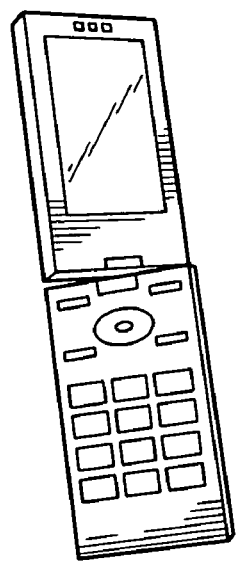
Figure 23D:
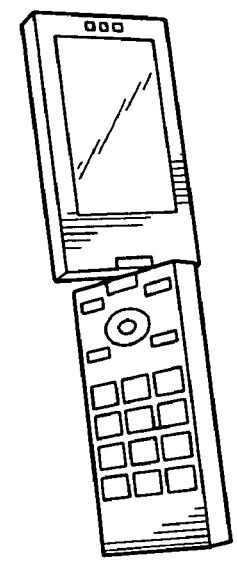
Figure 23E:
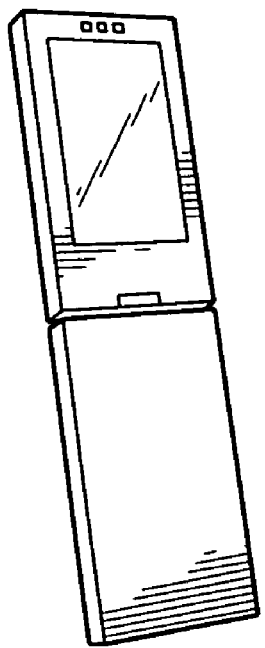
Figure 23F:
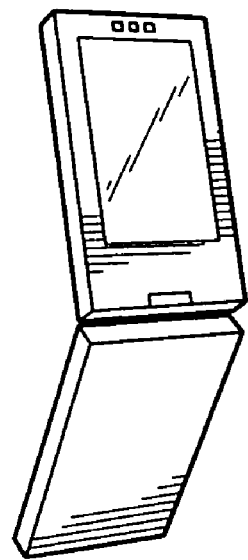
Figure 23G:
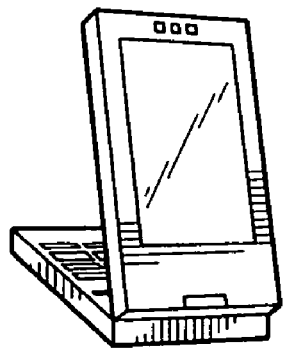
Figure 23H:
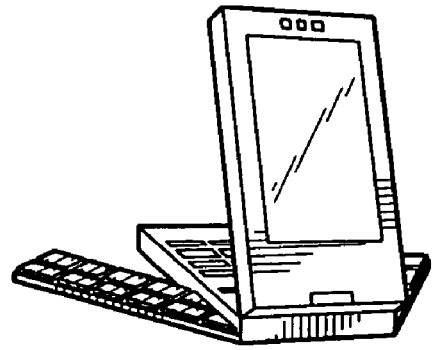
Figure 23J:
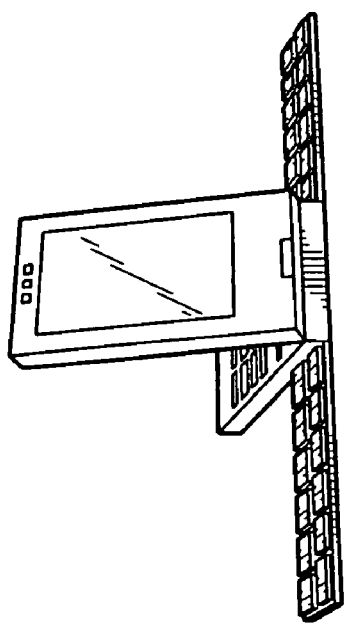
Figure 23K:
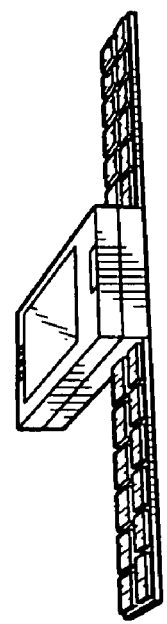
Figure 23I:
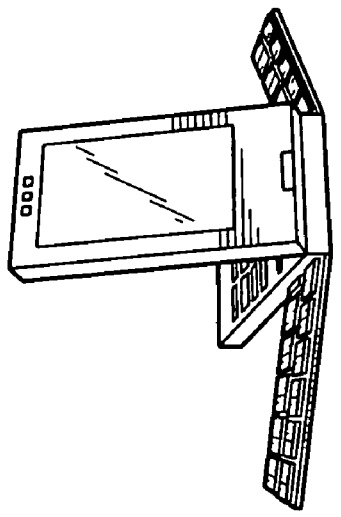
Figure 24A:
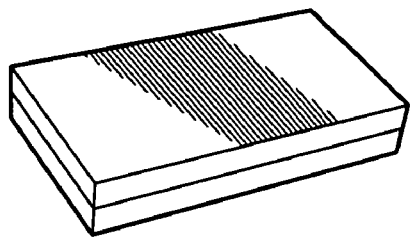
Figure 24B:
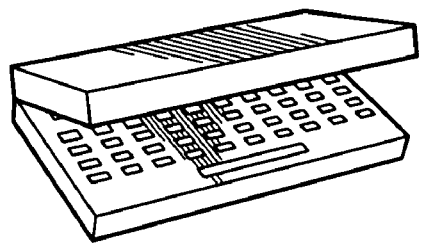
Figure 24C:
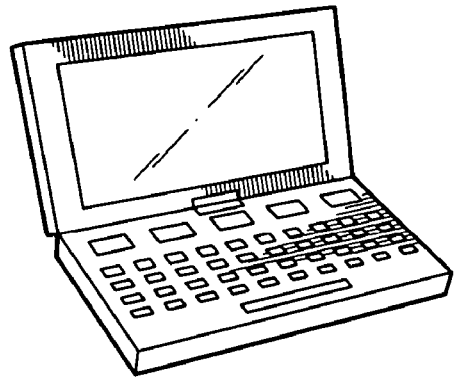
Figure 24D:
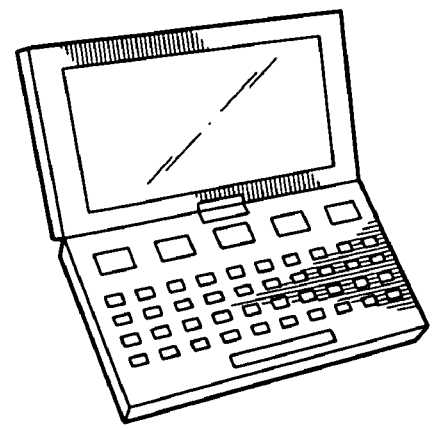
Figure 24E:
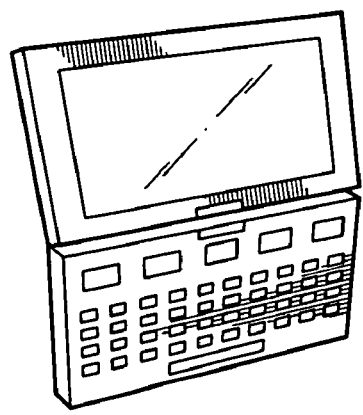
Figure 24F:
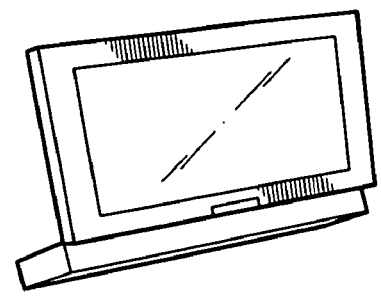
Figure 24G:
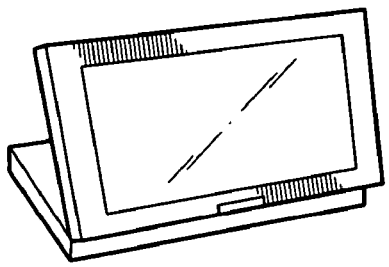
Figure 24H:
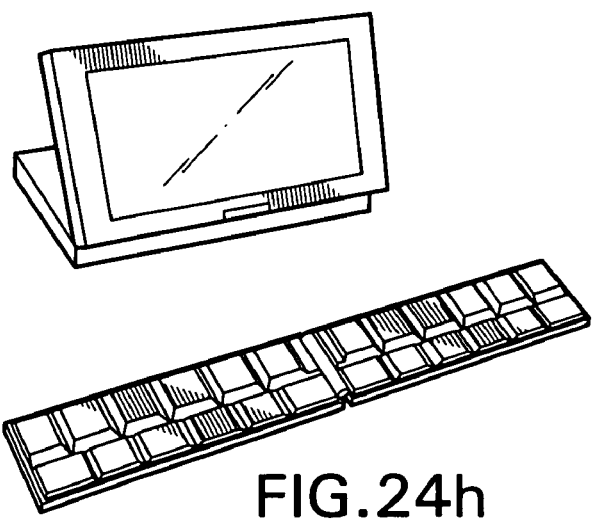
Figure 25A:
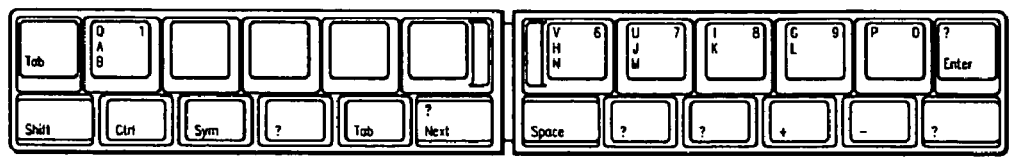
Figure 25B:
Figure 25C:
Figure 25D:
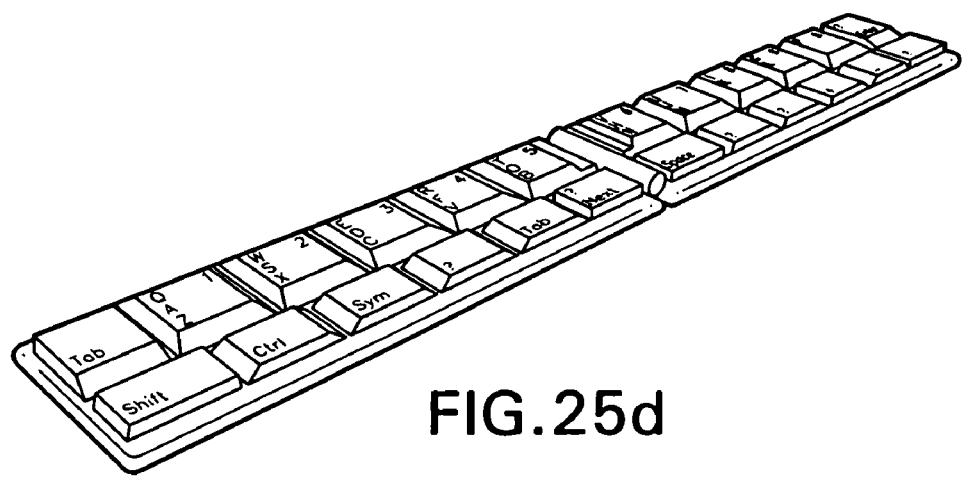
Figure 26B:
Figure 26D:
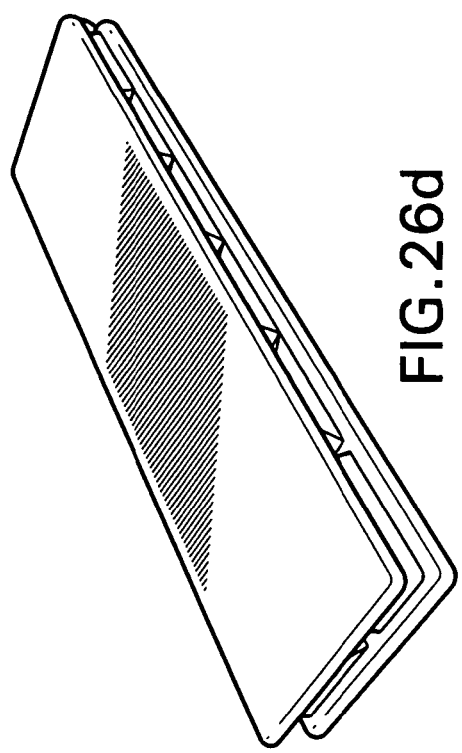
Figure 26A:
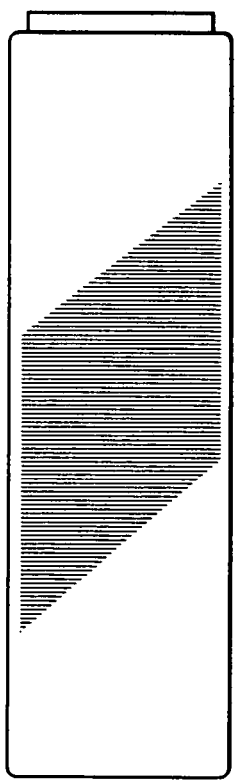
Figure 26C:
Figure 27A:
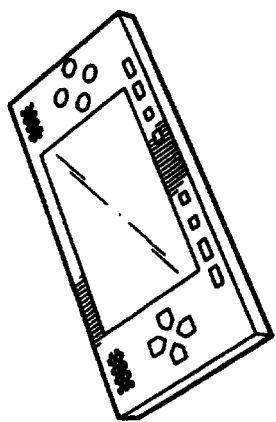
Figure 27B:
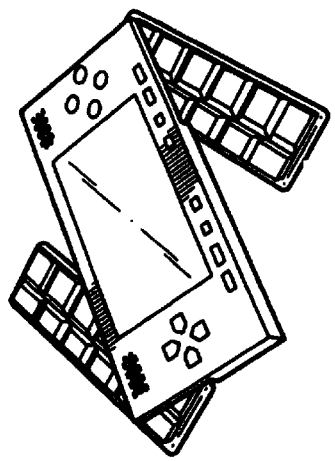
Figure 27C:
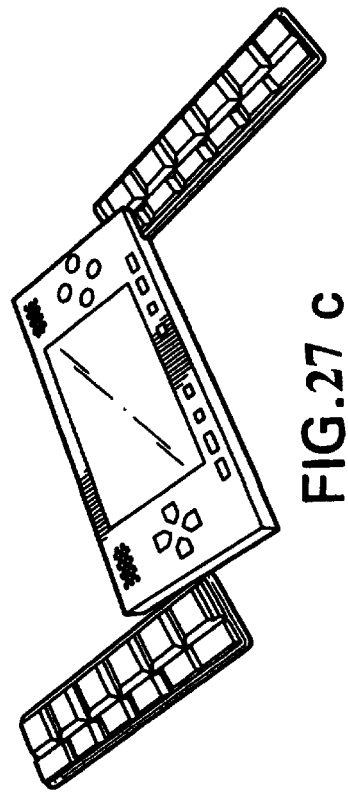
Figure 27D:
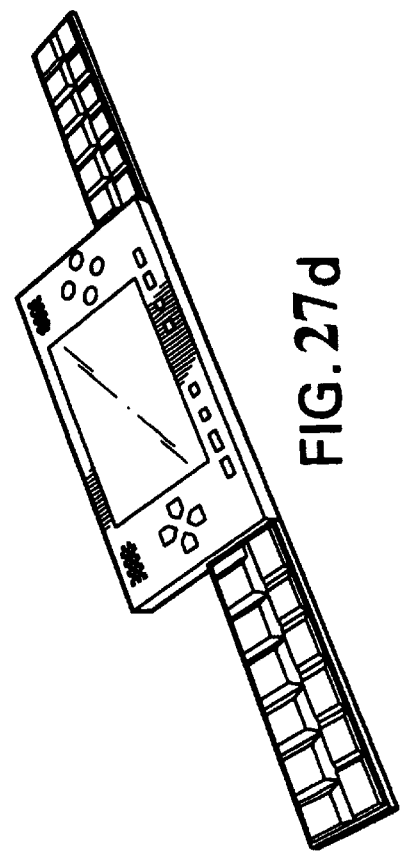
Figure 28A:
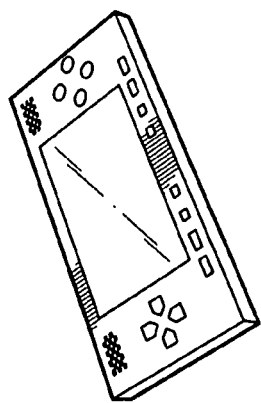
Figure 28B:
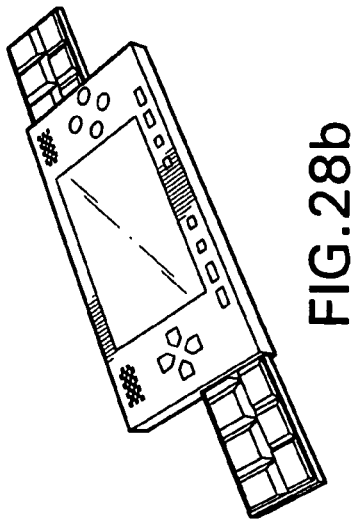
Figure 28C:
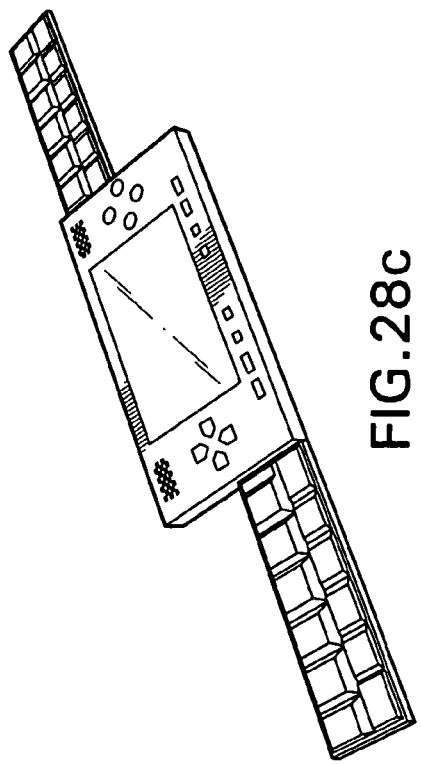
Figure 28D:
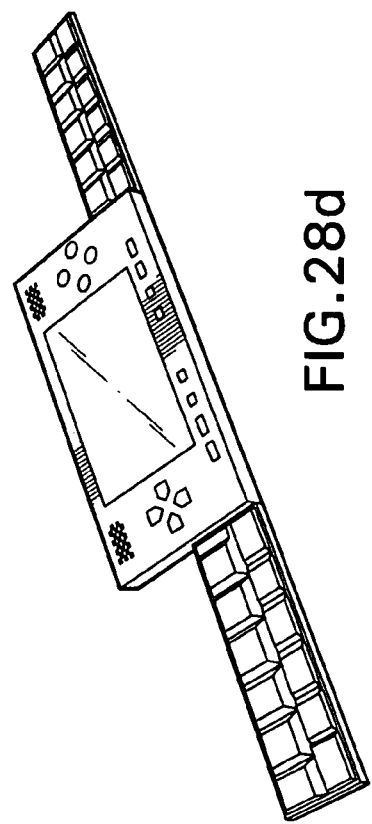
Figure 29A:
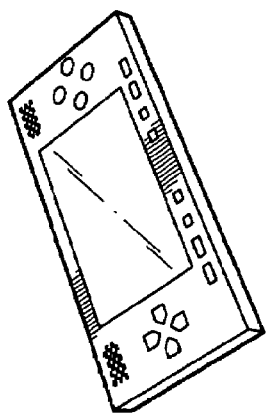
Figure 29B:
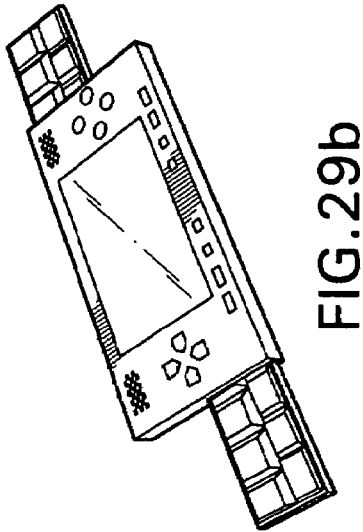
Figure 29C:
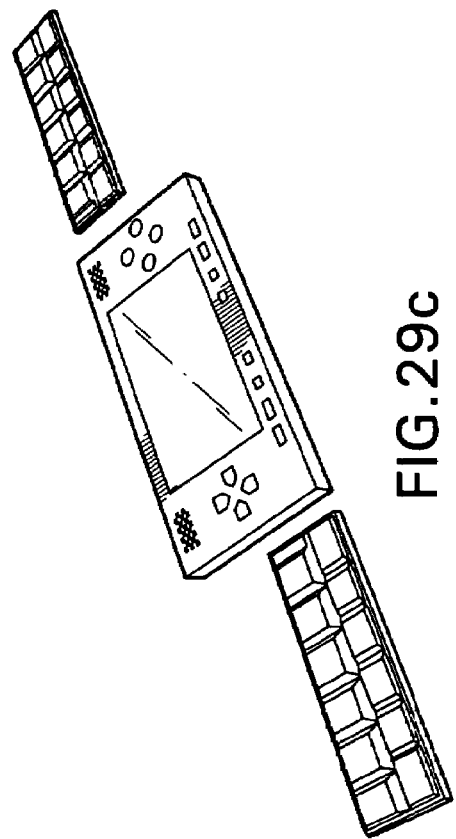
Figure 29D:
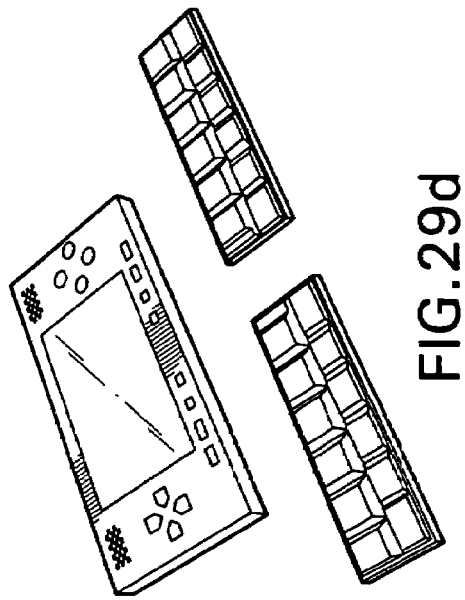

Several observations and assumptions can be made to obtain a sparse trellis, cf. FIG. 10:

1. Do not store words with branches with reference count zero and branches with no words.
2. Since the value of a reference count is useful only within a disambiguation group, normalization may be occasionally applied when any particular value exceeds the precision bits allocated. This will lead to several counts becoming zero during the normalization, which is a further source of sparseness. For example, we may reserve 4 bits for the reference count, and whenever a particular count exceeds 15 in a disambiguation group, we divide each of the counts in the group by, say 8, and then drop the counts that become 0. Clearly, there is a tradeoff between performance and memory requirements here, and the two parameters controlling it are the bits reserved for storage and the factor by which a count is normalized. However, this tradeoff need not be the same for all disambiguation groups. For offline training, one may identify several "highly ambiguous" groups and assign greater precision to them for a much improved performance level. These parameters need to be determined heuristically for offline training, while they may be fixed arbitrarily for real-time processing. (Note that normalization may not only be applied within a branch, as several derived rule counts are derived from multiple branch information.)
3. The most effective means of gaining sparseness is perhaps the following. We know that approximately 95% of the time the most frequent word in a disambiguation group is the right choice. Working from an assumption that we only need to use tag information to improve on this performance level, the basic aim of the compiled information is to determine whether a particular other word is more likely than the most frequent word of the disambiguation group in the given tag context. Thus, we do not need information of branches that have reference counts that indicate that the most frequent word is likely. A relatively conservative way of ensuring this is to remove branches for which the following is satisfied for all words in a disambiguation group (calculated per branch):

$$\frac{\text{Ref. ct. of most frequent word}}{\text{Ref. ct. of word}} \geq \frac{\text{Freq. of most frequent word}}{\text{Freq. of word}} \quad (156)$$

4. The above has a very important implication. We do not need to carry a branch for a scanned word that does not already exist in the trellis if the scanned word is the one with the highest frequency in the disambiguation group. Thus, for 95% of the words scanned, we will not be generating new branches. Note, however, that for every such word scanned, we will have to check if a branch already exists, and, in that case, increment the corresponding reference count for that branch.
5. Note that scanning of words with the highest frequency in a group will also lead to situations where the condition (156) will be true and thus further sparseness will result.
6. Furthermore, we may apply a limiting restriction to the maximum number of branches (or, alternatively, maximum memory) that a disambiguation group might have. This is determined on the basis of the ambiguity of a group and will in general be proportional to the number of words in a group. To carry out such "trimming" of the trellis, one must give preference to new branches that have information greater than or equal to other branches that leads to choosing an alternative to the most frequent word. This calculation may be simplified by comparing the following ratio for two branches:

$$\frac{\text{Highest reference count excluding that of the most frequent word}}{\text{Greater(1, Reference count of the most frequent word)}}. \quad (157)$$

7. Note that if we have to carry out trimming when we are adding a new branch, then we simply need to remove a branch with the lowest ratio provided it is less than or equal to 1.
8. When we trim a branch we are also taking away information that may actually lead to a useful derived rule. To keep this information, we use the empty tags. Whenever we remove a branch, say (t1 to t2), with both tags non-empty, we must create or increment the counts of branches (t1 to empty) and (empty to t2) by the same amounts removed.

4.8 Benefits

The following are some of the benefits of the approach described above.

- Fast run-time disambiguation.
- Limited storage requirements. Storage limits can be arbitrarily specified.
- Very flexible approach. Extensive manual/automatic customization and rule setting depending on ambiguity of the group possible.
- Finite precision handling included and used to promote greater sparseness.
- Non-Markov rules are seamlessly applied.
- Conditioning word probability over previous tags is more efficient than conditioning tag probabilities over previous tags and then summing up.
- Common approach to offline and run-time training.

4.9 Modification

From experimental results, it seems that a compact disambiguation system that uses tag information may get most of its error reduction from the previous word tag information. If only this information is to be stored as part of the prior statistics then tremendous simplifications are entailed, both in storage and computation. This subsection outlines the method for that simplified system. Apart from that, the following additional changes are made.

Words scanned in training with no previous words are designated with the "empty" previous word tag.

FIGS. 11, 12, 13, and 14 are analogous to FIGS. 7, 8, 9, 10.

4.10 Automatic Tag Grouping

There are also other NLP techniques, used previously for speech processing, that are applicable to text input disambiguation, cf. [38]. In particular, decision trees that minimize the entropy of disambiguation can be very useful in automatic tag grouping. It is clear from experiments that different groupings can be favorable for different collision groups. A method to automatically identify these groups will lead to a more compact representation per given error reduction.

For our purpose, we can apply the basic principle of trying to reduce the uncertainty in disambiguation output while seeking a more compact representation. Starting from the most granular tags, we may tackle the representation problem when data storage exceeds a specified value. Then, we can work through an inverted decision tree and combine finer tag groups into coarser ones until the data storage requirement is achieved. The selection of tag groups to combine should be one that leads to a least overall gain in entropy of the disambiguation output conditioned on the prior model. We can easily work through a constrained inverted tree that only allows grouping of specified tag groups into coarser ones, e.g., combination of all AJ groups into AJ, combination of NN1 and NN2 into NN, etc.

5 Display Optimization and Cost Functions

5.1 An Outline of the Display Optimization Problem

When using a reduced keyboard like the One-Row Keyboard, the user does not obtain perfect feedback about the progress of the input process. The visual feedback may not produce the letter or symbol that the user has in mind and the screen may keep changing, some times displaying the intended symbol and some times not. A major challenge for these reduced keyboards is then to provide feedback to the user that to the greatest extent possible will allow the user to keep the input process in the background and minimize the amount of focus of attention that the input process requires. Here we shall consider the aspect of this problem involving the visual feedback and what to display on the screen of the device as the input process proceeds.

5.2 Cost Function Heuristics

There is probably no way to establish a cost function that quantifies the user experience exactly. However, let us try to quantify some heuristics for how the input experience of a reduced keyboard compares with the input process using the regular, full keyboard. As the user inputs characters on the regular keyboard, the screen "immediately" displays the letters or symbols that have been keyed in. Similarly, if a certain key is hit on the reduced keyboard and results in the intended letters (assuming that the user always hits the intended key and that there is no "typo") being displayed, the associated cost is defined to be 0. On the other hand, if the last key entry results in one of the displayed letters or symbols being different than the intended combination, then it may be reasonable to assume that the associated cost is 1 and this cost is then added to the cost of the input process before reaching the current position. As the user hits the space bar to indicate that the signature input has reached the intended end (or any other key used for that purpose), we obtain a total cost. This generates a total cost function $C^1$ defined for each legal entry.

There are several other cost functions that seem reasonable as well. For example, suppose we only check if the last entered character results in a display that coincides with the intended symbol, and we assign a cost of 1 if it is not and 0 if it is. In particular, we do not look at the entire expression obtained so far, only the last entered character. Adding up all those costs as we reach the end for a given valid combination defines another total cost function $C^2$ also defined on the collection of legal entries.

Both $C^1$ and $C^2$ satisfy that the cost of the input process for the regular keyboard is always 0. It seems that $C^2$ is a little simpler, but that $C^1$ probably more accurately reflects the user experience.

Perhaps the user experience is such that if there is a character combination on the screen and this combination differs from the intended one in n places, then the anxiety or concern that it causes is more adequately reflected by a (differential) cost of n, then we may define yet another total cost function $C^3$ obtained by summing up these differential costs.

Another possibility is to not go through these differential cost funtions at all. For example, suppose the cost for a given valid combination of n characters is simply if this combination shows up after the n:th keystroke (without the space character or whatever is used to indicate completion of the input process for that valid character combination). Then we have yet another cost function $C^4$. This cost function is perhaps appropriate for the user who knows what he is inputting and trusts the application. So, he is not going to seriously consider the visual feedback and be alarmed by it until he has reached the end of the word.

Suppose we go back to the definition of the cost function $C^1$. If the user keeps on typing and the intended symbol is not displayed, then the cost goes up with 1 each time this happens. So, if the desired character combination fails to show up say three times in a row, then the cost goes up by 3. More generally if the incorrect display is obtained n times in a row, then the added cost is n. In this sense, this cost function is linear as a function of the "delay." It may be more accurate to model the user's experience by some other dependency on this n. For example, we may assume a quadratic dependency so that the differential cost after n incorrect displays is $n^2$, and then as soon as the intended combination shows up on the screen the differential cost is set back to 0. This defines yet another cost function $C^{1,(2)}$ (where the (2) indicates the quadratic nature of the cost's dependency on the "delay"). Similar modifications of the other cost functions can also be defined.

Another type of modification of these cost functions is the following. To be specific, let us consider $C^1$ again. Suppose we now distinguish two types of costs. In addition to the cost of 1 each time the intended character combination fails to show up, we can also assign a cost a (with $a \geq 0$) for each user action to display another character combination, consistent with the signature up to that point. Then if it takes k such actions (perhaps key clicks or down arrows), then the additional differential cost is ka. In this way, we obtain a more general class of cost functions $C^1(a)$ with $C^1(0)=C^1$. By adjusting the value of a, we can model how much we believe the effort to adjust the displayed character combinations impacts the user's experience.

Similar modifications of the other cost functions are also possible.

There are certainly other aspects that may be interesting to take into consideration when defining a cost function. Different words and letter combinations have different probabilities for being mistyped. This can also easily be incorporated into the definition of a cost function. Another related effect that may be interesting to model is that with a reduced keyboard it becomes particularly challenging to keep track of the number of times in a row a certain key has been hit. So, when the signature remains the same even when the intended letter changes it is easy to introduce a typo. Hence, one would expect the user to have to allocate more attention to those situations unless the feedback is accurate. With this in mind, we can, for instance, assign a quadratic differential cost function not to a general delay as in the definition of $C^{1,(2)}$, but rather only when the signature remains the same in consecutive key strokes. The total cost function with this modification is denoted by $\tilde{C}_1^{(2)}$.

5.3 Beginning of Words with Path Ordering is not Optimal

Let us assume that we are using a standard dictionary with frequency of use information for each word. This makes it possible to calculate the path probabilities for any given signature sequence and for any beginning of word or legal combination. Hence, it becomes possible to order each of the character combinations in order of most likely to least likely interpretation of a given (partial) signature. If the decision of what to display on the screen and in a possible alternatives region is based on that order (with the most likely appearing on the screen, say, and alternatives possibly displayed consistently with the ordering), then we shall say we are using the path ordered Beginning of Words (BOW/po) approach. (Note that this is a misnomer since a BOW may not actually be the beginning of a word, just a valid combination of characters.)

Although the BOW/po seems like an efficient procedure for the display, we shall next show that it is in fact suboptimal for the cost function $C^3$. The example will make it clear that BOW/po is quite often sub-optimal.

We start by observing that the values of the different cost functions also depend on the dictionary used, not just the display routines (and of course the combination the cost function is being evaluated for). We shall proceed by finding a small dictionary for which BOW/po is sub-optimal when the cost function $C^3$ is used. We shall not be concerned with the interpretation of the dictionary entries as words in any natural language. We are interested in understanding the underlying phenomena that cause a display procedure to be an optimal solution or not.

EXAMPLE 5.1

Let the dictionary consist of three words, each one with two letters. Let the three words be $$\text{aa bb bc} \tag{158}$$

Suppose the keyboard has all three letters on one key: [abc]. Let us further assume that the probabilities of the words are as follows:

$$P(aa)=0.4 P(bb)=0.39 P(bc)=0.21. \tag{159}$$

Then the BOW/po results in "b" first being displayed as the user hits the key, and then as the user hits it a second time "aa" is displayed, and finally as he hits the space bar "aa" remains on the screen. The average total cost $\tilde{C}_3(\text{BOW/po})$ for this three-word based dictionary is $$0.4 \times 1 + 0.4 \times 0 + 0.6 \times 0 + 0.39 \times 2 + 0.21 \times 2 + 0.4 \times 0 + 0.39 \times 2 + 0.21 \times 2 = 2.8. \tag{160}$$

On the other hand, if we use a different display algorithm, we can achieve a lower cost. More specifically, suppose we first display "b" as before, then "bb", and let "bb" remain on the screen when the space bar is hit. Then the average total cost $C_3(\text{BOW/mod})$ is $$0.4 \times 1 + 0.6 \times 0 + 0.4 \times 2 + 0.39 \times 0 + 0.21 \times 1 + 0.4 \times 2 + 0.39 \times 0 + 0.21 \times 1 = 2.42. \tag{161}$$

5.4 A General Class of Display Algorithms

In this subsection, we shall identify a useful, general class of display procedures that includes BOW/po as well as many others. The rationale behind this class is based on the assumption that the user inputs key by key, moving from the left to the right of the signature corresponding to the intended character combination. Eventually he reaches the end of the intended combination, and at that point we assume that he hits a space bar. If we are really trying hard to avoid changes on the screen, we may decide to suppress updating the screen every second time or something similar. However, our class of display algorithms will not allow this, and we shall assume that the screen is updated with a new combination after each keystroke.

It is certainly possible to introduce display procedures that take sophisticated considerations like grammar, previous words, etc., into account. Here we shall not do that, but we shall only assume that the display depends on the keystrokes (i.e., the signature) and the dictionary of valid combinations, and that we update the screen after each keystroke with a combination. The input process ends, and a new one starts, after the space bar is hit. These considerations are behind the definition of display algorithm we shall consider here. We shall use the notation B for this class, and a specific procedure is denoted by B.

To be more precise, we shall look more carefully at BOW, and introduce some appropriate definitions and notation.

Let the dictionary D of valid character combinations be fixed, and assume that each such combination ends with a space character (the exact delimiter is of no importance). From the dictionary D we derive the collection of beginnings of valid character combinations, and this collection is denoted by $\bar{D}$, BOW(D), or, as we have done up until now, BOW.

Because of the step-by-step assumption about the input process, the classes of truncated character combinations are useful: We let #w be the length of the character combination w∈$\overline{D}$, i.e., the number of characters in w. We also let #$\overline{D}$=max{#w:w∈$\overline{D}$} be the length of the longest character combination in $\overline{D}$. We define $\overline{D}_i$ to be the collection of all character combinations from $\overline{D}$ of length i, i=1, . . . , #$\overline{D}$. In this way, $$\overline{D}=\cup_i \overline{D}_i, \text{ and } \overline{D}_{i_1}=\cap, i_1 \neq i_2. \tag{162}$$

We denote the collection of all valid signatures, corresponding to combinations in $\overline{D}$, by $\overline{S}$. Similarly, all valid signatures of length i are collected in $\overline{S}_i$, i.e., $\overline{S}_i$ consists of all signature of the combinations in $\overline{D}_i$, i=1, . . . , #$\overline{D}$. If we also let $\overline{D}(\sigma)$ be all the combinations in $\overline{D}$ with signature σ, then we have $$\overline{D}=\cup_i\cup_{\sigma\in\overline{S}_i}\overline{D}(\sigma)$$

$$\overline{D}_i=\cup_{\sigma\in\overline{S}_i}\overline{D}(\sigma)$$

$$\overline{D}(\sigma_1)\cap\overline{D}(\sigma_2)=\emptyset, \sigma_1\neq\sigma_2. \tag{163}$$

The classes $\overline{D}(\sigma)$ are interesting since each contains the "collisions" we have for the corresponding signature σ.

Now, a display algorithm is simply a mapping B:$\overline{S}\rightarrow\overline{D}$ that filters these classes in the sense that $$B\overline{S}_i \subset \overline{D}_i, i=1, \ldots, \#\overline{D}. \tag{164}$$

Hence, $$B(\sigma)\in\overline{D}_i, \text{ for each } \sigma\in\overline{S}_i, i=1, \ldots, \#\overline{D}. \tag{165}$$

The collection of all display algorithms is denoted by $\overline{B}$. With B=BOW/po we certainly have B∈$\overline{B}$.

As the user keeps entering the signature sequence corresponding to the intended word, he receives feedback on the screen. Using a display algorithm from the general class $\overline{B}$, he receives this feedback after each keystroke, and the displayed character combination has as many characters as keystrokes (note that we are including the space bar, mostly for convenience). Hence, if the intended word has N+1 characters, counting the space character (or equivalent), we obtain a sequence of N+1 displayed character combinations, $b_i$, i=1, . . . , N+1. Furthermore, $$\#b_i=i, i=1,\ldots,N+1. \tag{166}$$

5.5 A general Class of Cost Functions

The class of cost functions we shall consider is also quite general. At this point the ambition we have with these cost functions is to quantify the user experience as he (correctly) types in the different keystrokes corresponding to the intended word. For example, we could also try to measure how easy it is to detect common typos, or how easy it is to correct such mistakes, but that is not our goal at present.

Essentially, we are trying to capture the user's experience of the difference between what appears on the screen and what he ideally wants to see on the screen after each keystroke.

With this in mind, it makes sense to first define what we mean by a differential (or incremental) cost function $C_i$ at step i. The idea is for $C_i$ to measure the cost of the difference after the i:th keystroke. So, if the user intends to type the valid letter combination w, and he after keystroke i, i=1, . . . , N+1, sees the character combination bi, then $C_i$(w, $b_i$) somehow should reflect the user's experience at that point; a larger value of $C_i$(w, $b_i$) should hopefully correspond to a worse user experience.

A differential cost function at step i is now simply a non-negative function $C_i$:$\overline{D}_i \times \overline{D}_i \rightarrow [0, \infty)$ defined on pairs (u, v) of valid chararacter combinations of length i:

$$C_i(u,v)\geq 0, (u,v)\in\overline{D}_i\times\overline{D}_i. \tag{167}$$

For a valid character combination w∈D with signature σ, we let $w^{(i)}$ be the i first characters and, similarly, $\sigma^{(i)}$ be the signature of $w^{(i)}$, i=1, . . . , #w. Now, a total cost function is a non-negative function C:D×$\overline{B}\rightarrow[0,+\infty)$ that is defined through a collection of differential cost functions $C_i$, i=1, . . . , #D by letting $$C(\omega, B) = \sum_{i=1}^{\#w} C_i(w^{(i)}, B(\sigma^{(i)})) \quad w \in D, B \in \overline{B}. \tag{168}$$

5.6 The Solution of the Display Optimization Problem

We shall assume that we are given a dictionary D of valid combinations and a specific cost function C. We shall also assume that we know the collection of all probabilities P={p(w)}$_{w\in D}$ of combinations in D. We let $C_{avg}=C_{avg}(B)$ be the average total cost for all combinations in D using the display procedure B∈$\overline{B}$. The display optimization problem of Subsection 5.1 can now be precisely stated as follows: find the solution $B^{min}$ to the minimization problem $$\min_{B\in\overline{B}} C_{avg}(B). \tag{169}$$

In other words, the solution to the display optimization problem is the display algorithm $B^{min}$ such that $$C_{avg}(B^{min})=\min_{B\in\overline{B}}C_{avg}(B). \tag{170}$$

To solve this problem, we first observe that this is the same as solving each of the following problems for the differential cost functions $C_i$, i=1, . . . , #$\overline{D}$, associated with C:

$$\min_{B\in\overline{B}} avg_{w\in\overline{D}_i} C_i(w,B(\sigma)) \tag{171}$$

where σ is the signature of w. Further untangling our notation, this is equivalent to solving $$\min_{u\in\overline{D}(\sigma)} avg_{w\in\overline{D}(\sigma)} C_i(w,u) \text{ for each } \sigma\in\overline{S}_i. \tag{172}$$

In other words, fixing a general σ∈$\overline{S}_i$, to solve the display optimization problem we have to find the element $u^{min}\in \overline{D}(\sigma)$ for which $$avg_{w\in\overline{D}(\sigma)}C_i(w,u^{min})=\min_{u\in\overline{D}(\sigma)} avg_{w\in\overline{D}(\sigma)}C_i(w, u). \tag{173}$$

Once we find this $u^{min}=u^{min}(\sigma)$, then the corresponding optimal display algorithm $B^{min}$ is given by $$B^{min}(\sigma)=u^{min}(\sigma), \sigma\in\overline{S}_i \tag{174}$$

for i=1, . . . , #$\overline{D}$.

This equation is in fact not hard to solve in general. However, let us still start with the easiest case. If we pick the cost function $C^1$, then due to the particular definition of this cost function (it is either 0 or 1 depending on whether the displayed u is the same as the intended combination), it is easy to see that the solution of (170) is $B^{min}$=BOW/po (for each fixed dictionary).

Going back to the general case (169) and its alternative formulation (172), we note that if we are given the probabilities P={p(w)}$_{w\in\overline{D}}$ of the combinations in the dictionary D, then we can calculate all the probabilities $\overline{P}$={$\overline{p}$(w)}$_{w\in\overline{D}}$ of all the w∈D. Using the definition of the average (or expected value) over this probability distribution, we see that (172) is the same as $$\min_{u \in \overline{D}(\sigma)} \sum_{w \in \overline{D}(\sigma)} C_i(w, u)\overline{p}(w \mid \sigma) \text{ for each } \sigma \in \overline{S}_i. \quad (175)$$

Here $\overline{p}(w|\sigma)$ is the conditional probability of w, knowing that w∈D(σ):

$$\overline{p}(w \mid \sigma) = \frac{\overline{p}(w)}{\overline{p}(\sigma)}, \quad (176)$$

with $$\overline{p}(\sigma) = \overline{p}(\overline{D}(\sigma)) = \sum_{w \in \overline{D}(\sigma)} \overline{p}(w). \quad (177)$$

The equation (175) thus shows that the solution to the display optimization problem is obtained by letting $u^{min}(\sigma)$ be the smallest component of the vector obtained by applying the matrix $C_i(\sigma) = (C_i(w, u))_{u \in \overline{D}(\sigma), w \in \overline{D}(\sigma)}$ *to the vector of probabilities* $P(\sigma) = (\overline{p}(w))_{w \in \overline{D}(\sigma)}$.

In the case of the cost function $C^1$, it is easily shown that this solution is in fact BOW/po.

EXAMPLE 5.2

In the case of the cost function $C^1$, the matrices $C_i^1(\sigma), \sigma \in \overline{S}_i$, are particularly easy. All elements are 1 except for the diagonal where they are 0:

$$C_i^1(\sigma) = \begin{pmatrix} 1 & 1 & \dots & 1 \\ 1 & 1 & \dots & 1 \\ \dots & \dots & \dots & \dots \\ 1 & 1 & \dots & 1 \end{pmatrix} - \begin{pmatrix} 1 & 0 & \dots & 0 \\ 0 & 1 & \dots & 0 \\ \dots & \dots & \dots & \dots \\ 0 & 0 & \dots & 1 \end{pmatrix} \quad (178)$$

These are n×n matrices with n given by the number of elements in $\overline{D}(\sigma)$: $n = \#\overline{D}(\sigma)$ (for each (σ). Hence, the equation (175) in this case becomes $$\min_{u \in \overline{D}(\sigma)} \sum_{w \in \overline{D}(\sigma)} \overline{p}(w) - \overline{p}(u). \quad (179)$$

Since the sum of probabilities here is independent of u, the minimum value $u^{min}$ is obtained for the component corresponding to the largest probability p(u). This is of course exactly BOW/po.

Let us also briefly reconsider Example 5.1.

EXAMPLE 5.3

Let us consider the small dictionary in Example 5.1 and the cost function $C^3$. The three combinations aa, bb, and bc have the same signature (hitting the same key twice) and hence belong to the same $\overline{D}(\sigma)$. If we order these three elements with aa first, bb second, and bc last, then the cost matrix $C = C_2^3(\sigma)$ for that σ is given by $$C = \begin{pmatrix} 0 & 2 & 2 \\ 2 & 0 & 1 \\ 2 & 1 & 0 \end{pmatrix}, \quad (180)$$

and the vector of probabilities is $$\overline{P} = \begin{pmatrix} 0.4 \\ 0.39 \\ 0.21 \end{pmatrix}. \quad (181)$$

So, $$C\overline{P} = \begin{pmatrix} 1.6 \\ 1.01 \\ 1.19 \end{pmatrix}, \quad (182)$$

and the smallest component $u^{min}$ of this vector is the second, corresponding to the combination bb, $$u^{min} = bb.$$

This is consistent with the choice we made back in Example 5.1.

5.7 Optimal Display of Alternatives

In the previous section we have shown how to obtain the optimal combination to display when the user has hit certain keys. Of course, often the keystrokes and the corresponding signatures do not identify the intended character combinations uniquely, and then the displayed combination is only the best in a probabilistic sense, with the lowest average cost (with respect to the selected differential cost function). Of course, the user may very well have intended a different combination than what is displayed on the screen. In this subsection, we shall look at what to bring up next, after the optimal solution has been displayed and is rejected by the user. Further, if that alternative is also rejected by the user, then what combination shall come up after that, and so on.

We shall assume that the user has typed in a signature σ, i.e., a sequence of keystrokes, and that one of the combinations u∈$\overline{D}(\sigma)$ has been displayed. Since u is the first to be displayed, we shall use the notation $u^{(0)}$; it is also convenient to set $\overline{D}^{(0)}(\sigma) = \overline{D}(\sigma)$. If the user inspects this $u^{(0)}$ and decides to discard it, the collection of the remaining valid combinations with that signature is $$\overline{D}^{(1)}(\sigma) = \overline{D}^{(0)} = \overline{D}^{(0)}(\sigma) \setminus \{u^{(0)}\}. \quad (183)$$

We are again interested in the optimal display algorithm, now conditioned on the extra information that $u^{(0)}$ is not the intended letter combination. This translates into finding another optimal combination $u^{(1)} \in \overline{D}^{(1)}(\sigma)$. The optimality may be measured with a potentially different cost function.

This process is then repeated recursively. Let $J = J(\sigma) = \#\overline{D}(\sigma)$ (a is fixed). From $u^{(j)}$ and $\overline{D}^{(j)}$, j = 0, ..., J−1, we obtain $$\overline{D}^{(j+1)}(\sigma) = \overline{D}^{(j)}(\sigma) \setminus \{u^{(j)}\} = \overline{D}(\sigma) \setminus \{u^{(1)}, \dots, u^{(j)}\}, j = 0, \dots, J-1. \quad (184)$$

Note that $\#\overline{D}^{(j)}(\sigma) = J - j$, and in particular, the last set $\overline{D}^{(j)}$ is empty.

At each step, a different cost function may be utilized if we believe that the user experience is better reflected in that way. Also, once we know that an intended element is not $\overline{D}^{(j-1)}(\sigma)$, then the conditional probabilities for the remaining elements in $\overline{D}^{(j)}$, $j=0, \ldots, J-1$, takes this into account. At each step, these conditional probabilities differ by a simple scaling factor. More precisely, let $$\overline{p}^{(0)}(w) = \overline{p}(w \mid w \in \overline{D}(\sigma)) = \overline{p}(w \mid \sigma) \qquad (185)$$

and $$\overline{p}^{(j)}(w) = \overline{p}(w \mid w \in \overline{D}^{(j)}(\sigma)), \; j = 0, \ldots, J-1 \qquad (186)$$

for $j = 0, \ldots, J - 1$. Then $$\overline{p}^{(j)}(w) = \begin{cases} 0 & \text{if } w \notin \overline{D}^{(j)}, \\ \dfrac{1}{\overline{p}(\overline{D}^{(j)})} \overline{p}(w) & \text{if } w \in \overline{D}^{(j)}. \end{cases} \qquad (187)$$

Now, to determine the optimal elements $u^{(j)}$ to display with this successive additional information, we may proceed as before by using the analog of the equation (175) (with the cost function and the conditional probabilities replaced in the obvious way).

We have now solved the full display problem, both the problem of what to display initially and then in what order to display the alternatives. The solution to the initial display optimization problem provides a display algorithm B, i.e., a mapping $B: \overline{S} \to \overline{D}$ so that $$\overline{S} \ni \sigma \xrightarrow{B} u \in \overline{D}(\sigma). \qquad (188)$$

The solution to the full display problem extends this. For each signature $\sigma \in \overline{S}$, the full solution defines a vector $\vec{B}(\sigma)$ consisting of all elements in $\overline{D}(\sigma)$ ordered with respect to the cost functions used. Hence, $$\overline{S} \ni \sigma \xrightarrow{\vec{B}} \begin{pmatrix} u^{(0)} \\ u^{(1)} \\ \vdots \\ u^{(J-1)} \end{pmatrix}, \qquad (189)$$

where $u^{(j)} \in \overline{D}(\sigma)$, $j = 0, \ldots, J$ and $J = J(\sigma) = \#\overline{D}(\sigma)$. We refer to the mapping $\vec{B}$ as a full display algorithm, and $u^{(0)}$ is the initial display and the elements $u^{(1)}, \ldots, u^{(J-1)}$ are the alternatives.

We remark that the overall cost function that determines a display algorithm may be a composite of various individual cost functions. For instance, variations may be used not only before and after certain keystrokes (such as space) are entered, but also for different ordering rank in the alternatives presented.

5.8 A Note on Display Optimization, Approximate Typing, and NLP Considerations

In the previous sections, we have often used maximum likelihood considerations for resolving ambiguities and for assessing what alternatives to present to the user. As we have seen, this often amounts to basing decisions on the most frequently occurring character combinations. It is clear that these types of considerations can instead be based on the appropriately defined cost functions. In particular, the techniques we have developed for approximate typing (including automatic error correction and auto-completion) and improved ambiguity resolution using NLP techniques both have direct analogs based on cost functions and the methods described above. These are practically realized by using the generated cost measures as a replacement of the frequency measures involved in these techniques.

6 Miscellaneous Observations and Comments 6.1 Auto-Completion

Short words often create ambiguities for any reduced keyboard and for the ORK in particular. At the other end of the spectrum, there is a sparsity of valid words and signatures, especially of the longer combinations, among the collection of all possibilities. As we have mentioned earlier, this sparsity can be exploited for auto-completion: after specifying the beginning of the word or the signature, the rest may be unique and hence it can be left to the device to automatically complete the input.

Auto-completion is useful for more situations than just where the beginning uniquely identifies the rest of the input. There are situations where the several characters at the beginning of the sequence are unique, but there are several possible endings. Similarly, there is a possibility that the intended signature can be completed without the word being uniquely identified. The device may then make a prediction as to what the likely set of characters may be and thereby still provide an auto-completion option to the user.

Another situation arises when there are several possible continuations of the input sequence, but the device may make a prediction as to what the likely set of characters may be. In such situations, auto-completion can also be useful.

We begin by limiting the search for auto-completion alternatives to the dictionary entries that satisfy the signature entered so far, and then we proceed as follows. At any given point in the signature entry process, there may be more than one dual signature sequence that, in combination with the entered signature, forms a full word or BOW arising from a valid dictionary entry. For each of these dual signature sequences, there will be zero or more completion alternatives that will satisfy the entered signature sequence as well as the dual signature sequence. (Zero for the case when the dual signature sequence will correspond to a full word only.) Thus, if we offer an auto-completion sequence to the user for each of these "duals" separately, the overall collection of available alternatives increases. These alternatives may then be presented to the user as he cycles through the duals of the entered signature.

The above determination of the auto-completion alternatives can be incorporated as part of the normal dictionary search that occurs on keystroke entry. At any given keystroke, the signature sequence so far is known and, hence, as one scans through the dictionary for matching dual signature sequences, one may also check the outlined criterion to find an auto-completion alternative for each possible dual signature sequence. These alternatives may then be stored and made available to the user as he cycles through the collection. This simultaneous scanning for multiple purposes is very efficient and decreases overall computation load on the processor.

When the user has already typed the delimiter after a sequence of signatures, it is clear that the end of the intended word has been reached, and no auto-completion offering will be useful. This information causes a redundancy that can be exploited for other uses. For instance, we can use the same mechanism for presenting alternatives and accepting these for both auto-completion and auto-correction. The auto-correction may then be offered only when the entire signature has been entered. The offering of auto-completion and auto-correction alternatives may be mutually exclusive in time for another reason: auto-correction alternatives may, for instance, be offered only if there is no matching dual signature sequence from the dictionary for the entered signature sequence, which of course never occurs for auto-completion.

Clearly, auto-completion alternatives that do not add much more information to the entered signature are not very useful. For instance, if only one character is remaining in a sequence of character entries, it may be easier to just type the remaining character rather than to use the auto-completion acceptance method. Also, it may distract the user from the general typing flow to see such short, non-useful alternatives on the display. Thus, we may require a minimum number of additional characters before alternatives are presented to the user. This not only improves the user experience, but it also helps us to quickly search the dictionary for auto-completion alternatives as we can directly eliminate the entries that do not meet the minimum additional characters criterion. An additional benefit is that by eliminating shorter entries, we can consider the longer, useful entries only in those cases. As a result, the number of useful alternatives actually increases.

6.2 Reference Lists

As we search for auto-completion alternatives, there are typically many valid character combinations consistent with the signature entered up to that point. For example, suppose the user is certain about the spelling of the beginning of a word, but needs assistance with the rest. In this situation and others, we may provide the user access to a list of such alternatives. Moreover, we may disregard the currently displayed word and offer the full set of alternatives consistent with the entered signature. We may additionally limit these alternatives based on frequency of use, recent use, or other factors. This is desirable if there are too many alternatives for a good user experience.

6.3 Predictions based on Mixed Ambiguity

The dictionary used may be composed of characters/symbols that may or may not correspond to an ambiguously entered signature. It also possible to have a character/symbol in a dictionary correspond to both an ambiguously entered signature and an unambiguously entered input. Specifically of interest is the following scenario where we have two or more modes. In one or more modes, we use the ten keys for ambiguous signature entry and in other modes we use the ten keys for unambiguous entry only. The unambiguous entries may be for a numeric mode for characters 0 through 9 or for a symbol mode. In each of these modes, we may use additional input such as a Shift key press to create further sub-modes which need not be mutually exclusive in composition. Now, with a dictionary that supports all kinds of characters/symbols and entry modes as outlined above, we may use input from all modes to predict the final output presented to the user. For instance, for typing a word (abbreviation really) such as "Y2K," one may use the standard ambiguous mode to enter "Y" and "K" while "2" may be entered in the numeric unambiguous mode. The disambiguation engine will still be able to predict the full sequence "Y2K" from the given input and dictionary. A possible optimization for dictionary storage that is helpful for storing and indexing characters which do not correspond to an ambiguous signature is the following: One may, for the purpose of indexing, assign a known signature and new dual to an unambiguously entered character. Since the index is composed for the known signatures (first four signatures in our specific case), we can now incorporate the new character in the dictionary without increasing the index size. For input purposes, the use of a common signature does not impose any additional requirements except a mapping between the two.

6.4 Prediction of the Case of Characters Typed

Unlike the QWERTY keyboard, the Shift key in the ORK is used not only for specifying the case of letters, but also to limit the set of duals corresponding to letters and non-letter characters. Further, depending on the case of characters entered so far, we may improve upon the auto-correction and auto-completion alternatives that may be offered. Specifically, if all signatures entered so far correspond to letters in a possible offering that are upper case, we may cause all the rest of the letters in the offering to also be upper case. In other instances, we simply let them be lower case. For instance, "Thistle" may be offered as the auto-completion alternative to "This" while "THISTLE" may be offered as the auto-completion alternative for "THIS."

6.5 Locking of BOW

In some user typing scenarios, explicit feedback from the user regarding the validity of predicted, or otherwise entered, dual signatures is useful to capture and record as a "lock" on one or more of the duals of the character signatures entered up to that point. This "lock information" can then be used in additional typing to narrow down the search for alternatives (including auto-completion and auto-correction) to only those possible sequences that satisfy the lock. Two such specific instances are outlined below:

- If the user pauses while entering a signature to cycle through the alternatives, then the alternative cycled to must be perceived as one the user is interested in and thus may be locked.
- If the user types something in an unambiguous mode or manner, such as in numeric mode, then this should be locked. Further, at this point it may be appropriate to lock the entire sequence already typed. The reasoning behind this is that if a break in touch-typing flow exists (by unambiguous entry), it is likely that the user is confident in the sequence available so far.

6.6 Contextual Information

The effective auto-completion alternatives to use are often context dependent. For example, as the user enters an email address, the natural auto-completion alternatives may be those provided by his address book or by recently used email addresses. Or, if the user is entering text in a certain programming environment with specific technical words, then the best auto-completion alternatives may be quite different than when typing a general text.

This type of contextual information may be used for virtually all aspects of entry using a reduced keyboard, not just for auto-completion. We may have several dictionaries available, depending on the context, and entries in these dictionaries may be flagged so that the context is identified. Contexts and dictionaries can then be given different priorities at run-time, and the feedback to the user may then reflect this.

6.7 Nature of "text"

The various discussions of "text" that we have had are generally understood to be composed of characters that may be letters or symbols. It is important to realize that, in fact, "text" is a misnomer here and really applies to all kinds of objects that the user input can be mapped to. For instance, a key on the keyboard may actually be mapped to a picture or graphic such as a "smiley face." The disambiguation engine may then determine how the prediction may include such a graphic. Additionally, the engine may determine that one or more characters or symbols may be mapped to a graphic. For instance, the sequence ":-)" may be mapped by the system to a single "smiley face." This is similar to how approximate typing methods map a sequence of characters to another such sequence, only in this case the resulting sequence includes a graphic object.

6.8 Spell Mode Automatic Tracking

The primary objective of "spell mode" is to enable specification of the dual signature of the sequence typed by the user. Typically while we are in spell mode, we use the "cycle" key (or scroll/up-down mechanism) to go through the dual signatures for each character (or other object) entered. It is also possible to enter normal signatures in the spell mode through ORK typing. The typing prediction in the spell mode may be different than that in the normal prediction mode and in fact may be completely deterministic for a key. However, a user may choose to not use this typing and may enter normal signatures only in the normal prediction mode.

In the process of entry of the normal signature, if the user finds that the dual signature of the sequence needs to be specified, and thus the user moves into spell mode, we may provide an additional feature that we call "automatic tracking." This feature comes into play when the user enters and also exits the spell mode. At time of entry the system specifically replaces the cursor such that it operates on the first character of the sequence being typed, while at the time of exit it replaces the cursor such that it goes back to the original position where the spell mode was entered, or a position that is at the end of the sequence (including before or after a delimiter). In general, the exact placement of the cursor in both cases may vary and may be determined by several factors at run-time.

Note that for the above feature the user may attempt to spell a sequence on a "word" basis, or on possibly another basis that may be longer, such as full sentences/paragraphs/pages/etc., and the corresponding location of the cursor to be placed at may vary. Also, note that the feature may be provided to the user as a set of customizable options, including ones that may enable or disable the whole feature of re-placement of cursor entirely.

6.9 Numeric and Symbol Mode Mapping

A particular way for mapping of numerals and some symbols is described here and may be used.

The user may enter a numeric mode through an input signal that may be a key press. In this mode, pressing any one of the main ten keyboard keys will lead to the system generating as output a corresponding numeral (from 0-9, exaxt assignment may vary such as 1234567890).

Further, when in the numeric mode, another input (including a key down event of Shift or other Key) may cause the mode to change to a symbol mode in which each of the ten keys may correspond to a specific symbol being output. In particular, the correspondence to the key arrangement from left to right may be as follows: @ $ + −/( ), . . .

Further, when in symbol mode (and the Shift key may be continued to be held down), the user may produce one or more inputs (including an up/down/cycle key events) that cause the mapping of the keys to symbols to change to a different set of symbols. In particular, the following two mapping are of interest and may be arrived to by consecutive presses of say a cycle key: # % * = { } < >; and " ^- | [ ] ! ' ?. Another input from the user (including release of the Shift or other key previously held down) may then cause the mode to revert from symbol to numeric.

REFERENCES

[1] The Penn Treebank Project. World Wide Web. http://www.ldc.upenn.edu/doc/treebank2/treebank2.index.html.

[2] Steven Abney. Parsing by chunks. In Robert C. Berwick, Steven P. Abney, and Carol Tenny, editors, Principle-Based Parsing: Computation and Psycholinguistics, pages 257-278. Kluwer Academic Publishers, Boston, 1991. http://citeseer.ist.psu.edu/article/abney91parsing.html.

[3] Steven Abney. Partial parsing via finite-state cascades. In Workshop on Robust Parsing, 8th European Summer School in Logic, Language and Information, Prague, Czech Republic, pages 8-15, 1996. http://citeseer.ist.psu.edu/abney96partial.html.

[4] James F. Allen. Natural Language Understanding. The Benjamin/Cummings Publishing Company, Menlo Park, Calif., 1995.

[5] Susan Armstrong, Graham Russell, Dominique Petitpierre, and Gilber Robert. An open architecture for multilingual text-processing. In EACL 1995, *SIGDAT Workshop*, pages 30-34,1995.

[6] Ricardo A. Baeza-Yates and Gonzalo Navarro. Fast approximate string matching in a dictionary. In *String Processing and Information Retrieval*, pages 14-22, 1998. http://citeseer.ist.psu.edu/article/baeza-yates98fast.html.

[7] Ricardo A. Baeza-Yates and Gonzalo Navarro. Faster approximate string matching. *Algorithmica*, 23(2):127-158, 1999. http://link.springer.de/link/service/journals/00453/bibs/23n2p127.html.

[8] Adam L. Berger, Stephen A. Della Pietra, and Vincent J. Della Pietra. A maximum entropy approach to natural language processing. *Computational Linguistics*, 22(1): 39-71, 1996. http://www-2.cs.cmu.edu/~aberger/maxent.html http://citeseer.ist.psu.edu/berger96maximum.html.

[9] T. Brants. Tnt—a statistical part-of-speech tagger. In Proceedings of the 6th Applied NLP Conference, ANLP-2000, Apr.29-May 3, 2000, Seattle, Wash., 2000. http://citeseer.ist.psu.edu/article/brants00tnt.html.

[10] E. Brill. A report of recent progress in transformation-based error-driven learning. In *Proc. ARPA Human Language Technology Workshop '94*, Princeton, N.J., 1994. http://citeseer.ist.psu.edu/brill94report.html.

[11] Eric Brill. A simple rule-based part-of-speech tagger. In *Proceedings of ANLP-92, 3rd Conference on Applied Natural Language Processing*, pages 152-155, Trento, IT, 1992. http://citeseer.ist.psu.edu/brill92simple.html.

[12] Eric Brill. Some advances in transformation-based part of speech tagging. In *National Conference on Artificial Intelligence*, pages 722-727, 1994.

[13] Eric Brill. Unsupervised learning of disambiguation rules for part of speech tagging. In *Proceedings of the Third Workshop on Very Large Corpora*. Association for Computational Linguistics, 1995.

[14] Harry C. Bunt, Giorgio Satta, and John Carroll. *New Developments in Parsing Technology*. Kluwer Academic Publishers, 2004. http://search.barnesandnoble.com/booksearch/isbnInquiry.asp?userid=3B6Dv27AZ1&isbn=140202293X&itm=136.

[15] Glenn Carroll and Eugene Charniak. Two experiments on learning probabilistic dependency grammars from corpora. Technical Report CS-92-16, Brown, March 1992. http://www.cs.brown.edu/publications/techreports/reports/CS-92-16.html.

[16] E. Chavez and G. Navarro. A metric index for approximate string matching. In LATIN, pages 181-195, 2002. http://citeseer.ist.psu.edu/article/avez02metric.html.

[17] Doug Cutting, Julian Kupiec, Jan Pedersen, and Penelope Sibun. An practical part-of-speech tagger. In *Proceedings of the Third Conference on Applied Natural Language Processing* '92, 1992.

[18] Matt Davis. World Wide Web, 2003. http://www.mrc-cbu.cam.ac.uk/personal/matt.davis/Cmabrigde/.

[19] Stephen J. DeRose. Grammatical category disambiguation by statistical optimization. *Computational Linguistics*, (14.1):31-39, 1988.

[20] Bonnie J. Dorr. Machine Translation: *A View from the Lexicon*. The MIT Press, 1993.

[21] Jeff Erickson. Combinatorial algorithms. World Wide Web, 2004. http://www-courses.cs.uiuc.edu/~cs473g/cs373u/notes/04-dynprog.pdf.

[22] Tegic et al. A communication terminal having a predictive text editor application. http://swpat.ffii.org/pikta/txt/ep/1246/430/.

[23] Tegic et al. Reduced keyboard disambiguating computer. http://patft.uspto.gov/netacgi/nph-Parser?Sectl=PTO1&Sect2=HITOFF&d=PALL&p=1&u=/netahtml/srchnum.htm&r=1&f=G&1=50&s1=5818437.WKU.&OS=PN/5818437&RS=PN/5818437.

[24] R. Garside, G. Leech, and G. Sampson, editors. *The Computational Analysis of English, chapter The CLAWS Word-tagging System*. London: Longman, 1987.

[25] R. Garside and N. Smith. Corpus Annotation: *Linguistic Information from Computer Text Corpora*, chapter A hybrid grammatical tagger: CLAWS4, pages 102-121. Longman, London, 1997. http://www.comp.lancs.ac.uk/ucrel/claws/.

[26] Stuart Geman and Donald Geman. Stochastic relaxation, Gibbs distributions, and the Bayesian estimation of images. *IEEE Transactions on Pattern Analysis and Machine Intelligence*, 6(6):721-741, 1984.

[27] Ulf Grenander. *Elements of Pattern Theory*. The Johns Hopkins University Press, 1996.

[28] Dennis Grinberg, John Lafferty, and Daniel Sleator. A robust parsing algorithm for link grammars. *In Proceedings of the Fourth International Workshop on Parsing Technologies*, September 1995. http://www.link.cs.cmu.edu/link/papers/index.html.

[29] Linda Van Guilder. Automated part of speech tagging: A brief overview. Lectures, World Wide Web, 1995. http://www.georgetown.edu/faculty/ballc/ling361/tagging-overview.html.

[30] Paul G. Hoel, Sidney C. Port, and Charles J. Stone. *Introduction to Stochastic Processes*. Waveland Press, 1987.

[31] X. D. Huang, A. Acero, and H. Hon. *Spoken Language Processing*. Prentice Hall, New York, 2001.

[32] W. John Hutchins and Harold L. Somers. *An Introduction to Machine Translation*. Academic Press, San Diego, 1992.

[33] Heikki Hyyrö. *Practical methods for approximate string matching*. PhD thesis, University of Tampere, Finland, 2003. http://acta.uta.fi/pdf/951-44-5840-0.pdf.

[34] Frederick Jelinek. *Statistical methods for speech recognition*. The MIT Press, 1997.

[35] Mark Johnson. Pcfg models of linguistic tree representations. *Computational Linguistics*, (24(4)):613-632, 1999. http://www.cog.brown.edu/~mj/Publications.htm.

[36] J. Kazama and J. Tsujii. Evaluation and extension of maximum entropy models with inequality constraints. *Proceedings of the 2002 Empirical Methods in Natural Language Processing*, pages 137-144, 2003.

[37] Angelika Kimmig and Daniel Meier. Probabilistic context free grammars. Lectures, World Wide Web, 2003/04. http://www.informatik.uni-freiburg.de/~ml/teaching/ws03/pll/pcfg.pdf.

[38] 1. Bahl et al. Design and construction of a binary-tree system for language modelling, 1987. http://patft.uspto.gov/netacgi/nph-Parser?Sectl=PT01&Sect2=HITOFF&d=PALL&p=1&u=/netahtml/srchnum.htm&r=1&f=G&1=50&s1=4,852,173.WKU.&OS=PN/ 4,852,173&RS=PN/4,852,173.

[39] Roy Lowrance and Robert A. Wagner. An extension of the string-to-string correction problem. *J. ACM*, 22(2): 177-183, 1975.

[40] Robert Malouf. A comparison of algorithms for maximum entropy parameter estimation. In *Proceedings of the Sixth Conference on Natural Language Learning* (CoNLL-2002), pages 49-55, 2002. http://bulba.sdsu.edu/malouf/papers/conll02.pdf.

[41] Christopher D. Manning and Hinrich Schiitze. *Foundations of Statistical Natural Language Processing*. The MIT Press, 1999. http://www-nlp.stanford.edu/fsnlp/.

[42] Mitchell P. Marcus, Beatrice Santorini, and Mary Ann Marcinkiewicz. Building a large annotated corpus of English: The Penn Treebank. *Computational Linguistics*, 19(2):313-330, 1994. http://citeseer.ist.psu.edu/~marcus93building.html.

[43] Andrew McCallum. Introduction to natural language processing. Lectures, World Wide Web, 2004. http://www.cs.umass.edu/~mccallum/courses/inlp2004/.

[44] Andrew McCallum, Kedar Bellare, and Fernando Pereira. A conditional random field for discriminatively-trained finite-state string edit distance. Technical report, June 2005. http://www.cs.umass.edu/~mccallum/papers/crfstredit-uai05.pdf.

[45] Bernard Merialdo. Tagging English text with a probabilistic model. *Computational Linguistics*, (20(2)):155-172, 1994.

[46] Ide Nancy and Jean Veronis. Word sense disambiguation: The state of the art. *Computational Linguistics*, 24(1):1-40, 1998. http://citeseer.ist.psu.edu/ide98word.html.

[47] F. Och and H. Ney. D,scriminative training and maximum entropy models for statistical machine translation. In Proc. of the 40th Annual Meeting of the Association for Computational Linguistics (ACL), 2002. http://citeseer.ist.psu.edu/och02discriminative.html.

[48] Judea Pearl. Causality: models, reasoning, and inference. Cambridge University Press, 2000.

[49] Leonid Peshkin and Virginia Savova. Why build another part-of-speech tagger? a minimalist approach. In *RANLP*, 2003. citeseer.ist.psu.edu/peshkin03why.html.

[50] Adwait Ratnaparkhi. A maximum entropy part-of-speech tagger. In *Proceedings of the Empirical Methods in Natural Language Processing Conference*, May 17-18 1996. http://www.cis.upenn.edu/~adwait/statnlp.html.

[51] Antoine Rozenknop. The Wall Street Journal experiment (and useful programs). Technical Report IC/2004/32, École Polytechnique Fédérale De Lausanne, School of Computer and Communication Sciences, March 26, 2004. http://icwww.epfl.ch/publications/documents/IC_TECH_REPORT_200432.pdf.

[52] Virginia Savova and Leonid Peshkin. Part-of-speech tagging with minimal lexicalization.

[53] Noah A. Smith. Log-linear models, 2004. http://nlp.cs.jhu.edu/~nasmith/loglinear-handout.pdf.

[54] Andreas Stolcke. An efficient probabilistic context-free parsing algorithm that computes prefix probabilities.

*Computational Linguistics*, (21(2)):165-201, 1995. http://www.icsi.berkeley.edu/~stolcke/papers/cl95/paper-html.html.

[55] P. Vanroose. Part-of-speech tagging from an information-theoretic point of view, 2001. http://citeseer.ist.psu.edu/646161.html.

[56] Jacques Vergne. Tutorial: Trends in robust parsing. In *Coling*, 2000. http://users.info.unicaen.fr/~jvergne/tutorialColing2000.html.

[57] Robert A. Wagner and Michael J. Fischer. The string-to-string correction problem. *J. ACM*, 21(1):168-173, 1974.

[58] G. Winkler. *Image analysis, random fields and dynamic Monte-Carlo methods*. Springer-Verlag, Berlin, 1995.

[59] Stuart N. Wrigley. Speech recognition by dynamic time warping. World Wide Web, 1998. http://www.dcs.shef.ac.uk/~stu/com326/sym.html.

[60] Justin Zobel and Philip W. Dart. Finding approximate matches in large lexicons. *Software—Practice and Experience*, 25(3):331-345, 1995. http://citeseer.ist.psu.edu/zobel95finding.html.

Appendix A Standard Tag Sets

A.1 Part-of-Speech Tags Used

These are standard tags used for instance by the British National Corpus (BNC).

AJ0 adjective (general or positive) e.g. good, old

AJC comparative adjective e.g. better, older

AJS superlative adjective, e.g. best, oldest

AT0 article, e.g. the, a, an, no

AV0 adverb (general, not sub-classified as AVP or AVQ), e.g. often, well, longer, furthest. Note that adverbs, unlike adjectives, are not tagged as positive, comparative, or superlative. This is because of the relative rarity of comparative or superlative forms.

AVP adverb particle, e.g. up, off, out. This tag is used for all prepositional adverbs, whether or not they are used idiomatically in phrasal verbs such as Come out here, or I can't hold out any longer.

AVQ wh-adverb, e.g. when, how, why. The same tag is used whether the word is used interrogatively or to introduce a relative clause.

CJC coordinating conjunction, e.g. and, or, but.

CJS subordinating conjunction, e.g. although, when.

CJT the subordinating conjunction that, when introducing a relative clause, as in the day that follows Christmas. Some theories treat that here as a relative pronoun; others as a conjunction. We have adopted the latter analysis.

CRD cardinal numeral, e.g. one, 3, fifty-five, 6609.

DPS possessive determiner form, e.g. your, their, his.

DT0 general determiner: a determiner which is not a DTQ e.g. this both in This is my house and This house is mine. A determiner is defined as a word which typically occurs either as the first word in a noun phrase, or as the head of a noun phrase.

DTQ wh-determiner, e.g. which, what, whose, which. The same tag is used whether the word is used interrogatively or to introduce a relative clause.

EX0 existential there, the word there appearing in the constructions there is . . . , there are ITJ interjection or other isolate, e.g. oh, yes, mhm, wow.

NN0 common noun, neutral for number, e.g. aircraft, data, committee. Singular collective nouns such as committee take this tag on the grounds that they can be followed by either a singular or a plural verb.

NN1 singular common noun, e.g. pencil, goose, time, revelation.

NN2 plural common noun, e.g. pencils, geese, times, revelations.

NP0 proper noun, e.g. London, Michael, Mars, IBM. Note that no distinction is made for number in the case of proper nouns, since plural proper names are a comparative rarity.

ORD ordinal numeral, e.g. first, sixth, 77th, next, last. No distinction is made between ordinals used in nominal and adverbial roles. next and last are included in this category, as general ordinals.

PNI indefinite pronoun, e.g. none, everything, one(pronoun), nobody. This tag is applied to words which always function as heads of noun phrases. Words like some and these, which can also occur before a noun head in an article-like function, are tagged as determiners, DT0 or AT0.

PNP personal pronoun, e.g. I, you, them, ours. Note that possessive pronouns such as ours and theirs are included in this category.

PNQ wh-pronoun, e.g. who, whoever, whom. The same tag is used whether the word is used interrogatively or to introduce a relative clause.

PNX reflexive pronoun, e.g. myself, yourself, itself, ourselves.

POS the possessive or genitive marker 's or '. Note that this marker is tagged as a distinct word. For example, Peter's or someone else's is tagged <NP0>Peter<POS>'s <CJC>or <PNI> someone <AV0>else<POS>'s]];

PRF the preposition of. This word has a special tag of its own, because of its high frequency and its almost exclusively postnominal function.

PRP preposition, other than of, e.g. about, at, in, on behalf of, with. Note that prepositional phrases like on behalf of or in spite of are treated as single words.

TO0 the infinitive marker to.

UNC unclassified items which are not appropriately classified as items of the English lexicon. Examples include foreign (non-English) words; special typographical symbols; formulae; hesitation fillers such as errm in spoken language.

VBB the present tense forms of the verb be, except for is or 's am, are 'm, 're, be (subjunctive or imperative), ai (as in ain't).

VBD the past tense forms of the verb be, was, were.

VBG -ing form of the verb be, being.

VBI the infinitive form of the verb be, be.

VBN the past participle form of the verb be, been

VBZ the -s form of the verb be, is, 's.

VDB the finite base form of the verb do, do.

VDD the past tense form of the verb do, did.

VDG the -ming form of the verb do, doing.

VDI the infinitive form of the verb do, do.

VDN the past participle form of the verb do, done.

VDZ the -s form of the verb do, does.

VHB the finite base form of the verb have, have, 've.

VHD the past tense form of the verbhave, had, 'd.

VHG the -ing form of the verb have, having.

VHI the infinitive form of the verb have, have.

VHN the past participle form of the verb have, had.

VHZ the -s form of the verb have, has, 's.

VM0 modal auxiliary verb, e.g. can, could, will, 'll, 'd, wo (as in won't)

VVB the finite base form of lexical verbs, e.g. forget, send, live, return. This tag is used for imperatives and the present subjunctive forms, but not for the infinitive (VVI).

VVD the past tense form of lexical verbs, e.g. forgot, sent, lived, returned.

VVG the -ing form of lexical verbs, e.g. forgetting, sending, living, returning.
VVI the infinitive form of lexical verbs, e.g. forget, send, live, return.
VVN the past participle form of lexical verbs, e.g. forgotten, sent, lived, returned.
VVZ the -s form of lexical verbs, e.g. forgets, sends, lives, returns.
XX0 the negative particle not or n't.
ZZ0 alphabetical symbols, e.g. A, a, B, b, c, d.

The following tags are used to indicate where the CLAWS system (the tagging system used by the BNC) has indicated an uncertainty between two possible analyses:

AJ0-AV0 adjective or adverb
AJ0-NN1 adjective or singular common noun
AJ0-VVD adjective or past tense verb
AJ0-VVG adjective or -ing form of the verb
AJ0-VVN adjective or past participle
AVP-PRP adverb particle or preposition
AVQ-CJS wh-adverb or subordinating conjunction
CJS-PRP subordinating conjunction or preposition
CJT-DT0 that as conjunction or determiner
CRD-PNI one as number or pronoun
NN1-NP0 singular common noun or proper noun
NN1-VVB singular common noun or base verb form
NN1-VVG singular common noun or -ing form of the verb
NN2-VVZ plural noun or -s form of lexical verb
VVD-VVN past tense verb or past participle The following codes are used with c elements only:
PUL left bracket (i.e. ( or [)
PUN any mark of separation (. !, : ? . . . )
PUQ quotation mark (' ' " ")
PUR right bracket (i.e. ) or ])

Note that some punctuation marks (notably long dashes and ellipses) are not tagged as such in the corpus, but appear simply as entity references.

Appendix B POS Tags and Collision Groups

B.1 Top Ten Collision Groups with Conditional Probabilities

TABLE 18

Top collision groups with frequencies and conditional probabilities.
(x. denotes an approximation of x to at least three decimals.)

| # | Words | Tag | Frequency | P(·|signature, tag) |
|---|---|---|---|---|
| 1 | of | total | 2941790 | 0.888 |
| | | prf | 2941444 | 1. |
| | | prp | 276 | 1. |
| | | unc | 28 | 0.373 |
| | | av0 | 27 | 1. |
| | | cjc | 11 | 0. |
| | | cjs | 3 | 1. |
| | | vhi | 1 | 1. |
| | or | total | 370855 | 0.112 |
| | | cjc | 370808 | 1. |
| | | unc | 47 | 0.627 |
| 2 | they | total | 433475 | 0.729 |
| | | pnp | 433441 | 1. |
| | | unc | 34 | 1. |
| | then | total | 160826 | 0.271 |
| | | av0 | 160652 | 1. |
| | | cjs | 171 | 1. |
| | | aj0-av0 | 1 | 1. |
| | | aj0 | 1 | 1. |
| | | cjc | 1 | 1. |
| 3 | now | total | 137814 | 0.575 |
| | | av0 | 137801 | 1. |
| | | cjs | 11 | 1. |
| | | nn1 | 1 | 0.027 |
| | | unc | 1 | 0.125 |

TABLE 18-continued

Top collision groups with frequencies and conditional probabilities.
(x. denotes an approximation of x to at least three decimals.)

| # | Words | Tag | Frequency | P(·|signature, tag) |
|---|---|---|---|---|
| | how | total | 101517 | 0.424 |
| | | avq | 101508 | 1. |
| | | unc | 4 | 0.500 |
| | | nn1 | 3 | 0.081 |
| | | av0 | 1 | 0. |
| | | np0 | 1 | 0.009 |
| | nos | total | 186 | 0.001 |
| | | np0 | 107 | 0.939 |
| | | nn2 | 79 | 0.975 |
| | yow | total | 84 | 0. |
| | | nn1 | 33 | 0.892 |
| | | nn1-vvb | 26 | 1. |
| | | nn1-np0 | 15 | 1. |
| | | vvb | 6 | 1. |
| | | np0 | 3 | 0.026 |
| | | vvi | 1 | 1. |
| | hos | total | 8 | 0. |
| | | np0 | 3 | 0.026 |
| | | unc | 3 | 0.375 |
| | | nn2 | 2 | 0.025 |
| 4 | to | total | 2560346 | 0.966 |
| | | to0 | 1620850 | 1. |
| | | prp | 917579 | 1. |
| | | avp-prp | 15488 | 1. |
| | | avp | 6245 | 1. |
| | | unc | 182 | 0.363 |
| | | av0 | 1 | 1. |
| | | pnp | 1 | 1. |
| | go | total | 90542 | 0.034 |
| | | vvi | 59772 | 1. |
| | | vvb | 28605 | 1. |
| | | nn1 | 1462 | 1. |
| | | nn1-vvb | 381 | 1. |
| | | unc | 320 | 0.637 |
| | | np0 | 2 | 1. |
| 5 | just | total | 129550 | 0.641 |
| | | av0 | 125465 | 1. |
| | | aj0-av0 | 3305 | 1. |
| | | aj0 | 777 | 1. |
| | | unc | 3 | 1. |
| | must | total | 72571 | 0.359 |
| | | vm0 | 72059 | 1. |
| | | nn1 | 512 | 1. |
| 6 | way | total | 96280 | 0.575 |
| | | nn1 | 95313 | 0.995 |
| | | np0 | 844 | 0.996 |
| | | av0 | 122 | 0.976 |
| | | unc | 1 | 0.018 |
| | say | total | 68535 | 0.409 |
| | | vvi | 41291 | 0.975 |
| | | vvb | 26109 | 0.944 |
| | | nn1-vvb | 673 | 1. |
| | | nn1 | 436 | 0.005 |
| | | unc | 20 | 0.364 |
| | | av0 | 3 | 0.024 |
| | | np0 | 3 | 0.004 |
| | wan | total | 2770 | 0.017 |
| | | vvb | 1554 | 0.056 |
| | | vvi | 1043 | 0.025 |
| | | aj0 | 139 | 1. |
| | | unc | 34 | 0.618 |
| 7 | on | total | 724197 | 0.914 |
| | | prp | 647344 | 1. |
| | | avp | 49967 | 1. |
| | | avp-prp | 26791 | 1. |
| | | unc | 84 | 0.977 |
| | | av0 | 9 | 1. |
| | | aj0 | 1 | 1. |
| | | np0 | 1 | 0.043 |
| | oh | total | 68437 | 0.086 |
| | | itj | 68413 | 1. |
| | | np0 | 22 | 0.957 |
| | | unc | 2 | 0.023 |
| 8 | may | total | 128513 | 0.671 |

TABLE 18-continued

Top collision groups with frequencies and conditional probabilities.
(x. denotes an approximation of x to at least three decimals.)

| # | Words | Tag | Frequency | P(·|signature, tag) |
|---|---|---|---|---|
|   |   | vm0 | 113024 | 1. |
|   |   | np0 | 15242 | 0.893 |
|   |   | nn1 | 231 | 0.004 |
|   |   | unc | 16 | 0.390 |
|   | man | total | 62098 | 0.324 |
|   |   | nn1 | 58769 | 0.996 |
|   |   | nn1-np0 | 1669 | 0.740 |
|   |   | np0 | 1544 | 0.090 |
|   |   | nn1-vvb | 71 | 0.772 |
|   |   | unc | 25 | 0.610 |
|   |   | vvb | 12 | 0.308 |
|   |   | vvi | 8 | 0.800 |
|   | jay | total | 940 | 0.005 |
|   |   | nn1-np0 | 587 | 0.260 |
|   |   | np0 | 275 | 0.016 |
|   |   | nn1 | 27 | 0. |
|   |   | vvb | 27 | 0.692 |
|   |   | nn1-vvb | 21 | 0.228 |
|   |   | vvi | 2 | 0.200 |
|   |   | nn0 | 1 | 1. |
| 9 | can | total | 236321 | 0.791 |
|   |   | vm0 | 234386 | 1. |
|   |   | nn1 | 1019 | 0.017 |
|   |   | vvb | 734 | 1. |
|   |   | nn1-vvb | 153 | 0.987 |
|   |   | unc | 13 | 0.722 |
|   |   | vvi | 9 | 1. |
|   |   | aj0-nn1 | 3 | 1. |
|   |   | aj0 | 2 | 1. |
|   |   | np0 | 2 | 0.001 |
|   | day | total | 62256 | 0.208 |
|   |   | nn1 | 58863 | 0.983 |
|   |   | np0 | 1812 | 0.998 |
|   |   | nn1-np0 | 1576 | 0.988 |
|   |   | unc | 5 | 0.278 |
|   | cay | total | 34 | 0. |
|   |   | nn1-np0 | 19 | 0.012 |
|   |   | nn1 | 11 | 0. |
|   |   | nn1-vvb | 2 | 0.013 |
|   |   | np0 | 2 | 0.001 |
| 10 | new | total | 125206 | 0.672 |
|   |   | aj0 | 114655 | 1. |
|   |   | np0 | 10544 | 0.996 |
|   |   | unc | 7 | 0.500 |
|   | yes | total | 60612 | 0.326 |
|   |   | itj | 60592 | 1. |
|   |   | nn2 | 14 | 0.609 |
|   |   | unc | 6 | 0.429 |
|   | yew | total | 269 | 0.001 |
|   |   | nn1 | 171 | 0.868 |
|   |   | nn1-np0 | 34 | 0.739 |
|   |   | nn1-vvb | 32 | 0.821 |
|   |   | np0 | 27 | 0.003 |
|   |   | vvb | 4 | 0.800 |
|   |   | vvi | 1 | 0.143 |
|   | hes | total | 38 | 0. |
|   |   | nn2-vvz | 15 | 1. |
|   |   | nn2 | 9 | 0.391 |
|   |   | vvz | 7 | 1. |
|   |   | np0 | 6 | 0.001 |
|   |   | unc | 1 | 0.071 |
|   | hex | total | 31 | 0. |
|   |   | nn1 | 19 | 0.096 |
|   |   | nn1-np0 | 5 | 0.109 |
|   |   | np0 | 4 | 0. |
|   |   | nn1-vvb | 3 | 0.077 |
|   | hew | total | 28 | 0. |
|   |   | nn1-np0 | 7 | 0.152 |
|   |   | nn1 | 7 | 0.036 |
|   |   | vvi | 6 | 0.857 |
|   |   | nn1-vvb | 4 | 0.103 |
|   |   | np0 | 3 | 0. |
|   |   | vvb | 1 | 0.200 |

B.2 The Accuracy of using Tags to Predict Dual Signatures

In Subsection 3.3 we argued that if we know the signature and the tag of an intended word, then we may pinpoint the word and, equivalently, the dual signature with good accuracy. In this subsection we shall investigate this a little more closely. To be specific, let us assume that we use the maximum likelihood estimator $\hat{w}$ to select the word, given the tag $\kappa$ and the signature $\sigma$:

$$\hat{w} = \hat{w}(\sigma, \kappa) = \arg\max_w \text{Prob}(w|\sigma, \kappa). \quad (190)$$

We now want to find out, on the average, how often will this maximum likelihood estimator coincide with the intended word. In other words, what is the probability that the intended word $w$ equals $\hat{w}$?

Here is how we can calculate this. Let us pick a corpora that we believe reflects the usage of the words that we are interested in. Let us also assume that this corpora is correctly tagged and the tags come with the corresponding frequencies (of occurence).

$$\text{Prob}(w \neq \hat{w}) = \sum_\sigma \sum_\kappa \text{Prob}(w \neq \hat{w}(\sigma, \kappa) \mid \text{sign}(w) = \sigma, \quad (191)$$
$$\text{tag}(w) = \kappa) \text{Prob}(\text{sign}(w) = \sigma, \text{tag}(w) = \kappa)$$
$$\approx \frac{1}{F} \sum_\sigma \sum_\kappa \sum_{\text{sign}(w)=\sigma, \text{tag}(w)=\kappa}^{\prime} f(w).$$

Here $$F = \sum_\sigma \sum_\kappa \sum_{\text{sign}(w)=\sigma, \text{tag}(w)=\kappa} f(w)$$

is the total frequencies of all words $w$ in the corpora, and $$\sum_{\text{sign}(w)=\sigma, \text{tag}(w)=\kappa}^{\prime} f(w)$$

denotes the sum of all the word frequencies $f(w)=f(w,\sigma,\kappa)$ corresponding to a fixed signature $\sigma$ and tag $\kappa$ except the highest frequency in each tag group. Now, if we let $\hat{f}(\sigma,\kappa)$ denote the highest frequency of a word, given a specific signature $\sigma$ and specific tag $\kappa$, then we have $$\sum_{\text{sign}(w)=\sigma, \text{tag}(w)=\kappa}^{\prime} f(w) = \sum_{\text{sign}(w)=\sigma, \text{tag}(w)=\kappa} f(w) - \hat{f}(\sigma, \kappa),$$

and, hence, $$\sum_\sigma \sum_\kappa \sum_{\text{sign}(w)=\sigma, \text{tag}(w)=\kappa}^{\prime} f(w) = F - \sum_\sigma \sum_\kappa \hat{f}(\sigma, \kappa).$$

With this, we may rewrite the formula (191) as $$\text{Prob}(w \neq \hat{w}) \approx 1 - \frac{1}{F} \sum_\sigma \sum_\kappa \hat{f}(\sigma, \kappa). \quad (192)$$

Now, with this equation we can calculate the probability Prob($w \neq \hat{w}$) once we are given a tagged corpus with frequency information.

EXAMPLE B.1

Suppose we take the full Corpus 1. Then the total word count F=90, 198, 465, the sum of all the non-collision word frequencies ncF=51, 571, 283, and the sum cF of the largest frequencies for each POS in each collision group cF=38, 079, 825. With this we have $$F - (ncF + cF) = 547,357. \quad (193)$$

Hence, $$Prob(w \neq \hat{w}) = 1 - \frac{ncF + cF}{F} \quad (194)$$
$$= 1 - 0.9939316$$
$$= 0.0060684.$$

In other words, the maximum likelihood estimator is accurate 99.4% of the time (on the average).

What is claimed is:

1. An apparatus for character entry comprising:
   (i) a reduced keyboard comprising one row of keys, wherein
      (a) each of one or more keys on said one row of keys has a correspondence with a plurality of characters,
      (b) at least one of said one or more keys corresponds to at least one letter character and at least one non-letter character,
      (c) each of said plurality of characters is associated with a signature/dual signature pair, and
      (d) a unique signal is associated with the signature of all characters corresponding to said key, said unique signal being generated when said key is selected by a user;
   (ii) a memory storing a plurality of objects, each of said objects comprising:
      (a) a unique sequence of signature/dual signature pairs derived from at least one set of legal character combinations; and
      (b) one or more attributes associated with said unique sequence;
   (iii) an output device; and
   (iv) a processor coupled to said memory and said output device and in communication with said keyboard, said processor operable to (a) apply approximate typing rules to predict at least one object from said memory based on a sequence of signatures associated with a sequence of signals from said keyboard, and (b) output to said output device at least one character combination associated with said at least one object.

2. An apparatus as in claim 1, wherein characters are associated with signatures and keys according to touch-typing assignments for at least eight digits.

3. An apparatus as in claim 2, wherein said one row is based on a standard keyboard layout, and wherein said layout follows a character set associated with any one of a plurality of national character sets.

4. An apparatus as in claim 2, wherein said keys are arranged into a left side set and a right side set.

5. An apparatus as in claim 3, wherein said standard keyboard layout is a QWERTY layout.

6. An apparatus as in claim 1, wherein characters are associated with signatures and keys according to thumb-typing assignments.

7. An apparatus as in claim 1, further comprising one or more control keys from a standard keyboard.

8. An apparatus as in claim 1, wherein said at least one of said non-letter characters includes at least one punctuation mark.

9. An apparatus as in claim 1, wherein said keyboard is a physical keyboard.

10. An apparatus as in claim 1, wherein said objects are associated with beginning-of-word character combinations and organized in said memory according to a beginning-of-word path ordering.

11. An apparatus as in claim 1, wherein said memory contains only objects from said objects that comprise delimiter-terminated sequences of signatures and sequences of signatures less than or equal to some fixed length.

12. An apparatus as in claim 11, wherein, on an as-needed basis, said objects comprising sequences of signatures greater than said fixed length are derived from at least one object containing a delimiter-terminated sequence of signatures comprising the same initial sequence of signatures.

13. An apparatus as in claim 1, wherein said prediction rules are based on, at least in part, one or more similarity measures or typing models.

14. An apparatus as in claim 13, wherein at least one of said one or more similarity measures or typing models is based on, at least in part, observed user key selection behaviors.

15. An apparatus as in claim 14, wherein said observed user key selection behaviors are adjusted to account for behaviors of a specific user.

16. An apparatus as in claim 1, further operable to apply rules to predict at least one object based on, at least in part, a reduced keyboard disambiguation method.

17. An apparatus as in claim 16, wherein said disambiguation method is a path-ordered beginning-of-words method.

18. An apparatus as in claim 1, wherein at least one of said object character combination attributes are associated with at least one context tag, and said at least one context tag is used, at least in part, to predict at least one of said objects.

19. An apparatus as in claim 18, wherein at least one of said context tags is associated with a part-of-speech tag.

20. An apparatus as in claim 1, further operable to apply display optimization rules to stabilize said character combination output.

21. An apparatus as in claim 1, wherein said output device is an electronic display device.

22. An apparatus as in claim 1, further comprising at least one key on said keyboard for cycling through alternate character combinations resulting from said prediction.

* * * * *